(12) United States Patent
Takahashi et al.

(10) Patent No.: US 11,489,151 B2
(45) Date of Patent: Nov. 1, 2022

(54) POSITIVE ELECTRODE ACTIVE MATERIAL PARTICLE

(71) Applicant: SEMICONDUCTOR ENERGY LABORATORY CO., LTD., Atsugi (JP)

(72) Inventors: Masahiro Takahashi, Kanagawa (JP); Teruaki Ochiai, Kanagawa (JP); Yohei Momma, Kanagawa (JP); Ayae Tsuruta, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 16/607,381

(22) PCT Filed: May 1, 2018

(86) PCT No.: PCT/IB2018/053005
§ 371 (c)(1),
(2) Date: Oct. 23, 2019

(87) PCT Pub. No.: WO2018/207049
PCT Pub. Date: Nov. 15, 2018

(65) Prior Publication Data
US 2020/0144601 A1   May 7, 2020

(30) Foreign Application Priority Data

May 12, 2017 (JP) .............................. JP2017-095476

(51) Int. Cl.
*H01M 4/36* (2006.01)
*H01M 4/505* (2010.01)
(Continued)

(52) U.S. Cl.
CPC ............ *H01M 4/364* (2013.01); *H01M 4/505* (2013.01); *H01M 4/525* (2013.01); *H01M 2004/028* (2013.01)

(58) Field of Classification Search
CPC ........ C01G 51/00; C01G 53/00; H01G 11/06; H01G 11/30; H01M 2004/028;
(Continued)

(56) References Cited

U.S. PATENT DOCUMENTS

| 4,302,518 A | 11/1981 | Goodenough et al. |
| 4,668,595 A | 5/1987 | Yoshino et al. |

(Continued)

FOREIGN PATENT DOCUMENTS

| CN | 001698222 A | 11/2005 |
| CN | 001715193 A | 1/2006 |

(Continued)

OTHER PUBLICATIONS

Sun.Y et al., "High-energy cathode material for long-life and safe lithium batteries", Nature Materials, Mar. 22, 2009, vol. 8, pp. 320-324.

(Continued)

*Primary Examiner* — Mark Kopec
*Assistant Examiner* — Jaison P Thomas
(74) *Attorney, Agent, or Firm* — Fish & Richardson P.C.

(57) ABSTRACT

A positive electrode active material particle with little deterioration is provided. A power storage device with little deterioration is provided. A highly safe power storage device is provided. The positive electrode active material particle includes a first crystal grain, a second crystal grain, and a crystal grain boundary positioned between the crystal grain and the second crystal grain; the first crystal grain and the second crystal grain include lithium, a transition metal, and oxygen; the crystal grain boundary includes magnesium and (Continued)

oxygen; and the positive electrode active material particle includes a region where the ratio of the atomic concentration of magnesium in the crystal grain boundary to the atomic concentration of the transition metal in first crystal grain and the second crystal grain is greater than or equal to 0.010 and less than or equal to 0.50.

17 Claims, 54 Drawing Sheets

(51) Int. Cl.
    *H01M 4/525*     (2010.01)
    *H01M 4/02*     (2006.01)

(58) Field of Classification Search
    CPC ...... H01M 4/364; H01M 4/366; H01M 4/485; H01M 4/505; H01M 4/525; H01M 4/622; H01M 4/625; Y02E 60/10
    See application file for complete search history.

(56) References Cited

U.S. PATENT DOCUMENTS

| | | | |
|---|---|---|---|
| 5,240,794 A | 8/1993 | Thackeray et al. | |
| 5,443,929 A | 8/1995 | Yamamoto et al. | |
| 5,604,396 A | 2/1997 | Watanabe et al. | |
| 5,705,291 A | 1/1998 | Amatucci et al. | |
| 5,783,333 A | 7/1998 | Mayer | |
| 5,824,278 A | 10/1998 | Yao | |
| 5,834,139 A | 11/1998 | Shodai et al. | |
| 5,871,866 A | 2/1999 | Barker et al. | |
| 5,910,382 A | 6/1999 | Goodenough et al. | |
| 6,085,015 A | 7/2000 | Armand et al. | |
| 6,127,065 A | 10/2000 | Yamamoto et al. | |
| 6,218,050 B1 | 4/2001 | Yoon et al. | |
| 6,277,521 B1 | 8/2001 | Gao et al. | |
| 6,346,348 B1 | 2/2002 | Nakajima et al. | |
| 6,458,487 B1 | 10/2002 | Takeuchi et al. | |
| 6,514,640 B1 | 2/2003 | Armand et al. | |
| 6,582,814 B2 | 6/2003 | Swiler et al. | |
| 6,589,499 B2 | 7/2003 | Gao et al. | |
| 6,680,143 B2 | 1/2004 | Thackeray et al. | |
| 6,737,195 B2 | 5/2004 | Kweon et al. | |
| 6,753,111 B2 | 6/2004 | Kweon et al. | |
| 6,846,592 B2 | 1/2005 | Kweon et al. | |
| 6,878,490 B2 | 4/2005 | Gao et al. | |
| 6,919,144 B2 | 7/2005 | Miyazaki et al. | |
| 6,974,601 B2 | 12/2005 | Kweon et al. | |
| 6,984,469 B2 | 1/2006 | Kweon et al. | |
| 7,018,741 B2 | 3/2006 | Suhara et al. | |
| 7,138,209 B2 | 11/2006 | Kweon et al. | |
| 7,294,435 B2 | 11/2007 | Miyamoto et al. | |
| 7,303,840 B2 | 12/2007 | Thackeray et al. | |
| 7,309,546 B2 | 12/2007 | Kweon et al. | |
| 7,368,071 B2 | 5/2008 | Dahn et al. | |
| 7,393,476 B2 | 7/2008 | Shiozaki et al. | |
| 7,504,180 B2 | 3/2009 | Tatsumi et al. | |
| 7,635,536 B2 | 12/2009 | Johnson et al. | |
| 7,709,148 B2 | 5/2010 | Kawasato et al. | |
| 7,709,151 B2 | 5/2010 | Inoue et al. | |
| 7,736,807 B2 | 6/2010 | Hasegawa et al. | |
| 7,790,308 B2 | 9/2010 | Johnson et al. | |
| 7,892,679 B2 | 2/2011 | Shimizu et al. | |
| 7,927,506 B2 | 4/2011 | Park | |
| 7,935,270 B2 | 5/2011 | Park | |
| 8,003,256 B2 | 8/2011 | Ohishi | |
| 8,007,941 B2 | 8/2011 | Kweon et al. | |
| 8,034,486 B2 | 10/2011 | Kweon et al. | |
| 8,080,340 B2 | 12/2011 | Thackeray et al. | |
| RE43,276 E | 3/2012 | Kweon et al. | |
| 8,236,449 B2 | 8/2012 | Nakura | |
| 8,470,477 B2 | 6/2013 | Miwa et al. | |
| 8,476,510 B2 | 7/2013 | Swager et al. | |
| 8,557,440 B2 | 10/2013 | Yu et al. | |
| 8,685,569 B2 | 4/2014 | Oguni et al. | |
| 8,685,570 B2 | 4/2014 | Miwa et al. | |
| 8,709,654 B2 | 4/2014 | Takeuchi et al. | |
| 8,753,532 B2 | 6/2014 | Levasseur et al. | |
| 8,808,918 B2 | 8/2014 | Jung et al. | |
| 8,877,377 B2 | 11/2014 | Hosoya | |
| 8,877,381 B2 | 11/2014 | Yasuda et al. | |
| 8,883,351 B2 | 11/2014 | Todoriki et al. | |
| 8,906,547 B2 | 12/2014 | Taniguchi et al. | |
| 8,927,148 B2 | 1/2015 | Kawakami | |
| 8,945,770 B2 | 2/2015 | Koo et al. | |
| 8,945,772 B2 | 2/2015 | Kawakami et al. | |
| 8,951,448 B2 | 2/2015 | Toyama et al. | |
| 9,105,926 B2 | 8/2015 | Fujiki et al. | |
| 9,225,003 B2 | 12/2015 | Yukawa | |
| 9,227,850 B2 | 1/2016 | Ooishi | |
| 9,293,236 B2 | 3/2016 | Kawakami et al. | |
| 9,362,557 B2 | 6/2016 | Watanabe et al. | |
| 9,385,366 B2 | 7/2016 | Yamakaji et al. | |
| 9,391,322 B2 | 7/2016 | Liu et al. | |
| 9,478,796 B2 | 10/2016 | Li et al. | |
| 9,505,631 B2 | 11/2016 | Masukuni et al. | |
| 9,515,313 B2 | 12/2016 | Umeyama et al. | |
| 9,614,225 B2 | 4/2017 | Park | |
| 9,666,326 B2 | 5/2017 | Kawakami et al. | |
| 9,698,420 B2 | 7/2017 | Ishizaki et al. | |
| 9,786,903 B2 | 10/2017 | Ryu et al. | |
| 9,812,709 B2 | 11/2017 | Endoh et al. | |
| 9,871,246 B2 | 1/2018 | Kim et al. | |
| 9,899,664 B2 | 2/2018 | Yamaki et al. | |
| 9,923,244 B2 | 3/2018 | Takanashi et al. | |
| 10,128,495 B2 | 11/2018 | Satow et al. | |
| 10,243,215 B2 | 3/2019 | Shitaba et al. | |
| 10,297,857 B2 | 5/2019 | Itoh et al. | |
| 10,361,432 B2 | 7/2019 | Takaichi et al. | |
| 10,476,081 B2 | 11/2019 | Seol et al. | |
| 10,777,815 B2 | 9/2020 | Kanada et al. | |
| 2001/0010807 A1 | 8/2001 | Matsubara | |
| 2002/0102459 A1 | 8/2002 | Hosoya et al. | |
| 2002/0110736 A1 | 8/2002 | Kweon et al. | |
| 2002/0164156 A1 | 11/2002 | Bilbrey | |
| 2002/0195591 A1 | 12/2002 | Ravet et al. | |
| 2003/0104279 A1 | 6/2003 | Miyazaki et al. | |
| 2003/0134186 A1 | 7/2003 | Shizuki | |
| 2004/0142241 A1 | 7/2004 | Nagayama | |
| 2004/0229123 A1 | 11/2004 | Takahashi et al. | |
| 2004/0229124 A1 | 11/2004 | Miyamoto et al. | |
| 2004/0234857 A1 | 11/2004 | Shiozaki et al. | |
| 2005/0019662 A1 | 1/2005 | Suhara et al. | |
| 2006/0051671 A1 | 3/2006 | Thackeray et al. | |
| 2006/0051673 A1 | 3/2006 | Johnson et al. | |
| 2006/0121352 A1 | 6/2006 | Kejha et al. | |
| 2006/0188780 A1 | 8/2006 | Fujii et al. | |
| 2006/0263690 A1 | 11/2006 | Suhara et al. | |
| 2006/0275664 A1 | 12/2006 | Ohzuku et al. | |
| 2006/0286459 A1 | 12/2006 | Zhao et al. | |
| 2007/0026315 A1 | 2/2007 | Lampe-Onnerud et al. | |
| 2007/0099086 A1 | 5/2007 | Kang et al. | |
| 2007/0117014 A1 | 5/2007 | Saito et al. | |
| 2007/0122712 A1 | 5/2007 | Kang et al. | |
| 2007/0148546 A1 | 6/2007 | Shimizu et al. | |
| 2007/0160906 A1 | 7/2007 | Tooyama et al. | |
| 2007/0212609 A1 | 9/2007 | Iwami | |
| 2007/0224506 A1* | 9/2007 | Ooyama | H01M 10/0525 429/231.3 |
| 2008/0131780 A1 | 6/2008 | Kawasato et al. | |
| 2008/0166637 A1 | 7/2008 | Inagaki et al. | |
| 2008/0241693 A1 | 10/2008 | Fukuchi et al. | |
| 2009/0011335 A1 | 1/2009 | Takeda et al. | |
| 2009/0017383 A1 | 1/2009 | Suhara et al. | |
| 2009/0087731 A1 | 4/2009 | Fukui et al. | |
| 2009/0104532 A1 | 4/2009 | Hosoya | |
| 2009/0123813 A1 | 5/2009 | Chiang et al. | |
| 2009/0123842 A1 | 5/2009 | Thackeray et al. | |
| 2009/0220862 A1 | 9/2009 | Toyama et al. | |
| 2010/0019194 A1 | 1/2010 | Fujiwara et al. | |
| 2010/0035147 A1 | 2/2010 | Kotato et al. | |
| 2010/0086854 A1 | 4/2010 | Kumar et al. | |
| 2010/0129714 A1 | 5/2010 | Toyama et al. | |

(56) References Cited

U.S. PATENT DOCUMENTS

| | | |
|---|---|---|
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0178464 A1 | 7/2010 | Choi et al. |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2010/0294985 A1 | 11/2010 | Suhara et al. |
| 2011/0033749 A1 | 2/2011 | Uchida et al. |
| 2011/0059367 A1 | 3/2011 | Morita et al. |
| 2011/0076564 A1 | 3/2011 | Yu et al. |
| 2011/0200879 A1 | 8/2011 | Saito et al. |
| 2011/0229757 A1 | 9/2011 | Kawakami et al. |
| 2011/0256437 A1 | 10/2011 | Katsuki et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0045692 A1 | 2/2012 | Takemura et al. |
| 2012/0064406 A1 | 3/2012 | Sato et al. |
| 2012/0064409 A1 | 3/2012 | Zhamu et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1 | 12/2012 | Hou |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052534 A1 | 2/2013 | Fujiki et al. |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0084384 A1 | 4/2013 | Yamakaji |
| 2013/0089786 A1 | 4/2013 | Jeong et al. |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0230770 A1 | 9/2013 | Oya et al. |
| 2013/0266858 A1 | 10/2013 | Inoue et al. |
| 2013/0266859 A1 | 10/2013 | Todoriki et al. |
| 2013/0313471 A1 | 11/2013 | Endo et al. |
| 2013/0316237 A1 | 11/2013 | Miki |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0079995 A1 | 3/2014 | Wakada |
| 2014/0099554 A1 | 4/2014 | Inoue et al. |
| 2014/0127567 A1 | 5/2014 | Kuriki et al. |
| 2014/0127568 A1 | 5/2014 | Kawakami et al. |
| 2014/0131633 A1 | 5/2014 | Ito et al. |
| 2014/0162132 A1 | 6/2014 | Ishii et al. |
| 2014/0166946 A1 | 6/2014 | Miwa et al. |
| 2014/0184172 A1 | 7/2014 | Momo et al. |
| 2014/0212759 A1 | 7/2014 | Blangero et al. |
| 2014/0234700 A1 | 8/2014 | Moriwaka et al. |
| 2014/0242463 A1 | 8/2014 | Song et al. |
| 2014/0295068 A1 | 10/2014 | Nanba et al. |
| 2014/0332715 A1 | 11/2014 | Kawakami et al. |
| 2014/0370184 A1 | 12/2014 | Takemura et al. |
| 2015/0014581 A1 | 1/2015 | Kawakami et al. |
| 2015/0014605 A1 | 1/2015 | Kawakami et al. |
| 2015/0064565 A1 | 3/2015 | Todoriki et al. |
| 2015/0093648 A1 | 4/2015 | Son et al. |
| 2015/0099178 A1 | 4/2015 | Kawakami et al. |
| 2015/0099179 A1 | 4/2015 | Ikenuma et al. |
| 2015/0123050 A1 | 5/2015 | Yamazaki et al. |
| 2015/0155556 A1 | 6/2015 | Kawakami et al. |
| 2015/0166348 A1 | 6/2015 | Ikenuma et al. |
| 2015/0262762 A1 | 9/2015 | Ikenuma et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380737 A1 | 12/2015 | Kawasato et al. |
| 2016/0006032 A1 | 1/2016 | Paulsen et al. |
| 2016/0028080 A1 | 1/2016 | Sugiura |
| 2016/0064726 A1 | 3/2016 | Ikenuma et al. |
| 2016/0087315 A1 | 3/2016 | Oyama |
| 2016/0104880 A1 | 4/2016 | Gao et al. |
| 2016/0118646 A1 | 4/2016 | Ikenuma |
| 2016/0118658 A1 | 4/2016 | Kawakami et al. |
| 2016/0156030 A1 | 6/2016 | Sun et al. |
| 2016/0164089 A1 | 6/2016 | Kawakami et al. |
| 2016/0276658 A1 | 9/2016 | Choi et al. |
| 2016/0276659 A1 | 9/2016 | Choi et al. |
| 2016/0285102 A1 | 9/2016 | Shitaba et al. |
| 2016/0329533 A1 | 11/2016 | Tajima |
| 2016/0336595 A1 | 11/2016 | Choi et al. |
| 2016/0349905 A1 | 12/2016 | Momma et al. |
| 2016/0380271 A1 | 12/2016 | Ochiai et al. |
| 2017/0005364 A1 | 1/2017 | Yamazaki et al. |
| 2017/0040594 A1 | 2/2017 | Yamaki et al. |
| 2017/0062819 A1 | 3/2017 | Ikenuma |
| 2017/0069907 A1 | 3/2017 | Zhu et al. |
| 2017/0117589 A1 | 4/2017 | Tajima et al. |
| 2017/0187035 A1 | 6/2017 | Yanagihara et al. |
| 2017/0207444 A1 | 7/2017 | Yanagihara et al. |
| 2017/0256817 A1 | 9/2017 | Kadoma et al. |
| 2017/0309910 A1 | 10/2017 | Jo et al. |
| 2018/0013130 A1 | 1/2018 | Ochiai et al. |
| 2018/0019462 A1 | 1/2018 | Kadoma et al. |
| 2018/0034045 A1 | 2/2018 | Xia et al. |
| 2018/0040888 A1 | 2/2018 | Park et al. |
| 2018/0040897 A1 | 2/2018 | Park et al. |
| 2018/0076489 A1 | 3/2018 | Mikami et al. |
| 2018/0102536 A1* | 4/2018 | Kawakami ............ H01G 11/86 |
| 2018/0108944 A1 | 4/2018 | Yamakaji |
| 2018/0145317 A1 | 5/2018 | Momma et al. |
| 2018/0145368 A1 | 5/2018 | Ochiai et al. |
| 2018/0190976 A1 | 7/2018 | Blangero et al. |
| 2018/0254477 A1 | 9/2018 | Horikawa et al. |
| 2018/0366729 A1 | 12/2018 | Yanagita et al. |
| 2019/0067689 A1 | 2/2019 | Hong et al. |
| 2020/0152961 A1 | 5/2020 | Momma et al. |
| 2020/0176770 A1 | 6/2020 | Takahashi et al. |
| 2020/0243859 A1* | 7/2020 | Rempel ................ H01M 4/525 |

FOREIGN PATENT DOCUMENTS

| | | |
|---|---|---|
| CN | 101148263 A | 3/2008 |
| CN | 101176227 A | 5/2008 |
| CN | 102339998 A | 2/2012 |
| CN | 102447107 A | 5/2012 |
| CN | 102610806 A | 7/2012 |
| CN | 102683669 A | 9/2012 |
| CN | 102694201 A | 9/2012 |
| CN | 102779976 A | 11/2012 |
| CN | 103022502 A | 4/2013 |
| CN | 103490060 A | 1/2014 |
| CN | 104701534 A | 6/2015 |
| CN | 105024047 A | 11/2015 |
| CN | 105051946 A | 11/2015 |

(56) References Cited

FOREIGN PATENT DOCUMENTS

| | | |
|---|---|---|
| CN | 106058238 A | 10/2016 |
| CN | 106099098 A | 11/2016 |
| CN | 102569775 B | 1/2017 |
| EP | 3309879 A | 4/2018 |
| JP | 05-314965 A | 11/1993 |
| JP | 05-314995 A | 11/1993 |
| JP | 08-037007 A | 2/1996 |
| JP | 08-100107 A | 4/1996 |
| JP | 08-236114 A | 9/1996 |
| JP | 11-025983 A | 1/1999 |
| JP | 11-096993 A | 4/1999 |
| JP | 3031546 | 4/2000 |
| JP | 2000-203842 A | 7/2000 |
| JP | 3172388 | 6/2001 |
| JP | 2001-319692 A | 11/2001 |
| JP | 2002-216760 A | 8/2002 |
| JP | 2002-352802 A | 12/2002 |
| JP | 2003-068306 A | 3/2003 |
| JP | 2003-221235 A | 8/2003 |
| JP | 2003-331824 A | 11/2003 |
| JP | 2004-014381 A | 1/2004 |
| JP | 2004-103566 A | 4/2004 |
| JP | 2004-196604 A | 7/2004 |
| JP | 2004-288579 A | 10/2004 |
| JP | 2004-342554 A | 12/2004 |
| JP | 2004-363097 A | 12/2004 |
| JP | 2005-158612 A | 6/2005 |
| JP | 2005-225734 A | 8/2005 |
| JP | 2005-302510 A | 10/2005 |
| JP | 2005-332629 A | 12/2005 |
| JP | 2006-164758 A | 6/2006 |
| JP | 2006-261132 A | 9/2006 |
| JP | 2006-318928 A | 11/2006 |
| JP | 2006-318929 A | 11/2006 |
| JP | 2007-128714 A | 5/2007 |
| JP | 2007-213866 A | 8/2007 |
| JP | 3959333 | 8/2007 |
| JP | 2008-060033 A | 3/2008 |
| JP | 2008-166156 A | 7/2008 |
| JP | 2009-179501 A | 8/2009 |
| JP | 4353808 | 10/2009 |
| JP | 2010-080407 A | 4/2010 |
| JP | 2010-102895 A | 5/2010 |
| JP | 2010-244847 A | 10/2010 |
| JP | 2010-272239 A | 12/2010 |
| JP | 2011-082133 A | 4/2011 |
| JP | 2011-138718 A | 7/2011 |
| JP | 4739780 | 8/2011 |
| JP | 2011-210694 A | 10/2011 |
| JP | 2012-018914 A | 1/2012 |
| JP | 2012-043794 A | 3/2012 |
| JP | 2012-066944 A | 4/2012 |
| JP | 2012-074366 A | 4/2012 |
| JP | 2012-084257 A | 4/2012 |
| JP | 2012-169217 A | 9/2012 |
| JP | 2012-209077 A | 10/2012 |
| JP | 2013-012410 A | 1/2013 |
| JP | 2013-062082 A | 4/2013 |
| JP | 2013-087040 A | 5/2013 |
| JP | 2013-091581 A | 5/2013 |
| JP | 2013-100197 A | 5/2013 |
| JP | 2013-246936 A | 12/2013 |
| JP | 2014-049239 A | 3/2014 |
| JP | 2014-063707 A | 4/2014 |
| JP | 2014-063708 A | 4/2014 |
| JP | 2014-116111 A | 6/2014 |
| JP | 2015-069958 A | 4/2015 |
| JP | 2015-082374 A | 4/2015 |
| JP | 2015-088450 A | 5/2015 |
| JP | 2015-099722 A | 5/2015 |
| JP | 2015-156363 A | 8/2015 |
| JP | 2015-201432 A | 11/2015 |
| JP | 2016-076454 A | 5/2016 |
| JP | 2017-021942 A | 1/2017 |
| JP | 2017-091777 A | 5/2017 |
| JP | 2018-092934 A | 6/2018 |
| JP | 2018-147726 A | 9/2018 |
| KR | 2004-0085160 A | 10/2004 |
| KR | 2009-0111130 A | 10/2009 |
| KR | 10-0989537 | 10/2010 |
| KR | 2012-0054532 A | 5/2012 |
| KR | 2012-0108902 A | 10/2012 |
| KR | 2014-0109807 A | 9/2014 |
| KR | 2015-0005084 A | 1/2015 |
| KR | 2015-0063956 A | 6/2015 |
| KR | 2016-0065837 A | 6/2016 |
| KR | 2016-0092946 A | 8/2016 |
| KR | 2016-0146580 A | 12/2016 |
| WO | WO-2003/069702 | 8/2003 |
| WO | WO-2011/141486 | 11/2011 |
| WO | WO-2011/155781 | 12/2011 |
| WO | WO-2012/005180 | 1/2012 |
| WO | WO-2012/029729 | 3/2012 |
| WO | WO-2012/124242 | 9/2012 |
| WO | WO-2012/132387 | 10/2012 |
| WO | WO-2014/061653 | 4/2014 |
| WO | WO-2014/098238 | 6/2014 |
| WO | WO-2015/136881 | 9/2015 |
| WO | WO-2015/163356 | 10/2015 |
| WO | WO-2016/080457 | 5/2016 |
| WO | WO-2018/207049 | 11/2018 |
| WO | WO-2018/211375 | 11/2018 |

OTHER PUBLICATIONS

Yano.A et al., "LiCoO2 Degradation Behavior in the High-Voltage Phase Transition Region and Improved Reversibility with Surface Coating", J. Electrochem. Soc. (Journal of the Electrochemical Society), 2017, vol. 164, No. 1,pp. A6116-A6122.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.

Koyama.Y et al., "Co K-edge XANES of LiCoO2 and CoO2 with a variety of structures by supercell density functional calculations with a core hole", Phys. Rev. B (Physical Review. B), Feb. 27, 2012, vol. 85, No. 7, pp. 075129-1-075129-7.

Quinlan.R et al., "XPS Investigation of the Electrolyte Induced Stabilization of LiCoO2 and "AlPO4"-Coated LiCoO2 Composite Electrodes", J. Electrochem. Soc. (Journal of the Electrochemical Society), Dec. 3, 2015, vol. 163, No. 2, pp. A300-A308.

Hong.W et al., "Modification of LiCoO2 by Surface Coating with MgO/TiO2/SiO2 for High-Performance Lithium-Ion Battery", Electrochemicaland Solid-State Letters, Dec. 20, 2005, vol. 9, No. 2, pp. A82-A85.

Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299-A302.

Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.

Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.

Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.

Lu.Y et al., "Recent progress on lithium-ion batteries with high electrochemical performance", Science China Chemistry, Feb. 25, 2019, vol. 62, No. 5, pp. 533-548.

(56) References Cited

OTHER PUBLICATIONS

Xiao.B, "Surface Modifification of Electrode Materials for Lithium-Ion Batteries", Graduate Program in Mechanical and Materials Engineering, 2006, pp. 1-235.

Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.

Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.

Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.

Schipper.F et al., "Study of Cathode Materials for Lithium-Ion Batteries: Recent Progress and New Challenges", Inorganics, Apr. 28, 2017, vol. 5, No. 2, pp. 1-29.

Thackeray.M et al., "LI2MnO3-stabilized LIMO2(M = Mn, Ni, Co) electrodes for lithium-ion batteries", J. Mater. Chem. (Journal of Materials Chemistry), 2007, vol. 17, pp. 3112-3125.

Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.

Dreyer.D et al., "The Chemistry of Graphene Oxide", Chemical Society Reviews, Nov. 3, 2009, vol. 39, No. 1, pp. 228-240.

Johnson.C et al., "Lithium-manganese oxide electrodes with layered-spinel composite structures xLi2Mn03 (1-x)Li1+yMn2-yO4(0<x>1,0≦y≦0.33) for lithium batteries", Electrochemistry Communications, May 1, 2005, vol. 7, No. 5, pp. 528-536, Elsevier.

Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e283-e288, Elsevier.

McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.

Mukai.K et al., "Magnetic properties of the chemically delithiated LixMn2O4 with $0.07 \leq x \leq 1$", Journal of Solid State Chemistry, May 1, 2011, vol. 184, No. 5, pp. 1096-1104.

Wang.Z et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

Berbenni.V et al., "Thermogravimetry and X-Ray Diffraction Study of the Thermal Decomposition Processes in LI2CO3-MNCO3 Mixtures", Journal of Analytical and Applied Pyrolysis, 2002, vol. 62, pp. 45-62.

Taguchi.N et al., "Characterization of MgO-coated-LiCoO2 particles by analytical transmission electron microscopy", Journal of Power Sources, 2016, vol. 328, pp. 161-166, Elsevier.

Khedr.A et al., "Synthesis, Structure, and Electrochemistry of Sm-Modified LiMn2O4 Cathode Materials for Lithium-Ion Batteries", J. Electron. Mater.(Journal of Electronic Materials), Apr. 23, 2013, vol. 42, No. 6, pp. 1275-1281.

Joshi.T et al., "Effects of Dissolved Transition Metals on the Electrochemical Performance and SEI Growth in Lithium-Ion Batteries", J. Electrochem. Soc. (Journal of the Electrochemical Society), 2014, vol. 161, No. 12, pp. A1915-A1921.

Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.

Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.

Yamamoto.K et al., "in situ Total-Reflection Fluorescence X-Ray Absorption Spectroscopic Study on Stability at LiFePO4 / Elecrtrolyte Interface", 224th ECS Meeting Abstract, Oct. 27, 2013, p. 923.

Wang.Z et al., "Electrochemical Evaluation and Structural Characterization of Commercial LICoO2 Surfaces Modified with MgO for Lithium-Ion Batteries", J. Electrochem. Soc. (Journal of the Electrochemical Society), Mar. 4, 2002, vol. 149, No. 4, pp. A466-A471.

Lee.Y et al., "Phase Transitions of Bare and Coated LixCoO2 (x = 0.4 and 0.24) at 300°C", J. Electrochem. Soc. (Journal of the Electrochemical Society), Jul. 28, 2005, vol. 152, No. 9, pp. A1824-A1827.

Geder.J et al., "Impact of active material surface area on thermal stability of LiCoO2 cathode", Journal of Power Sources, Jul. 1, 2014, vol. 257, pp. 286-292, Elsevier.

Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.

Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.

Chen.Z et al., "Staging Phase Transitions in LixCoO2", J. Electrochem. Soc. (Journal of the Electrochemical Society), 2002, vol. 149, No. 12, pp. A1604-A1609.

Shim.J et al., "Characterization of Spinel LixCo2O4-Coated LICoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, p. 165114-1-155114-9.

Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.

Tukamoto.H et al., "Electronic Conductivity of LiCoO2 and Its Enhancement by Magnesium Doping", J. Electrochem. Soc. (Journal of the Electrochemical Society), Sep. 1, 1997, vol. 144, No. 9, pp. 3164-3168.

Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.

Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.

Wang.Z et al., "Structural and electrochemical characterizations of surface-modified LiCoO2 cathode materials for Li-ion batteries", Solid State Ionics, Jun. 2, 2002, vol. 148, No. 3-4, pp. 335-342, Elsevier.

Zou.M et al., "Synthesis and Electrochemical Performance of High Voltage Cycling LiM0.05Co0.95O2 as Cathode Material for Lithium Rechargeable Cells", Electrochemicaland Solid-State Letters, 2004, vol. 7, No. 7, pp. A176-A179.

Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.

Cho.Y et al., "High Performance LiCoO2 Cathode Materials at 60°C for Lithium Secondary Batteries Prepared by the Facile Nanoscale Dry-Coating Method", J. Electrochem. Soc. (Journal of the Electrochemical Society), 2010, vol. 157, No. 5, pp. A617-A624.

Wang.Z et al., "Mg doping and zirconium oxyfluoride coating co-modification to enhance the high-voltage performance of LICoO2 for lithium ion battery", Journal of Alloys and Compounds, Feb. 5, 2015, vol. 621, pp. 212-219.

(56) References Cited

OTHER PUBLICATIONS

Kweon.H et al., "Effects of metal oxide coatings on the thermal stability and electrical performance of LICoCO2 in a Li-ion cell", Journal of Power Sources, Feb. 16, 2004, vol. 126, pp. 156-162, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.

Zhao.H et al., "Improvement of electrochemical stability of LiCoO2 cathode by a nano-crystalline coating", Journal of Power Sources, May 20, 2004, vol. 132, pp. 195-200, Elsevier.

Iriyama.Y et al., "Effects of surface modification by MgO on interfacial reaction of lithium cobalt oxide thin film electrode", Journal of Power Sources, Oct. 5, 2004, vol. 137, pp. 111-116, Elsevier.

Shim.J et al., "Effects of MgO Coating on the Structural and Electrochemical Characteristics of LiCoO2 as Cathode Materials for Lithium Ion Battery", Chem. Mater. (Chemistry of Materials), [e.g.), Suppor] Supporting Information, Mar. 24, 2014, vol. 26, No. 8, pp. 31-33.

Orikasa.Y et al., "Origin of Surface Coating Effect for MgO on LiCoO2 to Improve the Interfacial Reaction between Electrode and Electrolyte", Adv. Mater.Interfaces (Advanced Materials Interfaces), Aug. 28, 2014, vol. 1, No. 9, p. 1400195-1-1400195-8.

Shim.J et al., "Synergistic effects of coating and doping for lithium ion battery cathode materials: synthesis and characterization of lithium titanate-coated LiCoO2 with Mg doping", Electrochimica Acta, Dec. 20, 2015, vol. 186, pp. 201-208, Elesevier.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Alcantara.R et al., "SPES, 6LI MAS NMR, and Ni3+ EPR evidence for the formation of Co2+-containing spinel phases in LiCoO2 cycled electrode materials", Journal of Electroanalytical Chemistry, Aug. 28, 1998, vol. 454, No. 1-2, pp. 173-181.

Shi.S et al., "Enhanced cycling stability of Li[Li 0.2Mn0.54Ni0.13Co0.13]O2 by surface modification of MgO with melting impregnation method", Electrochimica Acta, Nov. 1, 2012, vol. 88, pp. 671-679.

Antaya.M et al., "Preparation and Characterization of LiCoO2 Thin Films by Laser Ablation Deposition", J. Electrochem. Soc. (Journal of the Electrochemical Society), Mar. 1, 1993, vol. 140, No. 3, pp. 575-578.

Cho.J et al., "Comparison of Al2O3- and AlPO4-coated LiCoO2 cathode materials for a Li-ion cell", Journal of Power Sources, 2005, vol. 146, pp. 58-64, Elsevier.

Jin.Y et al., "Electrochemical Characterizations of Commercial LICoO2 Powders with Surface Modified by Li3PO4 Nanoparticles", Electrochemical and Solid-State Letters, Apr. 3, 2006, vol. 9, No. 6, pp. A273-A276.

Eom.J et al., "M3(PO4)2-Nanoparticle-Coated LICoO2 vs LiCo0.96M0.04O2(M = Mg and Zn) on Electrochemical and Storage Characteristics", J. Electrochem. Soc. (Journal of the Electrochemical Society), Jan. 8, 2008, vol. 155, No. 3, pp. A201-A205.

Kim.Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.

Fang.T et al., "Effect of calcination temperature on the electrochemical behavior of ZnO-coated LiCoO2 cathode", Surface & Coatings Technology , Apr. 19, 2006, vol. 201, No. 3-4, pp. 1886-1893, Elsevier.

Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), 2007, vol. 154, No. 4, pp. A337-A342.

Sun.Y et al., "Role of AlF3 Coating on LiCoO2 Particles during Cycling to Cutoff Voltage above 4.5 V", J. Electrochem. Soc. (Journal of the Electrochemical Society), 2009, vol. 156, No. 12, pp. A1005-A1010.

Araki.K et al., "Electrochemical properties of LiNi1/3Co1/3Mn1/3O2 cathode material modified by coating with Al2O3 nanoparticles", Journal of Power Sources, 2014, vol. 269, pp. 236-243.

Kim.H et al., "Capacity fading behavior of Ni-rich layered cathode materials in Li-ion full cells", Journal of Electroanalytical Chemistry, 2016, vol. 782, pp. 168-173.

Lin.F et al., "Surface reconstruction and chemical evolution of stoichiometric layered cathode materials for lithium-ion batteries", Nature Communications, Mar. 27, 2014, vol. 5, pp. 3529-1-3529-9.

Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), 2015, vol. 162, No. 2, pp. A3137-A3144.

Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), 2016, vol. 163, No. 2, pp. A75-A82.

International Search Report (Application No. PCT/IB2018/053005) dated Aug. 7, 2018.

Written Opinion (Application No. PCT/IB2018/053005) dated Aug. 7, 2018.

Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.

Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.

Antolini.E, "LiCoO2: formation, structure, lithium and oxygen nonstoichiometry, electrochemical behaviour and transport properties", Solid State Ionics, 2004, vol. 170, No. 3-4, pp. 159-171.

Ding.Y et al., "Preparation of nano-structured LiFePO4/graphene composites by co-precipitation method", Electrochemistry Communications, 2010, vol. 12, No. 1, pp. 10-13, Elsevier.

Ceder.G et al., "Identification of cathode materials for lithium batteries guided by first-principles calculations", Nature, Apr. 16, 1998, vol. 392, pp. 694-696.

Gopukumar.S et al., "Synthesis and electrochemical performance of tetravalent doped LiCoO2 in lithium rechargeable cells", Solid State Ionics, 2003, vol. 159, pp. 223-232, Elsevier.

Chinese Office Action (Application No. 201880025517.2) dated Aug. 10, 2022.

* cited by examiner

FIG. 8A1
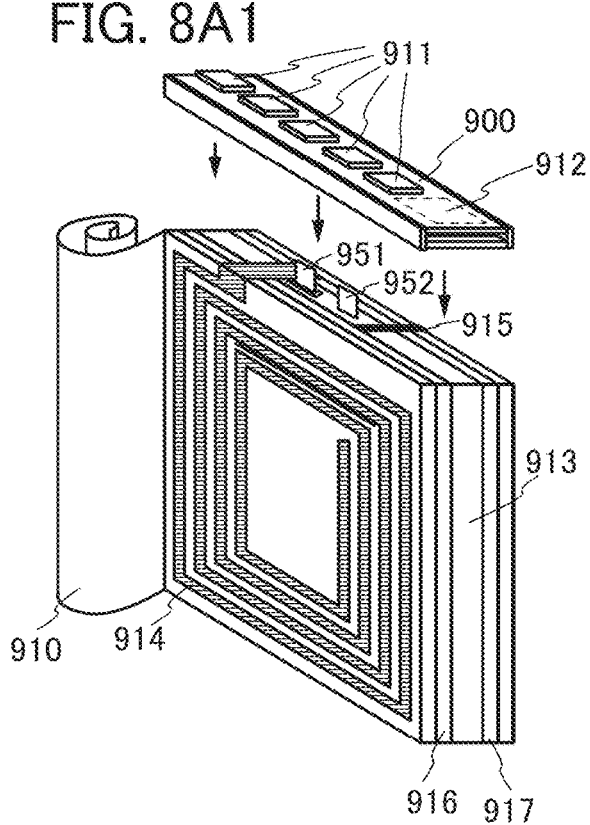
FIG. 8A2
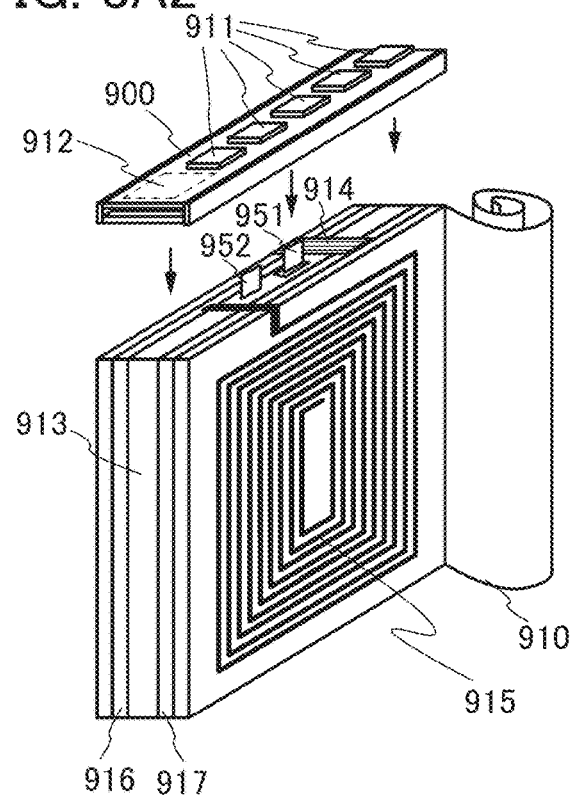
FIG. 8B1
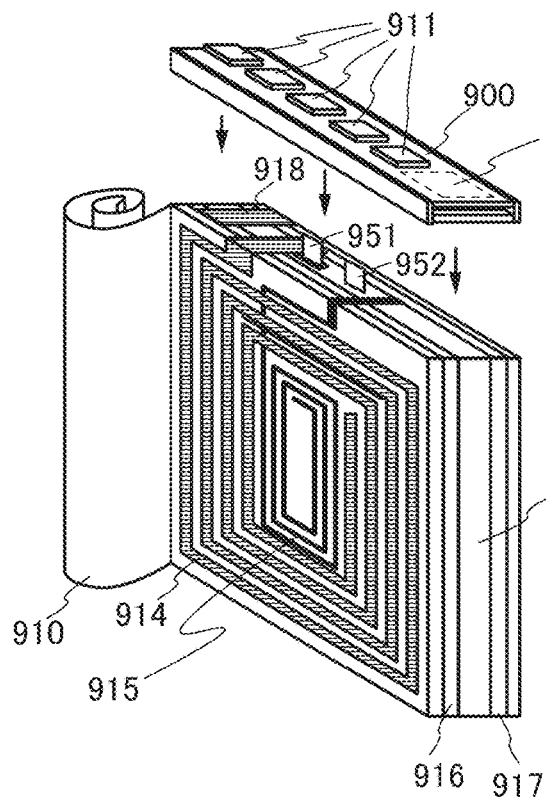
FIG. 8B2
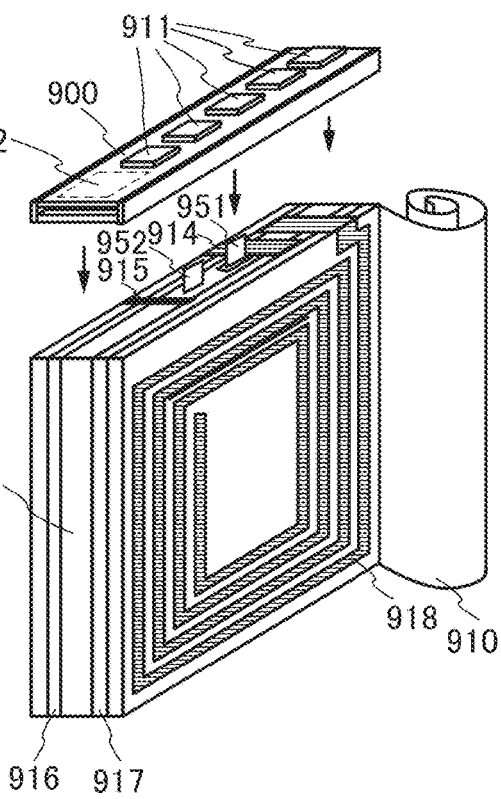

FIG. 17A
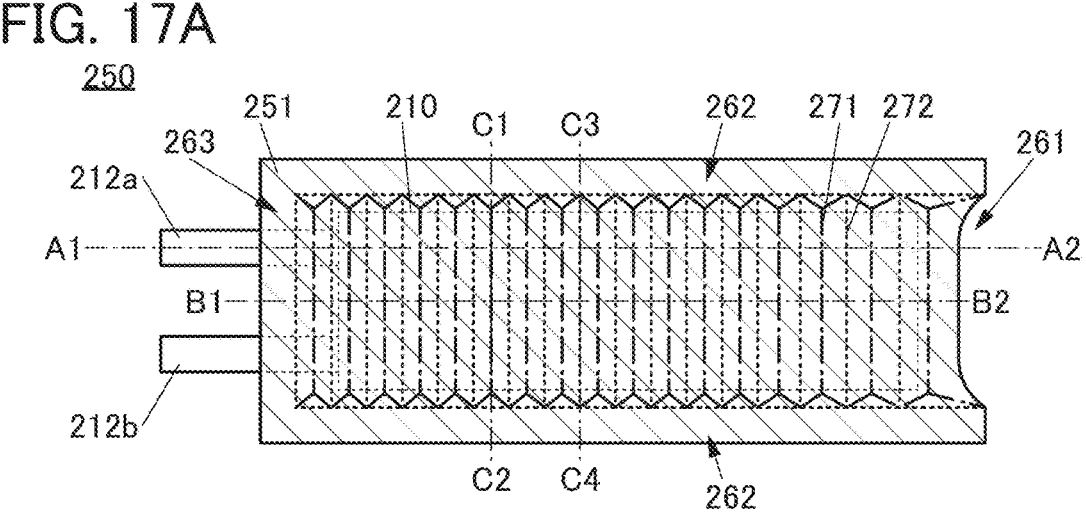
FIG. 17B1
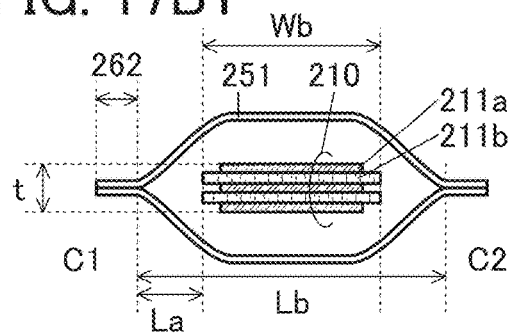
FIG. 17B2
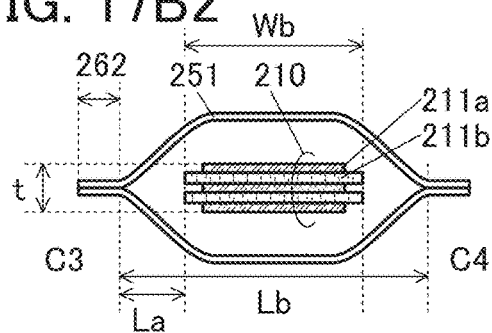
FIG. 17C
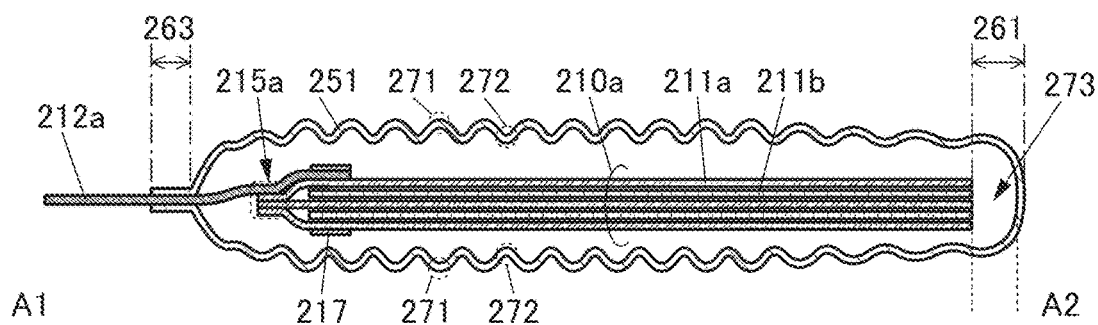
FIG. 17D
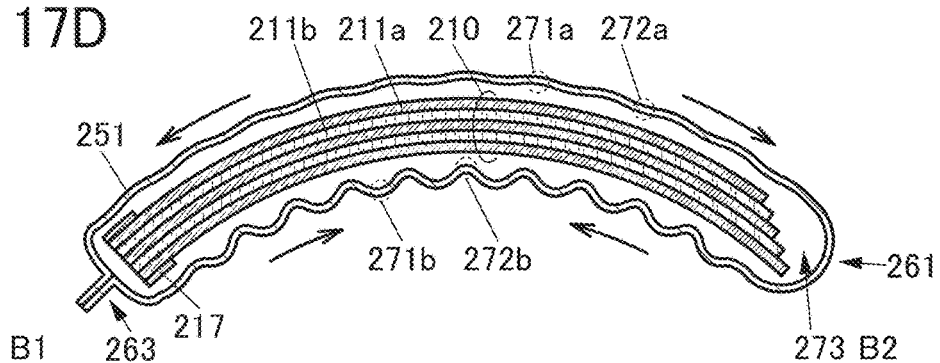

300nm

3nm

3nm

| Element | Weight % | Atomic % |
|---|---|---|
| C K | 12.6 | 27.3 |
| O K | 26.6 | 43.2 |
| F K | 1.3 | 1.8 |
| Mg K | 1.1 | 1.1 |
| Si K | 0.5 | 0.4 |
| P K | 0.0 | 0.0 |
| S K | 0.0 | 0.0 |
| Ca K | 0.2 | 0.1 |
| Mn K | 16.5 | 7.8 |
| Co K | 10.6 | 4.7 |
| Ni K | 30.6 | 13.6 |
| Total | 100.0 | 100.0 |

300nm

3nm

3nm

POSITIVE ELECTRODE ACTIVE MATERIAL PARTICLE

TECHNICAL FIELD

One embodiment of the present invention relates to an object, a method, or a manufacturing method. One embodiment of the present invention relates to a process, a machine, manufacture, or a composition of matter. One embodiment of the present invention relates to a manufacturing method of a semiconductor device, a display device, a light-emitting device, a power storage device, a lighting device, or an electronic device. In particular, one embodiment of the present invention relates to a positive electrode active material that can be used in a secondary battery, a secondary battery, and an electronic device including a secondary battery.

Note that in this specification, the power storage device is a collective term describing units and devices having a power storage function. For example, a storage battery (also referred to as a secondary battery) such as a lithium-ion secondary battery, a lithium-ion capacitor, and an electric double layer capacitor are included in the category of the power storage device.

Note that electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, a demand for lithium-ion secondary batteries with high output and high capacity has rapidly grown with the development of the semiconductor industry, for portable information terminals such as mobile phones, smartphones, and laptop computers; portable music players; digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

Thus, improvement of a positive electrode active material has been studied to increase the cycle characteristics and the capacity of the lithium-ion secondary battery (Patent Document 1 and Patent Document 2).

The performance currently required for power storage devices includes safe operation under a variety of environments and longer-term reliability.

PRIOR ART DOCUMENT

Patent Document

[Patent Document 1] Japanese Published Patent Application No. 2012-018914
[Patent Document 2] Japanese Published Patent Application No. 2016-076454

SUMMARY OF THE INVENTION

Problems to be Solved by the Invention

Lithium-ion secondary batteries and positive electrode active materials used therein need an improvement in terms of capacity, cycle characteristics, charge and discharge characteristics, reliability, safety, cost, and the like.

In view of the above, an object of one embodiment of the present invention is to provide a positive electrode active material particle with little deterioration. Another object of one embodiment of the present invention is to provide a novel positive electrode active material particle. Another object of one embodiment of the present invention is to provide a power storage device with little deterioration. Another object of one embodiment of the present invention is to provide a highly safe power storage device. Another object of one embodiment of the present invention is to provide a novel power storage device.

Note that the description of these objects does not disturb the existence of other objects. In one embodiment of the present invention, there is no need to achieve all the objects. Other objects can be derived from the description of the specification, the drawings, and the claims.

Means for Solving the Problems

One embodiment of the present invention is a positive electrode active material particle including a first crystal grain, a second crystal grain, and a crystal grain boundary positioned between the first crystal grain and the second crystal grain; the first crystal grain and the second crystal grain include lithium, a transition metal, and oxygen; and the crystal grain boundary includes magnesium and oxygen.

The above positive electrode active material particle preferably includes a region in which the ratio of the atomic concentration of magnesium to the atomic concentration of the transition metal is greater than or equal to 0.010 and less than or equal to 0.50.

In the above positive electrode active material particle, the crystal grain boundary preferably further includes fluorine.

The above positive electrode active material particle preferably includes a region in which the ratio of the atomic concentration of fluorine to the atomic concentration of the transition metal is greater than or equal to 0.020 and less than or equal to 1.00.

The above positive electrode active material particle preferably includes any one or more of iron, cobalt, nickel, manganese, chromium, titanium, vanadium, and niobium as the transition metal.

Effect of the Invention

According to one embodiment of the present invention, a positive electrode active material particle with little deterioration can be provided. A novel positive electrode active material particle can be provided. A power storage device with little deterioration can be provided. A highly safe power storage device can be provided. A novel power storage device can be provided.

BRIEF DESCRIPTION OF THE DRAWINGS

FIGS. 8A1, 8A2, 8B1, and 8B2 Diagrams illustrating examples of secondary batteries.

FIGS. 17A, 17B1, 17B2, 17C, and 17D Diagrams illustrating a bendable secondary battery.

MODE FOR CARRYING OUT THE INVENTION

Figure 1A:
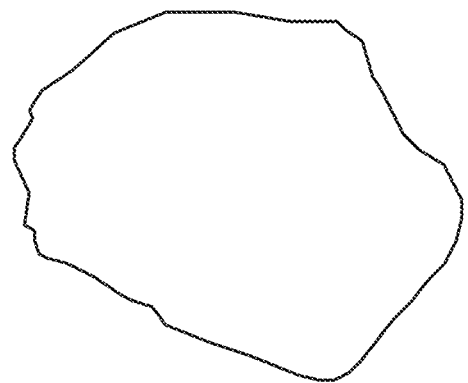
FIGS. 1A to 1C Diagrams showing an example of a positive electrode active material particle.

Hereinafter, embodiments of the present invention will be described in detail with reference to drawings. Note that the present invention is not limited to the description below, and it is easily understood by those skilled in the art that modes and details of the present invention can be modified in various ways. In addition, the present invention should not be construed as being limited to the description in the embodiments given below.

Note that in drawings used in this specification, the sizes, thicknesses, and the like of components such as a positive electrode, a negative electrode, an active material layer, a separator, and an exterior body are exaggerated for simplicity in some cases. Therefore, the sizes of the components are not limited to the sizes in the drawings and relative sizes between the components.

In structures of the present invention described in this specification and the like, the same portions or portions having similar functions are denoted by common reference numerals in different drawings, and the description thereof is not repeated. Further, the same hatching pattern is applied to portions having similar functions, and the portions are not especially denoted by reference numerals in some cases.

In the crystallography, a bar is placed over a number in the expression of crystal planes and orientations; however, in this specification and the like, crystal planes and orientations are expressed by placing a minus sign (−) at the front of a number because of expression limitations. Furthermore, an individual direction which shows an orientation in crystal is denoted by "[ ]", a set direction which shows all of the equivalent orientations is denoted by "< >", an individual plane which shows a crystal plane is denoted by "( )", and a set plane having equivalent symmetry is denoted by "{ }".

In this specification and the like, segregation refers to a phenomenon in which, in a solid including a plurality of elements (e.g., A, B, and C), the concentration of a certain element (for example, B) is non-uniformly distributed.

Embodiment 1

[Structure of Positive Electrode Active Material]

A positive electrode active material particle 100, which is one embodiment of the present invention, is described with reference to FIG. 1(A) to FIG. 1(C) and FIG. 2(A) to FIG. 2(C).

FIG. 1(A) illustrates an external view of the positive electrode active material particle 100. The positive electrode active material particle 100 is an irregular particle. Note that the shape of the positive electrode active material particle 100 illustrated in FIG. 1(A) is an example and not limited thereto.

Figure 1B:
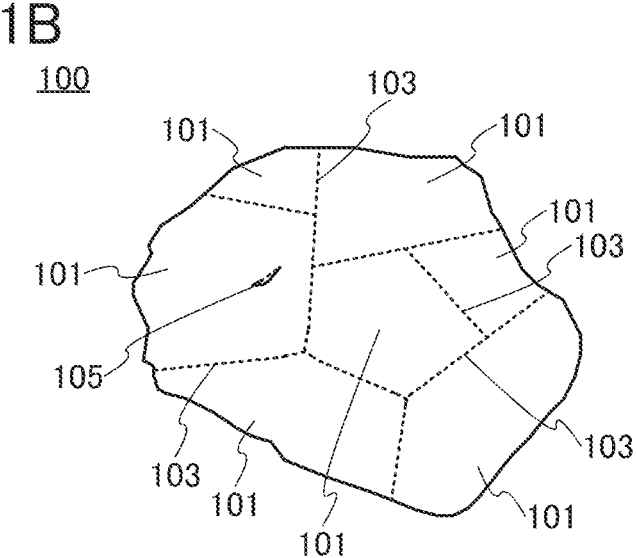

The positive electrode active material particle 100 includes a plurality of crystal grains 101 and a plurality of crystal grain boundaries 103. FIG. 1(B) illustrates the crystal grains 101 and the crystal grain boundaries 103 included in the positive electrode active material particle 100. The crystal grain boundaries 103 are denoted by dashed lines in FIG. 1(B); however, the boundary between the crystal grains 101 and the crystal grain boundaries 103 may not be clear. Note that the shape and the number of the crystal grains 101 and the crystal grain boundaries 103 illustrated in FIG. 1(B) are examples and not limited thereto.

The crystal grains 101 are particles each having a substantially uniform crystal orientation. Adjacent crystal grains 101 each have a different crystal orientation and the crystal grain boundary 103 is between the adjacent crystal grains. That is, the positive electrode active material particle 100 includes a plurality of crystal grains 101 with the crystal grain boundary 103 therebetween. The positive electrode active material particle 100 can also be referred to as a polycrystal. The positive electrode active material particle 100 may have a crystal defect 105 and may include an amorphous region. Note that in this specification and the like, a crystal defect refers to a body defect, a plane defect, or a point defect which can be observed from a TEM image and the like, a structure in which another element enters the crystal, or the like. Note that the crystal grain is referred to as a crystallite in some cases.

The crystal grains 101 and the crystal grain boundaries 103 in the positive electrode active material particle 100 can be confirmed by X-ray diffraction (XRD), neutron diffraction, electron diffraction (ED), a transmission electron microscope (TEM) image, a scanning transmission electron microscopy (STEM) image, analysis of fast Fourier transformation (FFT) performed on a lattice image obtained by the TEM image or the STEM image, a high-angle annular dark field scanning TEM (HAADF-STEM) image, an annular bright-field scanning TEM (ABF-STEM) image, Raman spectroscopy, electron backscatter diffraction (EBSD), and the like. Note that the electron backscatter diffraction is referred to as an electron backscatter diffraction pattern (EBSP) in some cases. For example, when the concentration (luminance) of a TEM image is substantially uniform, the TEM image can be determined to have a substantially uniform crystal orientation, i.e., to be a single crystal in some cases. Since the concentration (luminance) of a TEM image changes with crystal orientation, a region where the concentration (luminance) varies is regarded as a grain boundary in some cases. However, the clear boundary between the crystal grain 101 and the crystal grain boundary 103 is not necessarily observed by the various analysis.

The crystal grain 101 and the crystal grain boundary 103 have different compositions. The crystal grain 101 includes lithium, a transition metal, and oxygen. The crystal grain boundary 103 includes magnesium and oxygen. The crystal grain boundary 103 preferably further includes fluorine.

The different compositions of the crystal grain 101 and the crystal grain boundary 103 can be confirmed by energy dispersive X-ray spectroscopy (EDX), time-of-flight secondary ion mass spectrometry (ToF-SIMS), X-ray photoelectron spectroscopy (XPS), Auger electron spectroscopy (AES), electron energy-loss spectroscopy (EELS), and the like. However, the clear boundary between the crystal grain 101 and the crystal grain boundary 103 is not necessarily observed by the various analysis. A desired analysis target element may not be detected by some analysis methods. The analysis target element may not be detected when having an extremely low concentration.

<Crystal Grain Boundary>

The crystal grain boundary 103 included in the positive electrode active material particle 100 of one embodiment of the present invention includes magnesium and oxygen. The crystal grain boundary 103 includes magnesium oxide. The crystal grain boundary 103 preferably further includes fluorine. Fluorine may be substituted for part of oxygen included in magnesium oxide. Substitution of fluorine for part of magnesium oxide promotes diffusion of lithium, for example, so that charge and discharge are not prevented. The crystal grain boundary 103 including fluorine is unlikely to dissolve in hydrofluoric acid in some cases.

The crystal grain boundary 103 includes a region with a higher magnesium concentration than the crystal grain 101. In other words, the crystal grain boundary 103 includes a region where magnesium is segregated.

The crystal grain boundary 103 includes a region where the fluorine concentration is higher than that in the crystal grain 101. In other words, the crystal grain boundary 103 includes a region where fluorine is segregated.

Figure 2A:
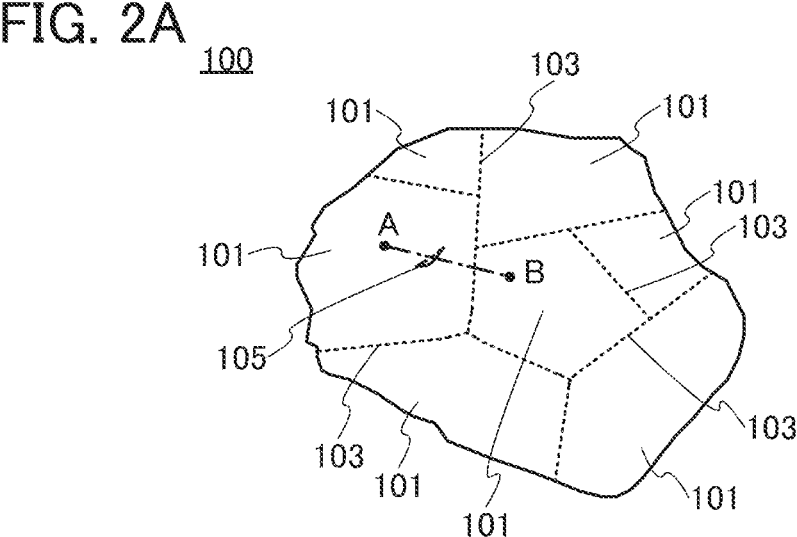
FIGS. 2A to 2C Diagrams showing the concentration distribution in the positive electrode active material particle.
Figure 2B:
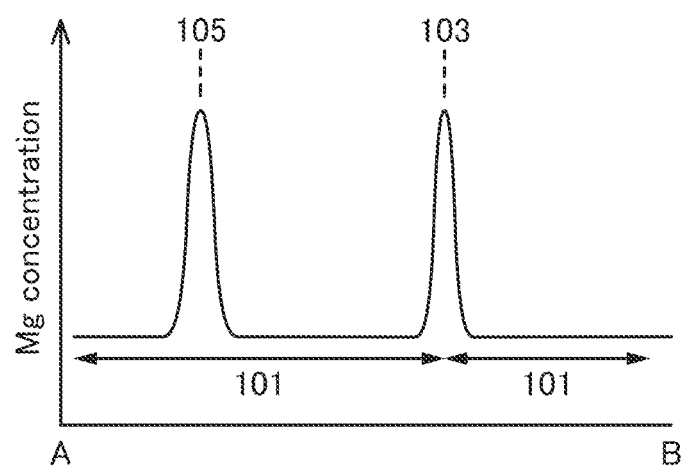
Figure 2C:
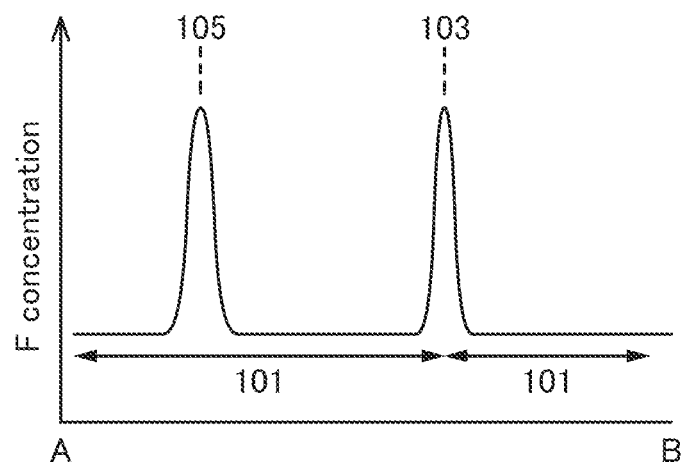

FIG. 2(B) and FIG. 2(C) respectively show an example of the magnesium concentration distribution and an example of the fluorine concentration distribution along the dashed-dotted line A1-A2 of the positive electrode active material particle 100 illustrated in FIG. 2(A). In FIG. 2(B) and FIG. 2(C), the horizontal axis represents the distance of the dashed-dotted line A1-A2 in FIG. 2(A), and the vertical axis represents the magnesium concentration (Mg Concentration) and the fluorine concentration (F Concentration).

The crystal grain boundary 103 and the periphery of the crystal grain boundary 103 include a region where the concentrations of fluorine and magnesium are higher than those in the crystal grain 101. The crystal defect 105 also includes a region with high concentrations of magnesium and fluorine in some cases. Note that in FIG. 2(B) and FIG. 2(C), the crystal grain boundary 103 has, but is not limited to, the same concentration as that of the crystal defect 105. The shapes of the magnesium and fluorine concentration distributions are not limited to those illustrated in FIG. 2(B) and FIG. 2(C).

Here, the number of transition metal atoms in the crystal grain 101 is denoted as Tr-Metal. The number of transition metal atoms in the crystal grain 101 (Tr-Metal) refers to the total number of atoms of each transition metal included in the crystal grain 101.

The positive electrode active material particle 100 preferably includes a region where the ratio of the number of magnesium atoms in the crystal grain boundary 103 to the number of transition metal atoms in the crystal grain 101 (Mg/Tr-Metal) is greater than or equal to 0.010 and less than or equal to 0.50. Further preferably, the positive electrode active material particle 100 includes a region where the Mg/Tr-Metal is greater than or equal to 0.020 and less than or equal to 0.30. Still further preferably, the positive electrode active material particle 100 includes a region where the Mg/Tr-Metal is greater than or equal to 0.030 and less than or equal to 0.20. The Mg/Tr-Metal in the above ranges contributes to a reduction in deterioration of the positive electrode active material. That is, deterioration of the power storage device can be inhibited. In addition, a highly safe power storage device can be achieved.

Note that in this specification and the like, the transition metal refers to an element belonging to Group 3 to Group 12 in the periodic table. The group numbers are based on the periodic table including classification of the first to $18^{th}$ groups, which is defined by International Union of Pure and Applied Chemistry (IUPAC) nomenclature of inorganic chemistry (revision 1989).

In general, the repetition of charge and discharge of a power storage device causes the following side reactions: dissolution of a transition metal such as cobalt and manganese from a positive electrode active material particle included in the power storage device into an electrolyte solution, release of oxygen, and an unstable crystal structure, such that deterioration of the positive electrode active material particle proceeds in some cases. The deterioration of the positive electrode active material particle might reduce the capacity of the power storage device, for example, thereby promoting the deterioration of the power storage device. Note that in this specification and the like, a chemical or structural change of the positive electrode active material particle, such as dissolution of a transition metal from a positive electrode active material particle into an electrolyte solution, release of oxygen, and an unstable crystal structure, is referred to as deterioration of the positive electrode active material particle in some cases. In this specification and the like, a decrease in the capacity of the power storage device is referred to as deterioration of the power storage device in some cases.

A metal dissolved from the positive electrode active material particle is reduced at a negative electrode and precipitated, which might inhibit the electrode reaction of the negative electrode. The precipitation of the metal in the negative electrode promotes deterioration such as a decrease in capacity in some cases.

A crystal lattice of the positive electrode active material particle expands and contracts with insertion and extraction of lithium due to charge and discharge, thereby undergoing strain and a change in volume in some cases. The strain and change in volume of the crystal lattice cause cracking of the positive electrode active material particle, which might promote deterioration such as a decrease in capacity. The cracking of the positive electrode active material particle originates from a crystal grain boundary in some cases.

When the temperature within the power storage device turns high and oxygen is released from the positive electrode active material particle, the safety of the power storage device might be adversely affected. In addition, the release of oxygen might change the crystal structure of the positive electrode active material particle and promote deterioration such as a decrease in capacity. Note that oxygen is sometimes released from the positive electrode active material particle by insertion and extraction of lithium due to charge and discharge.

In contrast, magnesium oxide is a material with chemical and structural stability. In a power storage device such as a lithium-ion secondary battery, magnesium oxide itself included in a positive electrode active material particle is hardly involved in a battery reaction. That is, insertion and extraction of lithium hardly occur with magnesium oxide; thus, magnesium oxide itself is chemically and structurally stable even after charge and discharge.

The positive electrode active material particle 100 of one embodiment of the present invention, which includes magnesium oxide in the crystal grain boundary 103, is chemically and structurally stable and hardly undergoes a change in structure, a change in volume, and strain due to charge and discharge. In other words, the crystal structure of the positive electrode active material particle 100 is more stable and hardly changes even after repetition of charge and discharge. In addition, cracking of the positive electrode active material particle 100 can be inhibited, which is preferable because deterioration such as a reduction in capacity can be reduced. When the charging voltage increases and the amount of lithium in the positive electrode at the time of charging decreases, the crystal structure becomes unstable and is more likely to deteriorate. The crystal structure of the positive electrode active material particle 100 of one embodiment of the present invention is particularly preferable because it is more stable and can inhibit deterioration such as a reduction in capacity.

Since the positive electrode active material particle 100 of one embodiment of the present invention has a stable crystal structure, dissolution of a transition metal from the positive electrode active material particle can be inhibited, which is preferable because deterioration such as a reduction in capacity can be inhibited.

In the case where the positive electrode active material particle 100 of one embodiment of the present invention is cracked along a crystal grain boundary, a surface of the positive electrode active material particle after cracking includes magnesium oxide. In other words, a side reaction can be inhibited even in the cracked positive electrode active material and deterioration of the positive electrode active material can be reduced. That is, deterioration of the power storage device can be inhibited.

The positive electrode active material particle 100 of one embodiment of the present invention includes magnesium oxide in the crystal grain boundary 103, thereby inhibiting diffusion of oxygen included in the positive electrode active material particle 100 through the crystal grain boundary and suppressing release of oxygen from the positive electrode active material particle 100. The use of the positive electrode active material particle 100 can provide a highly safe power storage device.

In addition, the crystal defect 105 preferably includes magnesium oxide because the positive electrode active material particle 100 has a stable crystal structure.

The positive electrode active material particle 100 preferably includes a region where the ratio of the number of fluorine atoms in the crystal grain boundary 103 to the number of transition metal atoms in the crystal grain 101 (F/Tr-Metal) is greater than or equal to 0.020 and less than or equal to 1.00. Further preferably, the positive electrode active material particle 100 includes a region where the F/Tr-Metal is greater than or equal to 0.040 and less than or equal to 0.60. Still further preferably, the positive electrode active material particle 100 includes a region where the F/Tr-Metal is greater than or equal to 0.060 and less than or equal to 0.40. The F/Tr-Metal in the above ranges contributes to efficient segregation of magnesium in the crystal grain boundary and the periphery thereof. That is, deterioration of the positive electrode active material can be reduced. Deterioration of the power storage device can be inhibited. In addition, a highly safe power storage device can be achieved.

<Crystal Grain>

The crystal grain 101 included in the positive electrode active material particle 100 of one embodiment of the present invention includes lithium, a transition metal, and oxygen. For example, the crystal grain 101 includes a composite oxide containing lithium, a transition metal, and oxygen. As the transition metal, one or more of iron, cobalt, nickel, manganese, chromium, titanium, vanadium, and niobium can be used.

As the crystal grain 101, for example, a composite oxide with a layered rock-salt crystal structure or a spinel crystal structure can be used. Alternatively, a polyanionic positive electrode material can be used as the crystal grain 101. Examples of the polyanionic positive electrode material include a material with an olivine crystal structure and a material with a NASICON structure. Alternatively, a positive electrode material containing sulfur can be used as the crystal grain 101.

As the crystal grain 101, various composite oxides can be used. For example, a compound such as $LiFeO_2$, $LiCoO_2$, $LiNiO_2$, $LiMn_2O_4$, $Li_2MnO_3$, $V_2O_5$, $Cr_2O_5$, or $MnO_2$ can be used.

As the material with a layered rock-salt crystal structure, for example, a composite oxide represented by $LiMO_2$ can be used. The element M is preferably one or more elements selected from Co and Ni. $LiCoO_2$ is preferable because it has high capacity, stability in the air, and thermal stability to a certain extent, for example. As the element M, one or more elements selected from Al and Mn may be included in addition to one or more elements selected from Co and Ni.

For example, it is possible to use $LiNi_xMn_yCo_zO_w$ (x, y, and z are each ⅓ or a neighborhood thereof and w is 2 or a neighborhood thereof, for example). For example, it is possible to use $LiNi_xMn_yCo_zO_w$ (x is 0.8 or a neighborhood thereof, y is 0.1 or a neighborhood thereof, z is 0.1 or a neighborhood thereof, and w is 2 or a neighborhood thereof, for example). For example, it is possible to use $LiNi_xMn_yCo_zO_w$ (x is 0.5 or a neighborhood thereof, y is 0.3 or a neighborhood thereof, z is 0.2 or a neighborhood thereof, and w is 2 or a neighborhood thereof, for example). For example, it is possible to use $LiNi_xMn_yCo_zO_w$ (x is 0.6 or a neighborhood thereof, y is 0.2 or a neighborhood thereof, z is 0.2 or a neighborhood thereof, and w is 2 or a neighborhood thereof, for example). For example, it is possible to use $LiNi_xMn_yCo_zO_w$ (x is 0.4 or a neighborhood thereof, y is 0.4 or a neighborhood thereof, z is 0.2 or a neighborhood thereof, and w is 2 or a neighborhood thereof, for example).

The neighborhood is, for example, a value greater than 0.9 times and smaller than 1.1 times the predetermined value.

A material in which part of the transition metal and lithium included in the crystal grain 101 is replaced with one or more elements selected from Fe, Co, Ni, Cr, Al, Mg, and the like, or a material in which the crystal grain 101 is doped with one or more elements selected from Fe, Co, Ni, Cr, Al, Mg, and the like may be used for the crystal grain 101.

As the material with a spinel crystal structure, for example, a composite oxide represented by $LiM_2O_4$ can be used. It is preferable to contain Mn as the element M. For example, $LiMn_2O_4$ can be used. It is preferable to contain Ni in addition to Mn as the element M because the discharge voltage and the energy density of the secondary battery are improved in some cases. It is preferable to add a small amount of lithium nickel oxide ($LiNiO_2$ or $LiNi_{1-x}M_xO_2$ (M=Co, Al, or the like)) to a lithium-containing material with a spinel crystal structure which contains manganese, such as $LiMn_2O_4$, because the characteristics of the secondary battery can be improved.

The average diameter of primary particles of the positive electrode active material is preferably greater than or equal to 1 nm and less than or equal to 100 μm, further preferably greater than or equal to 50 nm and less than or equal to 50 μm, and still further preferably greater than or equal to 1 μm and less than or equal to 30 μm, for example. Furthermore, the specific surface area is preferably greater than or equal to 1 m²/g and less than or equal to 20 m²/g. Furthermore, the average diameter of secondary particles is preferably greater than or equal to 5 μm and less than or equal to 50 μm. Note that the average particle diameters can be measured with a particle diameter distribution analyzer or the like using a laser diffraction and scattering method or by observation with a scanning electron microscope (SEM) or a TEM. The specific surface area can be measured by a gas adsorption method.

A conductive material such as a carbon layer may be provided on the surface of the positive electrode active material. With the conductive material such as the carbon layer, the conductivity of the electrode can be increased. For example, the positive electrode active material can be coated with a carbon layer by mixing a carbohydrate such as glucose at the time of baking the positive electrode active material. As the conductive material, graphene, multi-graphene, graphene oxide (GO), or reduced graphene oxide (RGO) can be used. Note that RGO refers to a compound obtained by reducing graphene oxide (GO), for example.

A layer containing one or more of an oxide and a fluoride may be provided on a surface of the positive electrode active material. The oxide may have a composition different from that of the crystal grain 101. The oxide may have the same composition as the crystal grain 101.

As the polyanionic positive electrode material, for example, a composite oxide containing oxygen, an element X, a metal A. and a metal M can be used. The metal M is one or more elements selected from Fe, Mn. Co, Ni. Ti, V, and Nb, the metal A is one or more elements selected from Li. Na. and Mg, and the element X is one or more elements selected from S, P, Mo, W, As, and Si.

As the material with an olivine crystal structure, for example, a composite material (general formula LiMPO$_4$ (M is one or more of Fe(II), Mn(II), Co(II), and Ni(II))) can be used. Typical examples of the general formula LiMPO$_4$ are lithium compounds such as LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<, and 0<i<1).

In particular, LiFePO$_4$ is preferable because it meets requirements with balance for the positive electrode active material, such as safety, stability, high capacity density, and the existence of lithium ions that can be extracted in initial oxidation (charging).

The average diameter of primary particles of the positive electrode active material with an olivine crystal structure is preferably greater than or equal to 1 nm and less than or equal to 20 μm, further preferably greater than or equal to 10 nm and less than or equal to 5 μm, and still further preferably greater than or equal to 50 nm and less than or equal to 2 μm, for example. Furthermore, the specific surface area is preferably greater than or equal to 1 m$^2$/g and less than or equal to 20 m$^2$/g. Furthermore, the average diameter of secondary particles is preferably greater than or equal to 5 μm and less than or equal to 50 μm.

Alternatively, a composite material such as general formula Li$_{(2-j)}$MSiO$_4$ (M is one or more of Fe(II), Mn(II), Co(II), and Ni(II); 0≤j≤2) may be used. Typical examples of the general formula Li$_{(2-j)}$MSiO$_4$ are Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1). Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a nasicon compound represented by a general formula A$_x$M$_2$(XO$_4$)$_3$ (A=Li, Na, or Mg, M=Fe, Mn, Ti, V, or Nb, X=S. P. Mo, W, As, or Si) can be used. Examples of the nasicon compound are Fe$_2$(MnO$_4$)$_3$, Fe$_2$(SO$_4$)$_3$, and Li$_3$Fe$_2$(PO$_4$)$_3$. Further alternatively, a compound represented by a general formula Li$_2$MPO$_4$F, Li$_2$MP$_2$O$_7$, or Li$_5$MO$_4$ (M=Fe or Mn) can be used as the crystal grain 101.

A perovskite fluoride such as NaFeF$_3$ and FeF$_3$, a metal chalcogenide (a sulfide, a selenide, or a telluride) such as TiS$_2$ and MoS$_2$, an oxide with an inverse spinel crystal structure such as LiMVO$_4$, a vanadium oxide (V$_2$O$_5$, V$_6$O$_{13}$, LiV$_3$O$_8$, or the like), a manganese oxide, an organic sulfur compound, or the like can be used as the crystal grain 101.

A borate-based positive electrode material represented by a general formula LiMBO$_3$ (M is one or more of Fe(II), Mn(II), and Co(II)) can be used as the crystal grain 101.

As the crystal grain 101, for example, a solid solution obtained by combining two or more composite oxides can be used. A solid solution of LiMaO$_2$ and Li$_2$MbO$_3$ (M$_a$ and M$_b$ are independently one or more elements selected from the transition metals) is referred to as a lithium-excess oxide in some cases. For example, a solid solution of LiNi$_x$Mn$_y$Co$_z$O$_2$ (x, y, z>0, x+y+z=1) and Li$_2$MnO$_3$ can be used as the crystal grain 101.

As the crystal grain 101, a lithium-manganese composite oxide represented by a composition formula Li$_a$Mn$_b$M$_c$O$_d$ can be used. Here, the element M is preferably a metal element other than lithium and manganese, or silicon or phosphorus, further preferably nickel. Furthermore, in the case where the whole particle of a lithium-manganese composite oxide is measured, it is preferable to satisfy the following at the time of discharging: 0<a/(b+c)<2; c>0; and 0.26≤(b+c)/d<0.5. To achieve a high capacity, the surface portion and the middle portion of the lithium-manganese composite oxide preferably include regions with different crystal structures, crystal orientations, or oxygen contents. In order that such a lithium-manganese composite oxide can be obtained, for example, 1.6≤a≤1.848, 0.19≤c/b≤0.935, and 2.5≤d≤3 are preferably satisfied. Furthermore, it is particularly preferable to use a lithium-manganese composite oxide represented by a composition formula Li$_{1.68}$Mn$_{0.8062}$Ni$_{0.318}$O$_3$. In this specification and the like, a lithium-manganese composite oxide represented by a composition formula Li$_{1.68}$Mn$_{0.8062}$Ni$_{0.318}$O$_3$ refers to a lithium-manganese composite oxide formed at a ratio (molar ratio) of the amounts of raw materials of Li$_2$CO$_3$:MnCO$_3$:NiO=0.84:0.8062:0.318. Although this lithium-manganese composite oxide is represented by a composition formula Li$_{1.68}$Mn$_{0.8062}$Ni$_{0.318}$O$_3$, the composition might deviate from this.

Note that the composition of metal, silicon, phosphorus, and other elements in the whole particle of a lithium-manganese composite oxide can be measured with, for example, an inductively coupled plasma mass spectrometer (ICP-MS). The composition of oxygen in the whole particle of a lithium-manganese composite oxide can be measured by, for example, energy dispersive X-ray spectroscopy (EDX). Alternatively, the composition can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one element selected from chromium, cobalt, aluminum, nickel, iron, magnesium, molybdenum, zinc, indium, gallium, copper, titanium, niobium, silicon, phosphorus, and the like.

Instead of lithium, sodium, potassium, strontium, barium, beryllium, or the like may be used as carrier ions. For example, a sodium-containing layered oxide can be used.

As the material containing sodium, for example, an oxide containing sodium, such as NaFeO$_2$, Na$_{2/3}$[Fe$_{1/2}$Mn$_{1/2}$]O$_2$, Na$_{2/3}$[Ni$_{1/3}$Mn$_{2/3}$]O$_2$, Na$_2$Fe$_2$(SO$_4$)$_3$, Na$_3$V$_2$(PO$_4$)$_3$, Na$_2$FePO$_4$F, NaVPO$_4$F, NaMPO$_4$ (M is one or more of Fe(II), Mn(II), Co(II), and Ni(II)), Na$_2$FePO$_4$F, or Na$_4$Co$_3$(PO$_4$)$_2$P$_2$O$_7$, can be used.

As the positive electrode active material, a lithium-containing metal sulfide can be used. Examples of the lithium-containing metal sulfide are Li$_2$TiS$_3$ and Li$_3$NbS$_4$.

Figure 1C:
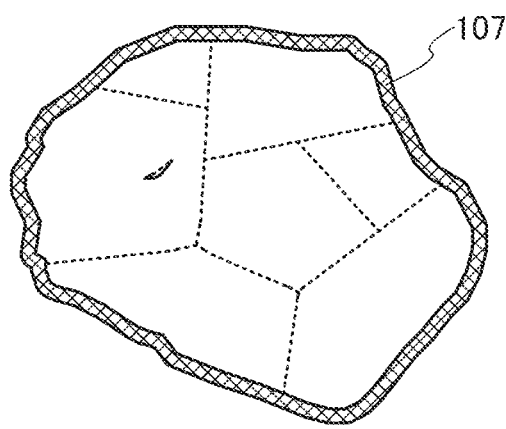

Although the example in which the positive electrode active material particle 100 includes the crystal grain 101 and the crystal grain boundary 103 has been described so far, one embodiment of the present invention is not limited thereto. For example, as illustrated in FIG. 1(C), the positive electrode active material particle 100 may include a region 107. The region 107 can be provided, for example, so as to be in contact with at least a part of the crystal grain 101. The region 107 may be a coating film containing carbon such as graphene compounds or may be a coating film containing lithium or an electrolyte decomposition product. When the region 107 is a coating film containing carbon, it is possible to increase the conductivity between the positive electrode active particles 100 and between the positive electrode active material particle 100 and a current collector. In the case where the region 107 is a coating film having decomposition products of lithium or an electrolyte solution, over-reaction with the electrolyte solution can be inhibited, and cycle characteristics can be improved when used for a secondary battery.

When the particle size of the positive electrode active material particle 100 is too large, lithium diffusion is unlikely to occur. In contrast, a too small particle size arises problems such as a reduction in the density of the electrode and over-reaction with an electrolyte solution. For these reasons, the particle size is preferably 1 μm or more and 100 μm or less, further preferably 10 μm or more and 70 μm or less. Here, the particle size means a volume-based cumulative 50% value (D50), for example.

[Manufacturing Method of Positive Electrode Active Material]

A manufacturing method of the positive electrode active material particle 100 including the crystal grain 101 and the crystal grain boundary 103 is described with reference to FIG. 3. The crystal grain 101 includes a composite oxide containing lithium, a transition metal (M), and oxygen. The crystal grain boundary 103 includes magnesium, fluorine, and oxygen.

First, starting materials are prepared (Step S11). Specifically, a lithium source, a transition metal (M) source, a magnesium source, and a fluorine source were individually weighed.

As the lithium source, for example, lithium carbonate, lithium fluoride, lithium hydroxide, or lithium oxide can be used.

As the transition metal (M) source, for example, one of more of a cobalt compound, a nickel compound, a manganese compound, an iron compound, a vanadium compound, a titanium compound, a molybdenum compound, a zinc compound, an indium compound, a gallium compound, a copper compound, a niobium compound, and the like can be used.

As the cobalt compound, for example, one or more of cobalt oxide, cobalt hydroxide, cobalt oxyhydroxide, cobalt carbonate, cobalt oxalate, cobalt sulfate, and the like can be used.

As the nickel compound, for example, one or more of nickel oxide, nickel hydroxide, nickel carbonate, nickel chloride, nickel bromide, nickel iodide, nickel sulfate, nickel nitrate, nickel formate and the like can be used.

As the manganese compound, for example, one or more of manganese oxide, manganese hydroxide, manganese carbonate, manganese chloride, manganese iodide, manganese sulfate, manganese nitrate and the like can be used.

As the iron compound, for example, one or more of iron fluoride, iron chloride, iron bromide, iron iodide, iron sulfate, iron oxalate, iron acetate and the like can be used.

As the vanadium compound, for example, one or more of vanadium oxide, vanadium hydroxide, vanadium chloride, and vanadium sulfate, and the like can be used.

As the titanium compound, for example, one or more of titanium fluoride, titanium chloride, titanium bromide, titanium iodide, titanium oxide, titanium sulfide, titanium sulfate, and the like can be used.

As the molybdenum compound, for example, one or more of molybdenum oxide, diammonium molybdate, phosphomolybdic acid, and the like can be used.

As the zinc compound, for example, one or more of zinc oxide, zinc hydroxide, zinc nitrate, zinc sulfate, zinc chloride, zinc carbonate, and the like can be used.

As the indium compound, for example, one or more of indium chloride, indium sulfate, indium nitrate, indium oxide, indium hydroxide, and the like can be used.

As the gallium compound, for example, one or more of gallium chloride, gallium fluoride, and the like can be used.

As the copper compound, for example, one or more of copper sulfate, copper chloride, copper nitrate, and the like can be used.

As the niobium compound, for example, one or more of niobium oxide, niobium chloride, niobium oxide sulfate, niobium fluoride, and the like can be used.

As the magnesium source, for example, one or more of magnesium oxide, magnesium fluoride, magnesium hydroxide, magnesium carbonate, and the like can be used.

As the fluorine source, for example, one or more of lithium fluoride and magnesium fluoride can be used. That is, lithium fluoride can be used as both a lithium source and a fluorine source, and magnesium fluoride can be used as both a magnesium source and a fluorine source.

In the case where the crystal grain 101 includes the transition metal (M) and a metal other than the transition metal, the metal source other than the transition metal is weighed. In the case where aluminum is included as the metal other than the transition metal, an aluminum compound can be used as the metal source, for example. As the aluminum compound, one or more of aluminum oxide, aluminum hydroxide, aluminum carbonate, aluminum chloride, aluminum iodide, aluminum sulfate, aluminum nitrate, and the like can be used.

The ratio between the number of transition metal (M) atoms and the number of magnesium atoms in the raw material is described. The ratio m of the number of magnesium atoms Mg(r) to the number of transition metal (M) atoms M(r) in the raw material is preferably greater than or equal to 0.0050 and less than or equal to 0.050, i.e., $0.0050 \leq m \leq 0.050$ in the number of transition metal (M) atoms M(r): the number of magnesium atoms Mg(r)=1.0:m. Furthermore, the ratio m of the number of magnesium atoms to the number of transition metal atoms is preferably 0.010 or a neighborhood thereof. With the above atomic ratio, the positive electrode active material including magnesium in the crystal grain boundary 103 can be produced effectively. Note that in the case where a plurality of kinds of transition metals are used as raw materials, the calculation may be performed with the total number of atoms of the plurality of kinds of transition metals as the aforementioned number of transition metal atoms M(r).

The neighborhood is, for example, a value greater than 0.9 times and smaller than 1.1 times the predetermined value.

The ratio between the number of magnesium atoms and the number of fluorine atoms in the raw material is described. The ratio n of the number of fluorine atoms F(r) to the number of magnesium atoms Mg(r) in the raw material is preferably greater than or equal to 1.50 and less than or equal to 4.0, i.e., $1.50 \leq n \leq 4.0$ in the number of magnesium atoms Mg(r): the number of fluorine atoms F(r)=1.0:n. Furthermore, the ratio n of the number of fluorine atoms to the number of magnesium atoms is preferably 2.0 or a neighborhood thereof. With the above atomic ratio, magnesium and fluorine can be segregated in the crystal grain boundary 103 effectively.

The ratio among the atomic numbers of the transition metal, magnesium, and fluorine in the raw material can be represented by Formula 1. Here, m represents the ratio of the number of magnesium atoms Mg(r) to the number of transition metal atoms M(r). As described above, $0.0050 \leq m \leq 0.050$ is preferable and m=0.010 or a neighborhood thereof is further preferable. The ratio of the number of fluorine atoms F(r) to the number of magnesium atoms Mg(r) is denoted by n. As described above, 1.50<n<4.0 is preferable and n=2.0 or a neighborhood thereof is further preferable.

[Formula 1]

$$M(r):Mg(r):F(r)=1.0: m:m\times n \quad (1)$$

In the case where $LiCoO_2$ is fabricated as the positive electrode active material particle, the raw materials have the following ratio as an example. The ratio m of the number of magnesium atoms to the number of cobalt atoms is assumed to be 0.010. The ratio n of the number of fluorine atoms to the number of magnesium atoms is assumed to be 2.0. According to Formula 1, the ratio among the atomic numbers of the raw materials, cobalt, magnesium, and fluorine can be Co:Mg:F=1.0:0.010:0.020.

Note that the aforementioned ratio of the atomic numbers of the raw material does not always corresponds to the composition of the positive electrode active material particle 100 obtained by synthesis.

The molar ratio of the lithium compound and the transition metal (M) compound in the raw material may be a value corresponding to the composition of a presumed crystal grain. For example, in the case where the lithium composition of the obtained crystal grain is small relative to the molar ratio of the lithium compound in the raw material, the molar ratio of the lithium compound in the raw material may be increased.

Next, the weighed starting materials are mixed (Step S12). For example, a ball mill, a bead mill, or the like can be used for the mixing.

Next, a first heating is performed on the materials mixed in Step S12 (Step S13). The first heating is preferably performed at higher than or equal to 800° C. and lower than or equal to 1050° C., further preferably at higher than or equal to 900° C. and lower than or equal to 1000° C. The heating time is preferably greater than or equal to 2 hours and less than or equal to 20 hours. The first heating is preferably performed in an oxygen-containing atmosphere. For example, the first heating is preferably performed in an atmosphere such as dry air.

By the first heating in Step S13, a composite oxide containing lithium and a transition metal (M), that is included in the crystal grain 101, can be synthesized. Also, by the first heating, part of the magnesium and fluorine contained in the starting material is segregated in the superficial portion of the composite oxide containing lithium and a transition metal (M). Note that another part of the magnesium and fluorine at this stage forms a solid solution in the composite oxide containing lithium and a transition metal (M).

Next, the material heated in Step S13 is cooled to room temperature (Step S14). After the cooling, the synthesized material is preferably subjected to crushing treatment, in which case the size of the positive electrode active material particle 100 can be reduced.

Next, a second heating is performed on the material cooled in Step S14 (Step S15). The second heating is preferably performed for a holding time at a specified temperature of 100 hours or shorter, further preferably 1 hour or longer and 70 hours or shorter, further preferably 2 hours or longer and 50 hours or shorter, and still further preferably 2 hours or longer and 35 hours or shorter. The specified temperature is preferably higher than or equal to 500° C. and lower than or equal to 1200° C., further preferably higher than or equal to 700° C. and lower than or equal to 1000° C., and still further preferably about 800° C. The second heating is performed preferably in an oxygen-containing atmosphere. For example, the second heating is preferably performed in an atmosphere such as dry air.

The second heating in Step S15 promotes segregation of the magnesium and fluorine contained in the starting material on the crystal grain boundary.

Finally, the material heated in S15 is cooled to room temperature and collected (Step S16), so that the positive electrode active material particle 100 can be obtained.

As described above, when the magnesium source and the fluorine source are mixed as the starting material, the positive electrode active material including magnesium oxide in the crystal grain boundary 103 can be effectively fabricated.

Furthermore, when the magnesium source and the fluorine source are mixed as the starting material, magnesium is likely to be segregated in the crystal grain boundary 103 in some cases.

When fluorine is substituted for oxygen bonded to magnesium, magnesium easily moves around the substituted fluorine in some cases.

Adding magnesium fluoride to magnesium oxide may lower the melting point. When the melting point decreases, atoms are likely to move in heat treatment.

Fluorine has higher electronegativity than oxygen. Thus, even in a stable compound such as magnesium oxide, when fluorine is added, uneven charge distribution occurs and thus a bond between magnesium and oxygen is weakened in some cases.

For these reasons, when the magnesium source and the fluorine source are mixed as the starting material, magnesium is likely to move and be segregated in the crystal grain boundary 103 in some cases.

By using the positive electrode active material particle 100 described in this embodiment, a highly safe secondary battery with little deterioration can be provided. This embodiment can be implemented in appropriate combination with any of the other embodiments.

Embodiment 2

In this embodiment, examples of materials which can be used for a secondary battery including the positive electrode active material particle 100 described in the above embodiment are described. In this embodiment, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer includes a positive electrode active material particle. The positive electrode active material layer may contain a conductive additive and a binder.

As the positive electrode active material particle, the positive electrode active material particle 100 described in the above embodiment can be used. When the above-described positive electrode active material particle 100 is used, a highly safe secondary battery with little deterioration can be obtained.

Examples of the conductive additive include a carbon material, a metal material, and a conductive ceramic material. Alternatively, a fiber material may be used as the conductive additive. The content of the conductive additive with respect to the total amount of the active material layer is preferably greater than or equal to 1 wt % and less than or equal to 10 wt %, further preferably greater than or equal to 1 wt % and less than or equal to 5 wt %.

A network for electric conduction can be formed in the electrode by the conductive additive. The conductive additive also allows maintaining of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber and isotropic pitch-based carbon fiber. In addition, carbon nanofiber, carbon nanotube, or the like can be used as carbon fiber. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. For this reason, it is preferable to use a graphene compound as the conductive additive because the area where the active material and the conductive additive are in contact with each other can be increased or electric resistance can be reduced in some cases. Here, it is particularly preferable to use, for example, graphene, multilayer graphene, or reduced graphene oxide (hereinafter, RGO) as a graphene compound. Note that RGO refers to a compound obtained by reducing graphene oxide (GO), for example.

In the case where an active material particle with a small particle diameter (e.g., 1 µm or less) is used, the specific surface area of the active material particle is large and thus more conductive paths for connecting the active material particles are needed. Thus, the amount of conductive additive tends to increase and the supported amount of active material tends to decrease relatively. When the supported amount of active material decreases, the capacity of the secondary battery also decreases. In such a case, a graphene compound that can efficiently form a conductive path even in a small amount is particularly preferably used as the conductive additive because the supported amount of active material does not decrease.

A cross-sectional structure example of an active material layer 200 containing a graphene compound as a conductive additive is described below.

Figure 4A:
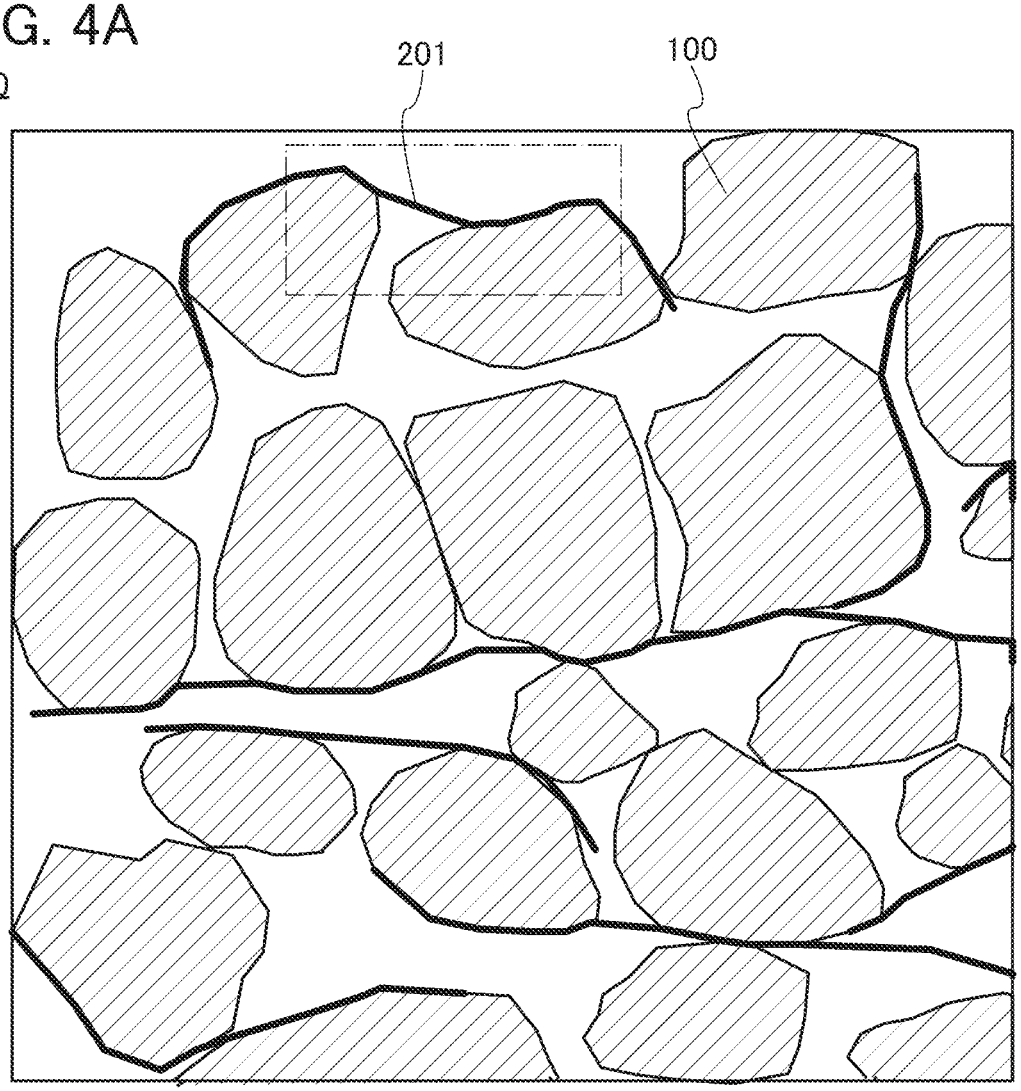
FIGS. 4A and 4B Cross-sectional views of an active material layer using a graphene compound as a conductive additive.
Figure 4B:
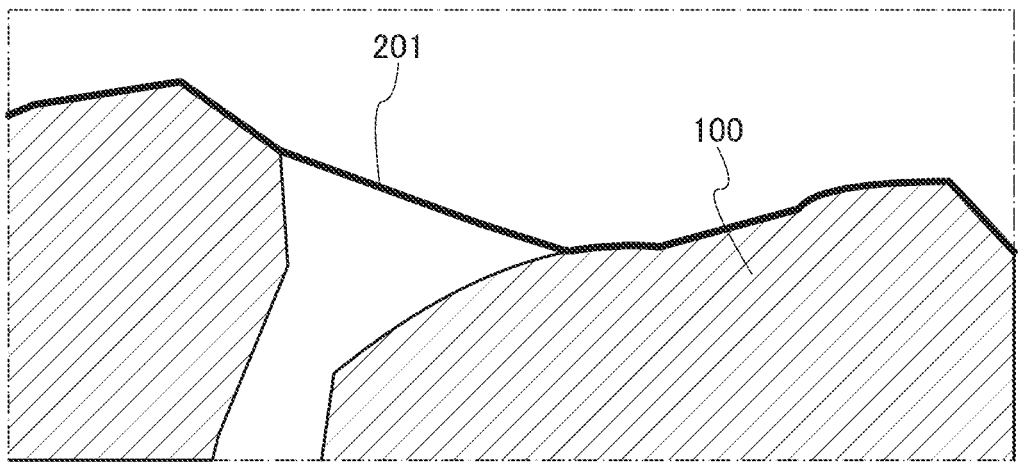

FIG. 4(A) shows a longitudinal cross-sectional view of the active material layer 200. The active material layer 200 includes the positive electrode active material particle 100, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

In the longitudinal cross section of the active material layer 200, as illustrated in FIG. 4(A), the sheet-like graphene compounds 201 are dispersed substantially uniformly in the active material layer 200. The graphene compounds 201 are schematically shown by thick lines in FIG. 4(A) but are actually thin films each having a thickness corresponding to the thickness of a single layer or a multi-layer of carbon molecules. The plurality of graphene compounds 201 are formed in such a way as to wrap or cover the plurality of positive electrode active material particles 100 or adhere to the surfaces of the plurality of positive electrode active material particles 100, so that the graphene compounds 201 make surface contact with the positive electrode active material particles 100.

Here, when the plurality of graphene compounds are bonded to each other, a net-like graphene compound sheet (hereinafter referred to as a graphene compound net or a graphene net) can be formed. The graphene net covering the active material can function as a binder for bonding active materials. The amount of a binder can thus be reduced, or the binder does not have to be used, increasing the proportion of the active material in the electrode volume or weight. That is to say, the capacity of the power storage device can be increased.

Here, it is preferable that graphene oxide be used as the graphene compounds 201 and mixed with an active material to form a layer to be the active material layer 200, and then reduction be performed. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced, hence, the graphene compounds 201 remaining in the active material layer 200 partly overlap with each other and are dispersed such that surface contact is made, thereby forming a three-dimensional conductive path. Note that graphene oxide can be reduced either by heat treatment or with the use of a reducing agent, for example.

Unlike a conductive additive in the form of particles, such as acetylene black, which makes point contact with an active material, the graphene compound 201 is capable of making low-resistance surface contact; accordingly, the electrical conduction between the positive electrode active material particles 100 and the graphene compound 201 can be improved with a smaller amount of the graphene compound 201 than that of a normal conductive additive. This increases the proportion of the positive electrode active material particle 100 in the active material layer 200. Accordingly, the discharge capacity of the power storage device can be increased.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

As the binder, for example, water-soluble polymers are preferably used. As the water-soluble polymers, a polysaccharide and the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used. It is more preferred that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer may be used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder such as styrene-butadiene rubber in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group, and because of the functional groups, polymers are expected to interact with each other and cover an active material surface in a large area.

In the case where the binder covering or being in contact with the active material surface forms a film, the film is expected to serve as a passivation film to suppress the decomposition of the electrolyte solution. Here, the passivation film refers to a film without electric conductivity or a film with extremely low electric conductivity, and can inhibit the decomposition of an electrolyte solution at a potential at which a battery reaction occurs in the case where the passivation film is formed on the active material surface, for example. It is preferred that the passivation film can conduct lithium ions while inhibiting electric conduction.

<Positive Electrode Current Collector>

For the positive electrode current collector, a material that has high conductivity, such as a metal like stainless steel, gold, platinum, aluminum, or titanium, or an alloy thereof, can be used. It is preferred that a material used for the positive electrode current collector not dissolve at the potential of the positive electrode. It is also possible to use an aluminum alloy to which an element that improves heat resistance, such as silicon, titanium, neodymium, scandium, or molybdenum, is added. The positive electrode current collector can also be formed with a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of 5 μm to 30 μm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element which enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon; in particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sns$, $Ag_3Sn$, $Ag_3Sb$, NizMnSb, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like. SiO refers, for example, to silicon monoxide. SiO can alternatively be expressed as SiOx. Here, x is preferably 1 or an approximate value of 1. For example, x is preferably 0.2 or more and 1.5 or less, further preferably 0.3 or more and 1.2 or less.

As the carbon-based material, graphite, graphitizing carbon (soft carbon), non-graphitizing carbon (hard carbon), a carbon nanotube, graphene, carbon black, and the like can be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. Li/Li) when lithium ions are intercalated into the graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^r$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material. For example, a transition metal oxide which does not form an alloy with lithium, such as cobalt oxide (CoO), nickel oxide (NiO), and iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, Cu N, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material that is not alloyed with a carrier ion such as lithium is preferably used for the negative electrode current collector.

[Electrolyte Solution]

The electrolyte solution contains a solvent and an electrolyte. As a solvent of the electrolyte solution, an aprotic organic solvent is preferably used, for example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a phosphoric ester compound containing fluorine or a carbonic ester compound containing fluorine, which has non-flammability, is used as a solvent of the electrolyte solution, a power storage device can be prevented from exploding or catching fire, for example. An example of the phosphoric ester compound containing fluorine is tris(2,2,2-trifluoroethyl)phosphate (TFEP). An example of the carbonic ester compound containing fluorine is bis(2,2,2-trifluoroethyl)carbonate (TFEC).

When a gelled high-molecular material is used as the solvent of the electrolyte solution, safety against liquid leakage and the like is improved. Furthermore, a secondary battery can be thinner and more lightweight. Typical examples of gelled high-molecular materials include a silicone gel, an acrylic gel, an acrylonitrile gel, a polyethylene oxide-based gel, a polypropylene oxide-based gel, and a gel of a fluorine-based polymer.

When one or more kinds of ionic liquids (room temperature molten salts) which have non-flammability and non-volatility is used as a solvent of the electrolyte solution, a power storage device can be prevented from exploding or catching fire even when the power storage device internally shorts out or the internal temperature increases owing to overcharging or the like. An ionic liquid is made with a cation and an anion, and contains an organic cation and an anion.

Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as LiPFb, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2BI_2Cl_{12}$, $LiCF_3SO_3$, $LiC_4F_9SO_3$, $LiC(CF_3SO_2)_3$, $LiC(C_2FSO_2)_3$, $LiN(CF_3SO_2)_2$, $LiN(C_4F_9SO_2)(CF_3SO_2)$, and $LiN(C_2FsSO_2)_2$ can be used, or two or more of these lithium salts can be used in an appropriate combination in an appropriate ratio.

The electrolyte solution used for a storage device is preferably highly purified and contains a small amount of dust particles and elements other than the constituent elements of the electrolyte solution (hereinafter also simply referred to as impurities). Specifically, the weight ratio of impurities to the electrolyte solution is less than or equal to 1%, preferably less than or equal to 0.1%, and further preferably less than or equal to 0.01%.

Furthermore, vinylene carbonate, propane sultone (PS), tert-butylbenzene (TBB), fluoroethylene carbonate (FEC), lithium bis(oxalate)borate (LiBOB), a dinitrile compound such as succinonitrile or adiponitrile, triisopropoxy boroxine (TiPBx), sulfolane, hydrofluoroether (HFE), vinyl acetate (VA), or the like may be added to the electrolyte solution. The concentration of the added material is, for example, higher than or equal to 0.1 weight % and lower than or equal to 5 weight/with respect to the whole solvent.

Alternatively, a polymer gel electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As the gelled molecular, a silicone gel, an acrylic gel, an acrylonitrile gel, a polyethylene oxide-based gel, a polypropylene oxide-based gel, and a gel of a fluorine-based polymer can be used. Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP), can be used. The formed polymer may be porous.

Instead of the electrolyte solution, a solid electrolyte including an inorganic material such as a sulfide-based inorganic material or an oxide-based inorganic material, or the like, or a solid electrolyte including a high-molecular material such as a polyethylene oxide (PEO)-based high-molecular material, or the like may be used. When the solid electrolyte is used, a separator and a spacer are not necessary. Furthermore, since the battery can be entirely solidified, there is no possibility of liquid leakage to increase the safety of the battery dramatically.

[Separator]

The secondary battery preferably includes a separator. As the separator, for example, a fiber containing cellulose, such as paper; nonwoven fabric; a glass fiber; ceramics; a synthetic fiber containing nylon (polyamide), vinylon (polyvinyl alcohol-based fiber), polyester, acrylic, polyolefin, or polyurethane; or the like can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. As the ceramic-based material, for example, aluminum oxide particles or silicon oxide particles can be used. As the fluorine-based material, for example, PVDF or a polytetrafluoroethylene can be used. As the polyamide-based material, for example, nylon or aramid (meta-based aramid or para-based aramid) can be used.

Oxidation resistance is improved when the separator is coated with the ceramic-based material, so that deterioration of the separator in charging and discharging at high voltage can be inhibited and thus the reliability of the secondary battery can be improved. In addition, when the separator is coated with the fluorine-based material, the separator is easily brought into close contact with an electrode, resulting in high output characteristics. When the separator is coated with the polyamide-based material, in particular, aramid, heat resistance is improved to increase the safety of the secondary battery.

For example, both surfaces of a polypropylene film may be coated with a mixed material of aluminum oxide and aramid. Alternatively, a surface of the polypropylene film in contact with the positive electrode may be coated with the mixed material of aluminum oxide and aramid, and a surface of the polypropylene film in contact with the negative electrode may be coated with the fluorine-based material.

With the use of a separator having a multilayer structure, the capacity of the secondary battery per volume can be increased because the safety of the secondary battery can be maintained even when the total thickness of the separator is small.

Embodiment 3

In this embodiment, examples of the shape of a secondary battery including the positive electrode active material particle 100 described in the above embodiments are described. For the materials used for the secondary battery described in this embodiment, the description of the above embodiments can be referred to.

[Coin-Type Secondary Battery]

Figure 5A:
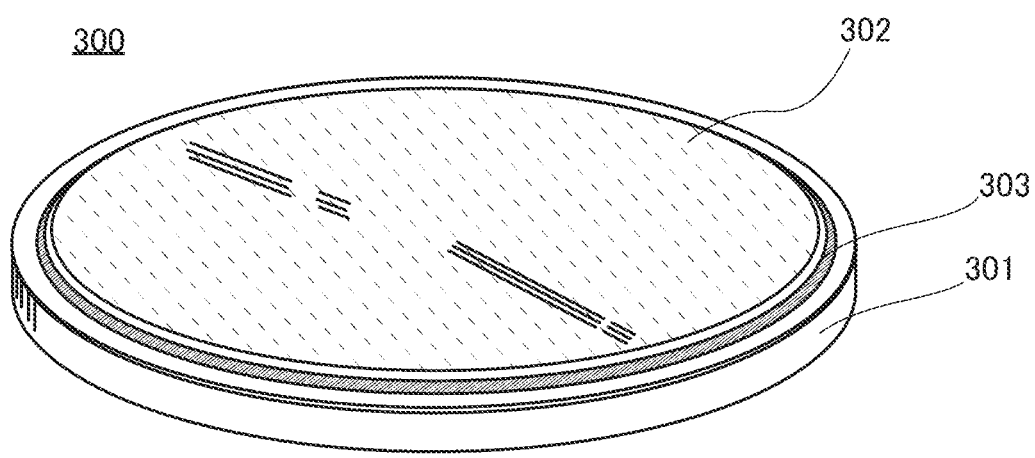
FIGS. 5A and 5B Diagrams illustrating a coin-type secondary battery.
Figure 5B:
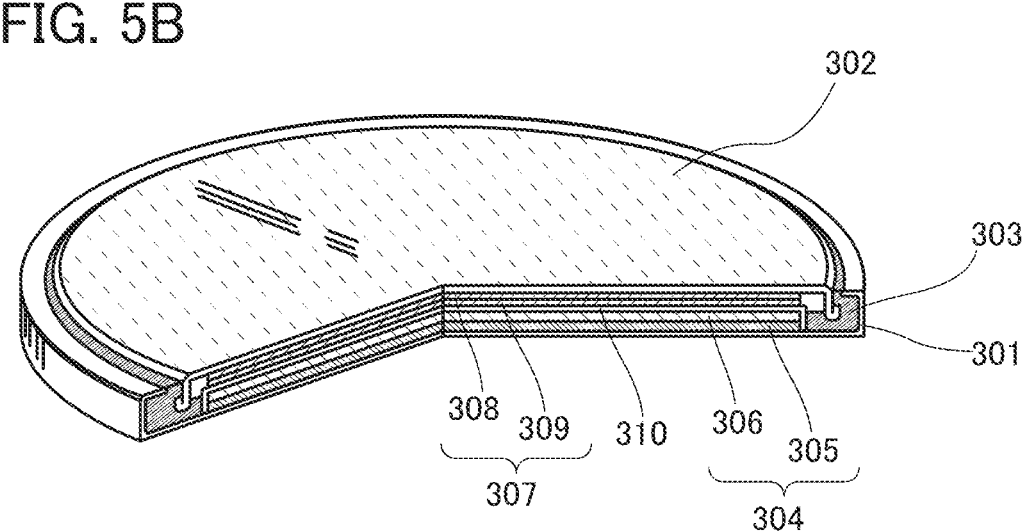

First, an example of a coin-type secondary battery is described. FIG. 5(A) is an external view of a coin-type (single-layer flat type) secondary battery, and FIG. 5(B) is a cross-sectional view thereof.

In a coin-type secondary battery 30X), a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 5(B), the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 can be manufactured.

When the positive electrode active material particle 100 described in the above embodiments is used in the positive electrode 304, the coin-type secondary battery 300 with little deterioration and high safety can be obtained.

[Cylindrical Secondary Battery]

An example of a cylindrical secondary battery will be described with reference to FIG. 6(A) to FIG. 6(D). A cylindrical secondary battery 600 illustrated in FIG. 6(A) includes, as illustrated in the cross-sectional schematic view of FIG. 6(B), a positive electrode cap (battery lid) 601 on the top surface and a battery can (outer can) 602 on the side and bottom surfaces. The positive electrode cap and the battery can (outer can) 602 are insulated from each other by a gasket (insulating packing) 610.

Inside the battery can 602 having a hollow cylindrical shape, a battery element in which a strip-like positive electrode 604 and a strip-like negative electrode 606 are wound with a separator 605 located therebetween is provided. Although not illustrated, the battery element is wound around a center pin. One end of the battery can 602 is close and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode of the cylindrical secondary battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery increases to over a predetermined threshold value. The PTC element 611, which serves as a thermally sensitive resistor whose resistance increases as temperature rises, limits the amount of current by increasing the resistance, thereby preventing abnormal heat generation. Barium titanate ($BaTiO_3$)-based semiconductor ceramic or the like can be used for the PTC element.

Figure 6A:
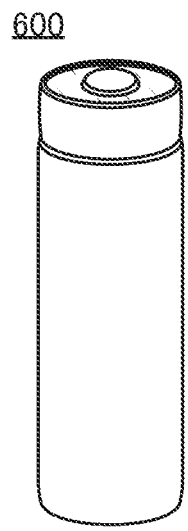
FIGS. 6A to 6D Diagrams illustrating a cylindrical secondary battery.
Figure 6B:
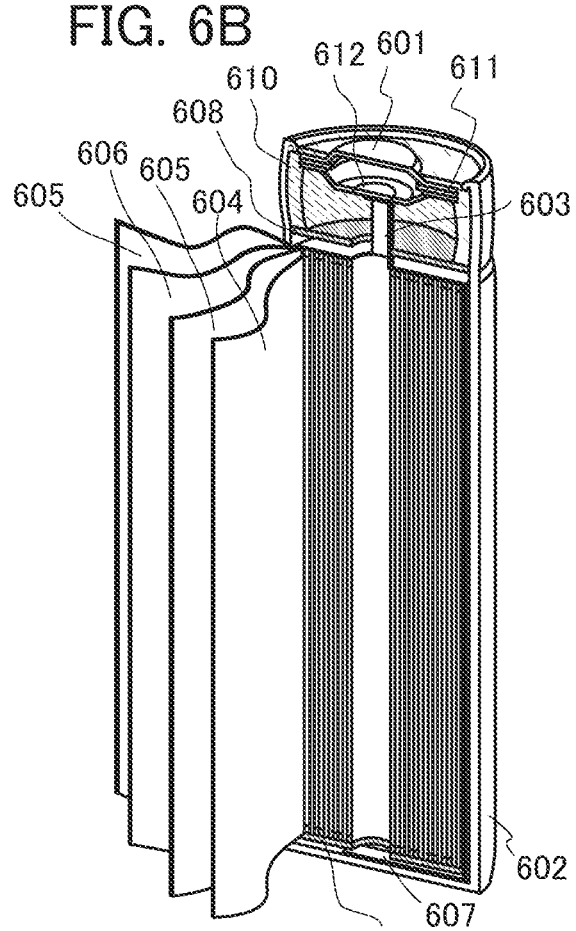
Figure 6C:
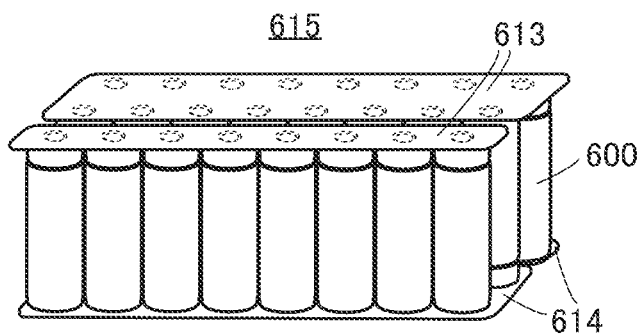

Alternatively, as illustrated in FIG. 6(C), a plurality of secondary batteries 600 may be sandwiched between a conductive plate 613 and a conductive plate 614 to form a module 615. The plurality of secondary batteries 600 may be connected parallel to each other, connected in series, or connected in series after being connected parallel to each other. With the module 615 including the plurality of secondary batteries 600, large electric power can be extracted.

Figure 6D:
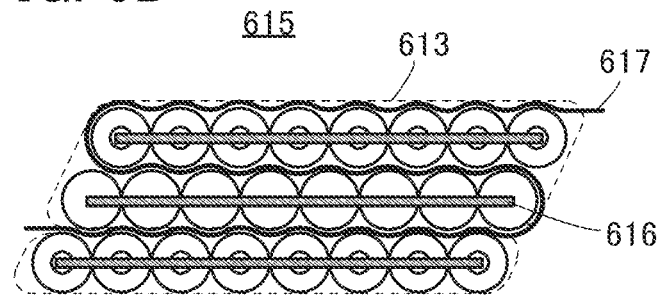

FIG. 6(D) is a top view of the module 615. The conductive plate 613 is shown by a dotted line for clarity of the drawing. As illustrated in FIG. 6(D), the module 615 may include a wiring 616 which electrically connects the plurality of secondary batteries 600 to each other. It is possible to provide the conductive plate 613 over the wiring 616 to overlap with each other. In addition, a temperature control device 617 may be provided between the plurality of secondary batteries 600. When the secondary batteries 600 are overheated, the temperature control device 617 can cool them, and when the secondary batteries 600 are cooled too much, the temperature control device 617 can heat them. Thus, the performance of the module 615 is not easily influenced by the outside air temperature.

When the positive electrode active material particle 100 described in the above embodiments is used in the positive electrode 604, the cylindrical secondary battery 600 with little deterioration and high safety can be obtained.

[Structural Examples of Power Storage Device]

Other structural examples of power storage devices will be described with reference to FIG. 7 to FIG. 11.

Figure 7A:
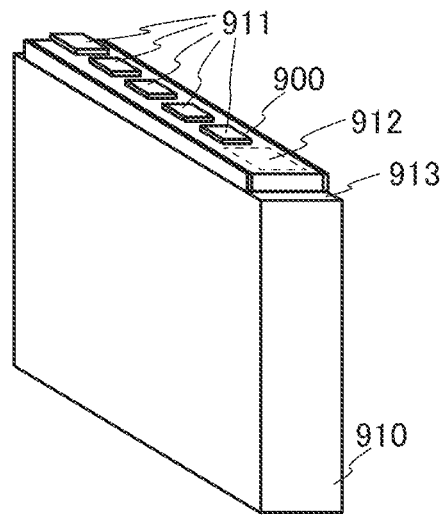
FIGS. 7A and 7B Diagrams illustrating an example of a secondary battery.
Figure 7B:
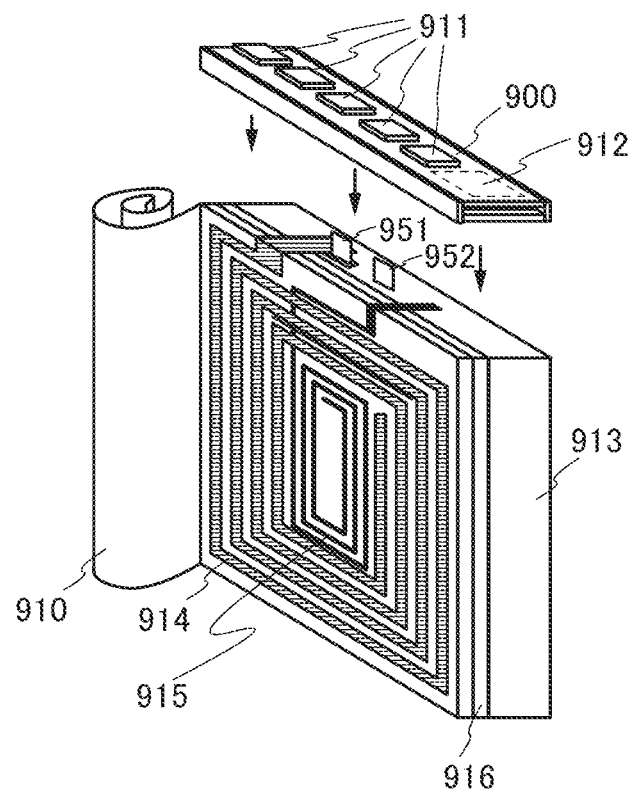

FIG. 7(A) and FIG. 7(B) are external views of a power storage device. The power storage device includes a circuit board 900 and a secondary battery 913. A label 910 is attached onto the secondary battery 913. The power storage device further includes a terminal 951, a terminal 952, an antenna 914, and an antenna 915 as illustrated in FIG. 7(B).

The circuit board 900 includes a terminal 911 and a circuit 912. The terminal 911 is connected to the terminal 951, the terminal 952, the antenna 914, the antenna 915, and the circuit 912. Note that a plurality of terminals 911 serving as a control signal input terminal, a power supply terminal, and the like may be provided.

The circuit 912 may be provided on the rear surface of the circuit board 900. Note that the shape of the antenna 914 and the antenna 915 is not limited to a coil shape and may be a linear shape or a plate shape. Further, a planar antenna, an aperture antenna, a traveling-wave antenna, an EH antenna, a magnetic-field antenna, or a dielectric antenna may be used. The antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the secondary battery 913, and the antenna 914 and the antenna 915. The layer 916 has a function of, for example, blocking an electromagnetic field from the secondary battery 913. As the layer 916, for example, a magnetic body can be used.

Note that the structure of the power storage device is not limited to that shown in FIG. 7.

For example, as shown in FIG. 8(A-1) and FIG. 8(A-2), two opposite surfaces of the secondary battery 913 illustrated in FIG. 7(A) and FIG. 7(B) may be provided with an antenna. FIG. 8(A-1) is an external view showing one side of the opposite surfaces, and FIG. 8(A-2) is an external view showing the other side of the opposite surfaces. For portions similar to those illustrated in FIG. 7(A) and FIG. 7(B), a description of the power storage device illustrated in FIG. 7(A) and FIG. 7(B) can be referred to as appropriate.

As illustrated in FIG. 8(A-1), the antenna 914 is provided on one of the opposite surfaces of the secondary battery 913 with the layer 916 located therebetween, and as illustrated in FIG. 8(A-2), the antenna 915 is provided on the other of the opposite surfaces of the secondary battery 913 with a layer 917 located therebetween. The layer 917 has a function of, for example, blocking an electromagnetic field from the secondary battery 913. As the layer 917, for example, a magnetic body can be used.

With the above structure, both the antenna 914 and the antenna 915 can be increased in size.

Alternatively, as illustrated in FIG. 8(B-1) and FIG. 8(B-2), two opposite surfaces of the secondary battery 913 in FIG. 7(A) and FIG. 7(B) may be provided with different types of antennas. FIG. 8(B-1) is an external view showing one side of the opposite surfaces, and FIG. 8(B-2) is an external view showing the other side of the opposite surfaces. For portions similar to those in FIG. 7(A) and FIG. 7(B), a description of the power storage device illustrated in FIG. 7(A) and FIG. 7(B) can be referred to as appropriate.

As illustrated in FIG. 8(B-1), the antenna 914 and the antenna 915 are provided on one of the opposite surfaces of the secondary battery 913 with the layer 916 interposed therebetween, and as illustrated in FIG. 8(B-2), an antenna 918 is provided on the other of the opposite surfaces of the secondary battery 913 with the layer 917 interposed therebetween. The antenna 918 has a function of, for example, communicating data with an external device. An antenna with a shape that can be applied to the antenna 914 and the antenna 915, for example, can be used as the antenna 918. As a system for communication using the antenna 918 between the power storage device and another device, a response method that can be used between the power storage device and another device, such as NFC, can be employed.

Figure 9A:
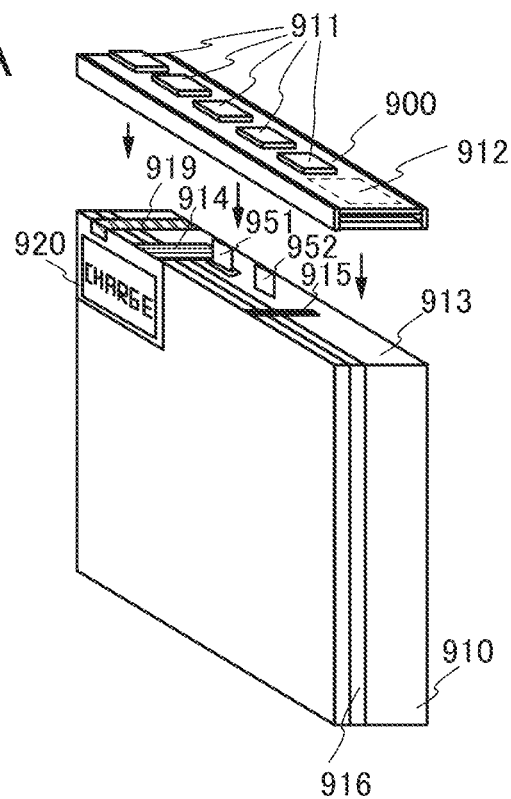
FIGS. 9A and 9B Diagrams illustrating an example of a secondary battery.

Alternatively, as illustrated in FIG. 9(A), the secondary battery 913 in FIG. 7(A) and FIG. 7(B) may be provided with a display device 920. The display device 920 is electrically connected to the terminal 911 via a terminal 919. It is possible that the label 910 is not provided in a portion where the display device 920 is provided. For portions similar to those in FIG. 7(A) and FIG. 7(B), a description of the power storage device illustrated in FIG. 7(A) and FIG. 7(B) can be referred to as appropriate.

The display device 920 can display, for example, an image showing whether charging is being carried out, an image showing the amount of stored power, or the like. As the display device 920, electronic paper, a liquid crystal display device, an electroluminescence (also referred to as EL) display device, or the like can be used. For example, the use of electronic paper can reduce the power consumption of the display device 920.

Figure 9B:
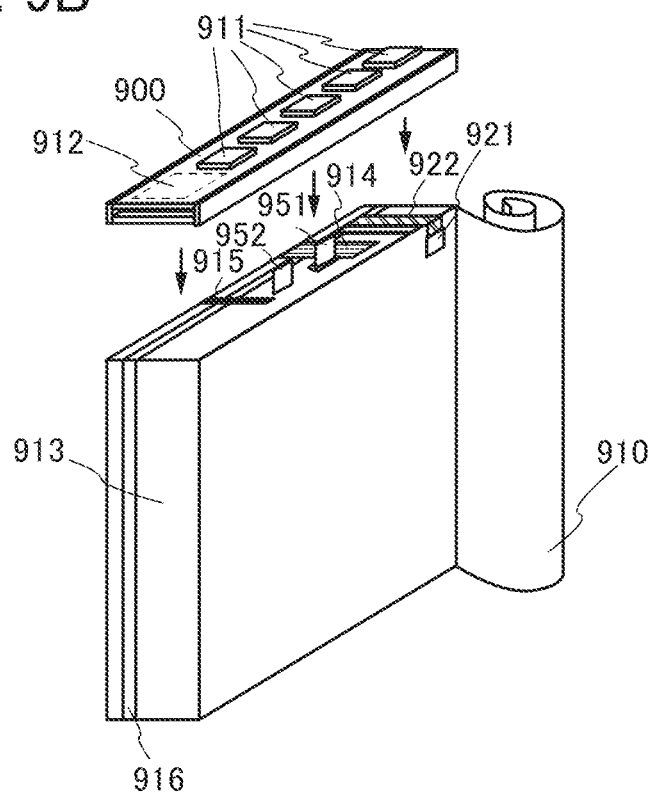

Alternatively, as illustrated in FIG. 9(B), the secondary battery 913 illustrated in FIG. 7(A) and FIG. 7(B) may be provided with a sensor 921. The sensor 921 is electrically connected to the terminal 911 via a terminal 922. For portions similar to those illustrated in FIG. 7(A) and FIG. 7(B), a description of the power storage device illustrated in FIG. 7(A) and FIG. 7(B) can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the power storage device is placed can be sensed and stored in a memory inside the circuit 912.

Further structural examples of the secondary battery 913 will be described with reference to FIG. 10 and FIG. 11.

Figure 10A:
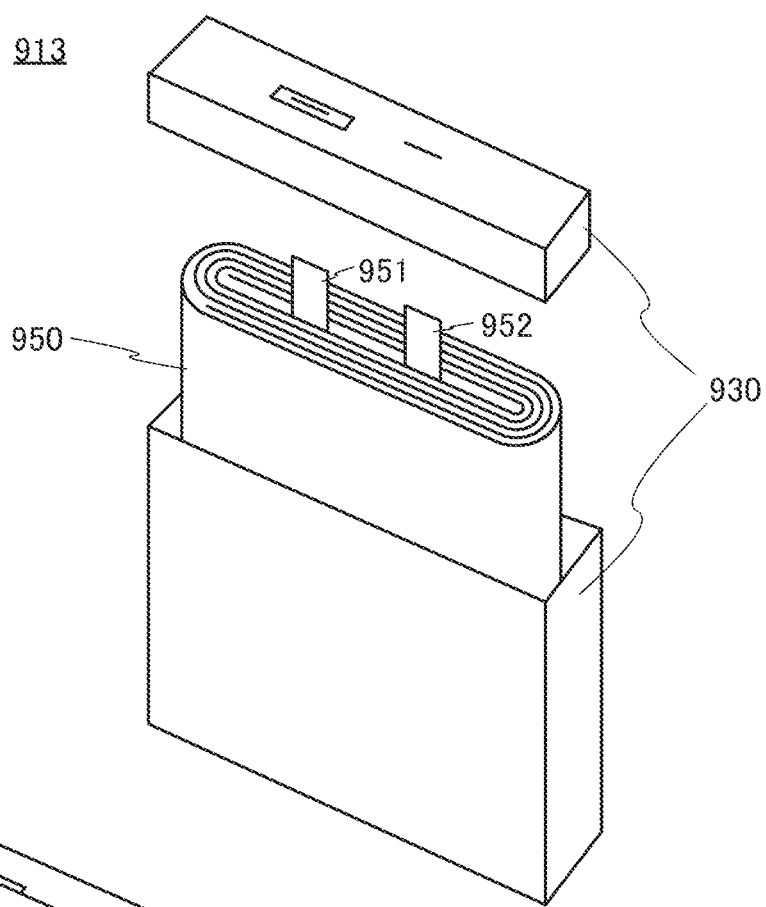
FIGS. 10A and 10B Diagrams illustrating an example of a secondary battery.

The secondary battery 913 illustrated in FIG. 10(A) includes a wound body 950 provided with the terminal 951 and the terminal 952 inside a housing 930. The wound body 950 is soaked in an electrolyte solution inside the housing 930. The terminal 952 is in contact with the housing 930, and an insulator or the like inhibits contact between the terminal 951 and the housing 930. Note that in FIG. 10(A), the housing 930 divided into two pieces is illustrated for convenience; however, in the actual structure, the wound body 950 is covered with the housing 930 and the terminal 951 and the terminal 952 extend to the outside of the housing 930. For the housing 930, a metal material (such as aluminum) or a resin material can be used.

Figure 10B:
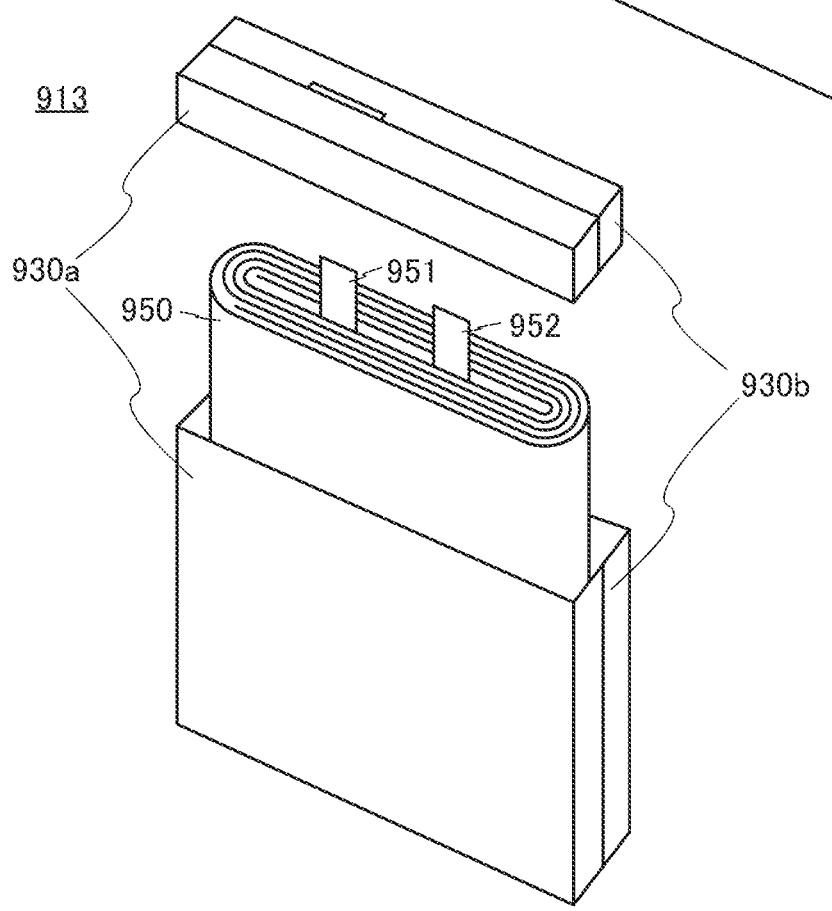

Note that as illustrated in FIG. 10(B), the housing 930 in FIG. 10(A) may be formed using a plurality of materials. For example, in the secondary battery 913 in FIG. 10(B), a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antenna 914 and the antenna 915 may be provided inside the housing 930a. For the housing 930b, a metal material can be used, for example.

Figure 11:
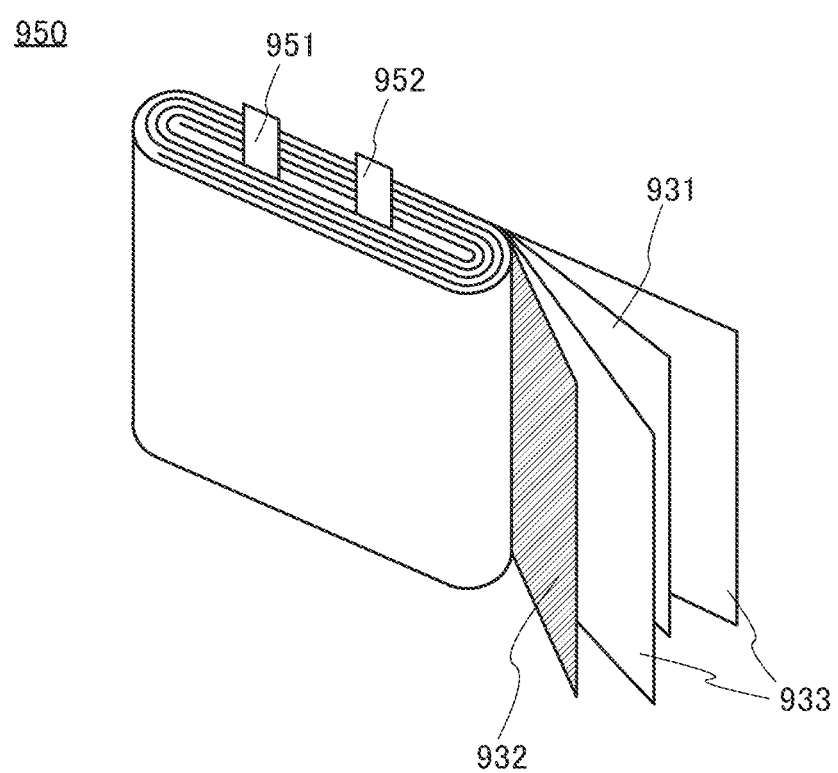
FIG. 11 A diagram illustrating an example of a secondary battery.

FIG. 11 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be further stacked.

The negative electrode 931 is connected to the terminal 911 illustrated in FIG. 7 via one of the terminal 951 and the terminal 952. The positive electrode 932 is connected to the terminal 911 illustrated in FIG. 7 via the other of the terminal 951 and the terminal 952.

When the positive electrode active material particle 100 described in the above embodiments is used in the positive electrode 932, the secondary battery 913 with little deterioration and high safety can be obtained.

[Laminated Secondary Battery]

Next, an example of a laminated secondary battery will be described with reference to FIG. 12 to FIG. 17. When the laminated secondary battery has flexibility and is used in an electronic device at least part of which is flexible, the secondary battery can be bent as the electronic device is bent.

Figure 12A:
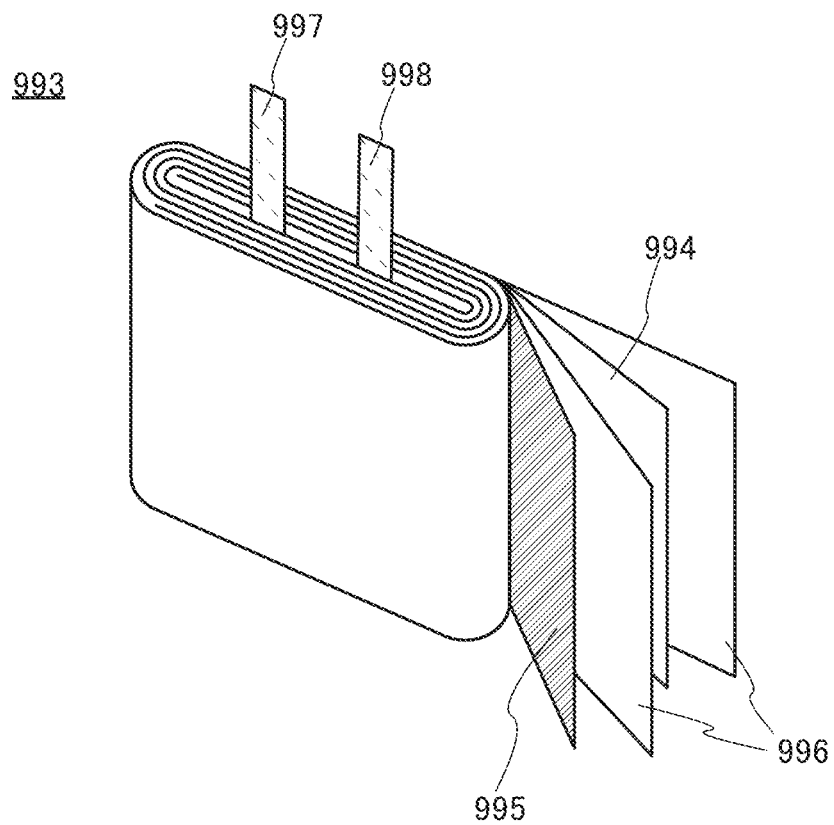
FIGS. 12A to 12C Diagrams illustrating a laminated secondary battery.

A laminated secondary battery 980 is described with reference to FIG. 12. The laminated secondary battery 980 includes a wound body 993 illustrated in FIG. 12(A). The wound body 993 includes a negative electrode 994, a positive electrode 995, and a separator 996.

The wound body 993 is, like the wound body 950 illustrated in FIG. 11, obtained by winding a sheet of a stack in which the negative electrode 994 overlaps with the positive electrode 995 with the separator 996 therebetween. Note that the number of stacks each including the negative electrode 994, the positive electrode 995, and the separator 996 may be determined as appropriate depending on capacity and an element volume which are required. The negative electrode 994 is connected to a negative electrode current collector (not illustrated) via one of a lead electrode 997 and a lead electrode 998, and the positive electrode 995 is connected to a positive electrode current collector (not illustrated) via the other of the lead electrode 997 and the lead electrode 998.

Figure 12B:
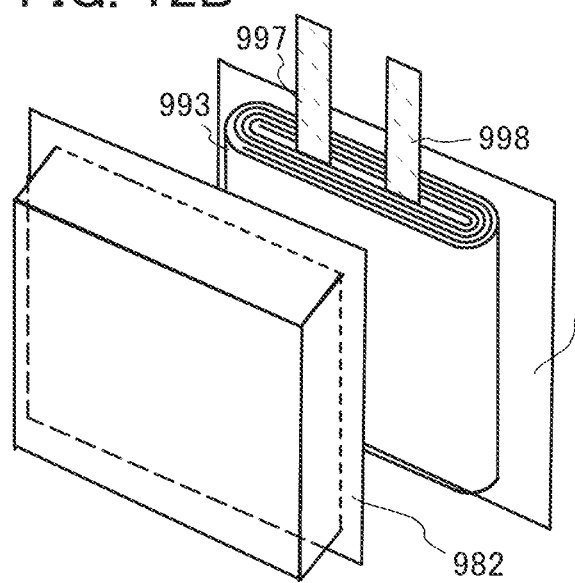
Figure 12C:
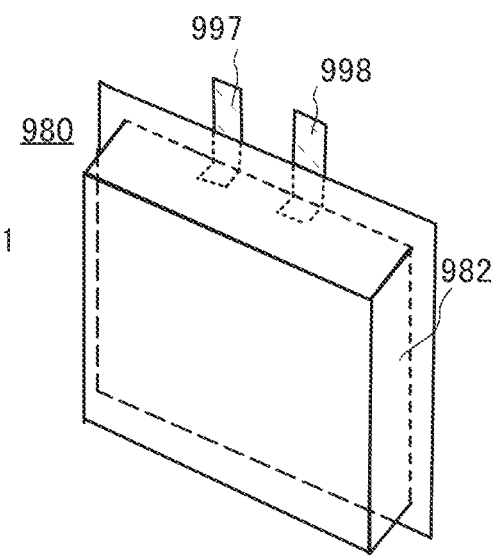

As illustrated in FIG. 12(B), the wound body 993 is packed in a space formed by bonding a film 981 and a film 982 having a depressed portion that serve as exterior bodies by thermocompression bonding or the like, whereby the secondary battery 980 can be formed as illustrated in FIG. 12(C). The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIG. 12(B) and FIG. 12(C) illustrate an example where a space is formed by two films, the wound body 993 may be placed in a space formed by bending one film.

When the positive electrode active material particle 100 described in the above embodiments is used in the positive electrode 995, the secondary battery 980 with little deterioration and high safety can be obtained.

In FIG. 12, an example in which the secondary battery 980 includes a wound body in a space formed by films serving as exterior bodies is described; however, as illustrated in FIG. 13, a secondary battery may include a plurality of strip-shaped positive electrodes, a plurality of strip-shaped separators, and a plurality of strip-shaped negative electrodes in a space formed by films serving as exterior bodies, for example.

Figure 13A:
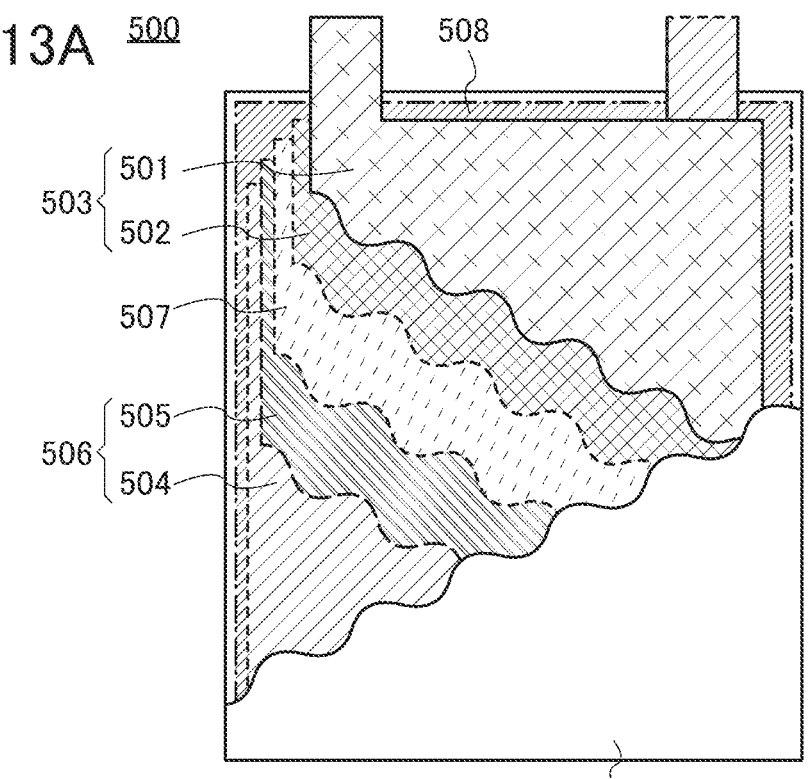
FIGS. 13A and 13B Diagrams illustrating a laminated secondary battery.

A laminated secondary battery 500 illustrated in FIG. 13(A) includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 2 can be used for the electrolyte solution 508.

In the laminated secondary battery 500 illustrated in FIG. 13(A), the positive electrode current collector 501 and the negative electrode current collector 504 also serve as terminals for an electrical contact with an external portion. For this reason, the positive electrode current collector 501 and the negative electrode current collector 504 may be arranged so as to be partly exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

Figure 13B:
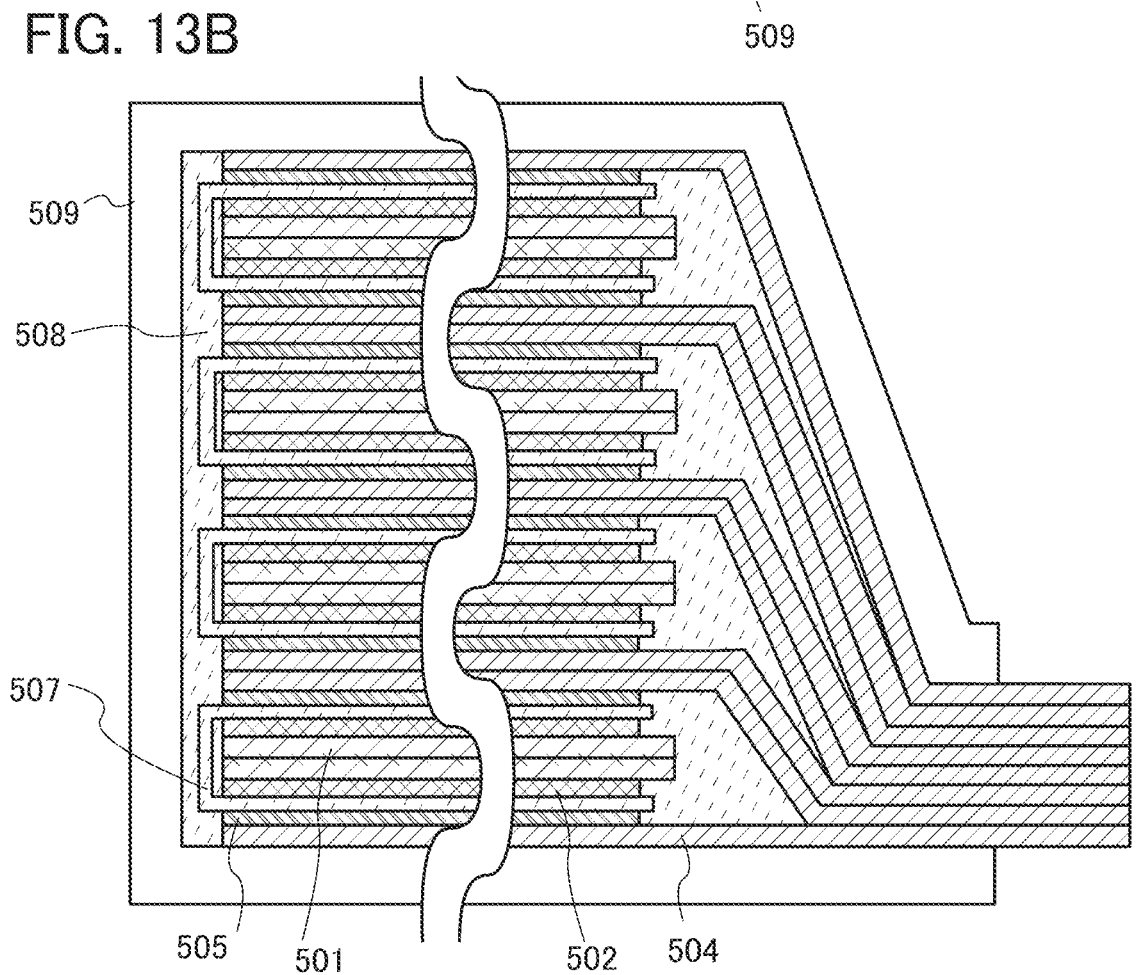

FIG. 13(B) illustrates an example of a cross-sectional structure of the laminated secondary battery 500. Although FIG. 13(A) illustrates an example including only two current collectors for simplicity, an actual battery includes a plurality of electrode layers.

The example in FIG. 13(B) includes 16 electrode layers. The secondary battery 500 has flexibility even though including 16 electrode layers. FIG. 13(B) illustrates a structure including 8 layers of negative electrode current collectors 504 and 8 layers of positive electrode current collectors 501, i.e., 16 layers in total. Note that FIG. 13(B) illustrates a cross section of the lead portion of the negative electrode, and the 8 negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. With a small number of electrode layers, the secondary battery can have small thickness and high flexibility.

Figure 14:
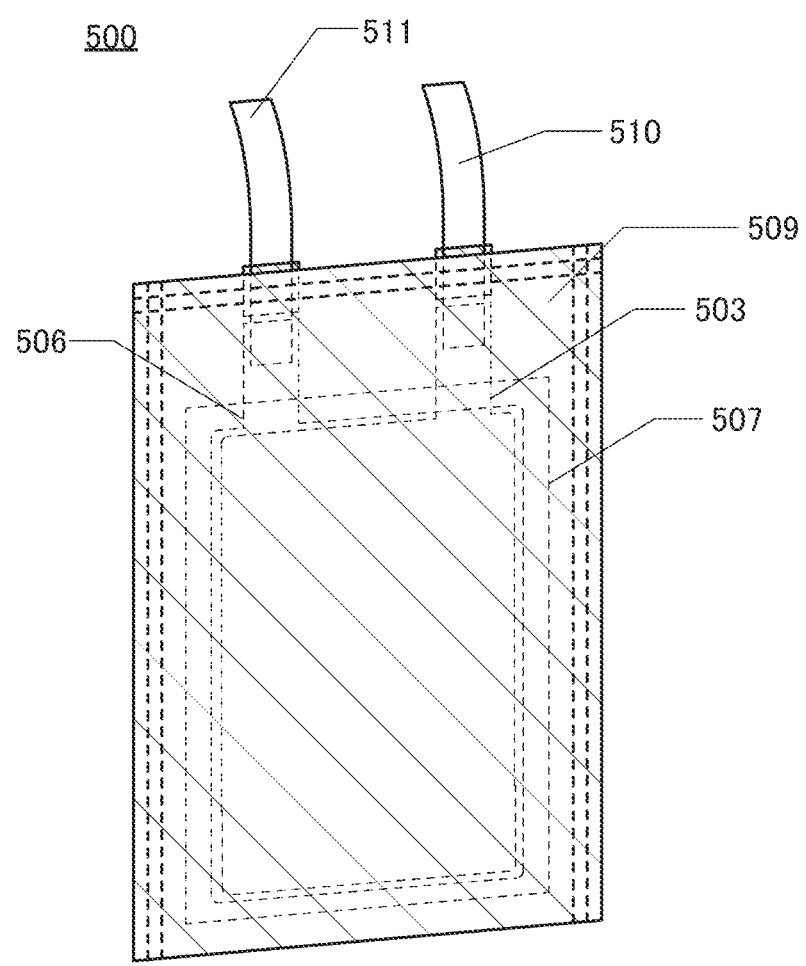
FIG. 14 An external view of a secondary battery.
Figure 15:
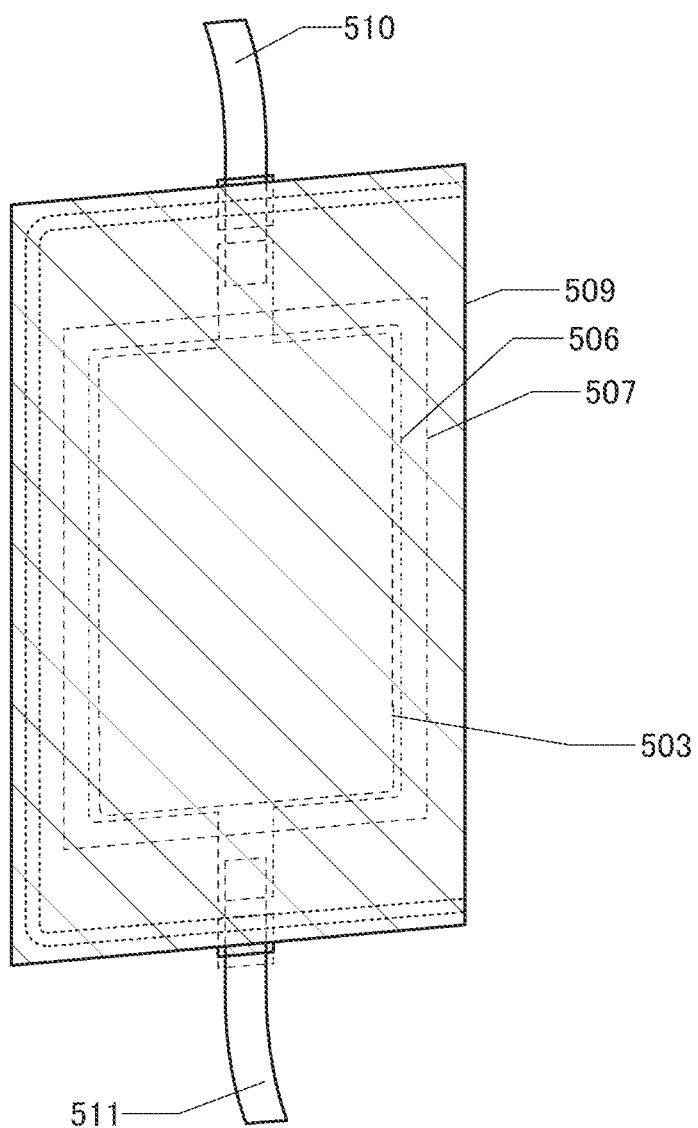
FIG. 15 An external view of a secondary battery.

FIG. 14 and FIG. 15 each illustrate an example of the external view of the laminated secondary battery 500. In FIG. 14 and FIG. 15, the positive electrode 503, the negative electrode 506, the separator 507, the exterior body 509, a positive electrode lead electrode 510, and a negative electrode lead electrode 511 are included.

Figure 16A:
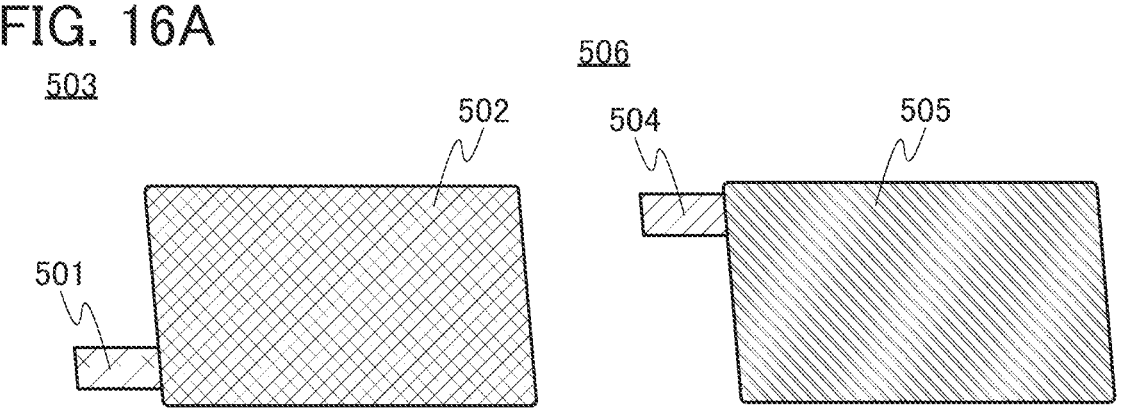
FIGS. 16A to 16C Diagrams illustrating a manufacturing method of a secondary battery.

FIG. 16(A) illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 16(A).

[Method for Manufacturing Laminated Secondary Battery]

Figure 16B:
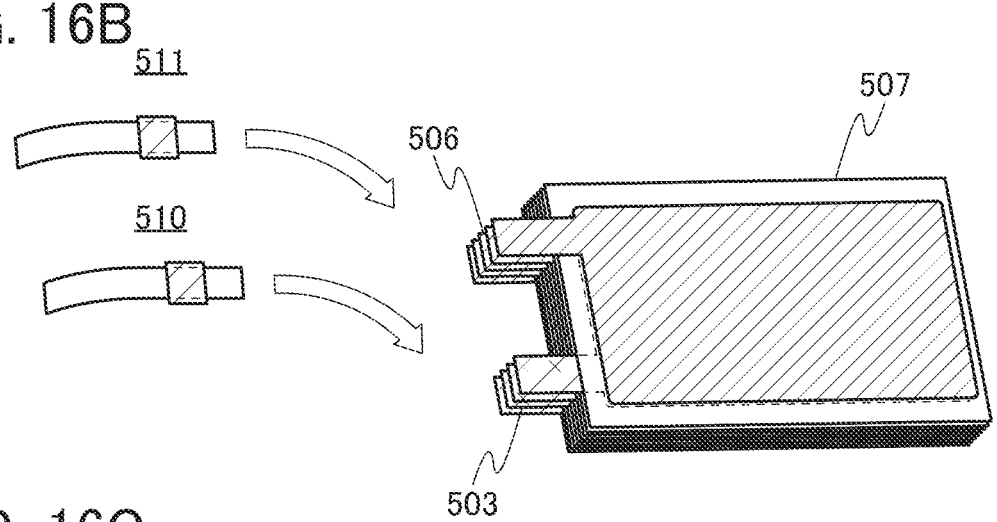

Here, an example of a method for manufacturing the laminated secondary battery whose external view is illustrated in FIG. 14 will be described with reference to FIG. 16(B) and FIG. 16(C).

First, the negative electrode 506, the separator 507, and the positive electrode 503 are stacked. FIG. 16(B) illustrates a stack including the negative electrode 506, the separator 507, and the positive electrode 503. An example described here includes 5 pairs of negative electrodes and 4 pairs of positive electrodes. Next, the tab regions of the positive electrodes 503 are bonded to each other, and the positive electrode lead electrode 510 is bonded to the tab region of the positive electrode on the outermost surface. The bonding can be performed by ultrasonic welding, for example. In a similar manner, the tab regions of the negative electrodes 506 are bonded to each other, and the negative electrode lead electrode 511 is bonded to the tab region of the negative electrode on the outermost surface.

After that, the negative electrode 506, the separator 507, and the positive electrode 503 are placed over the exterior body 509.

Figure 16C:
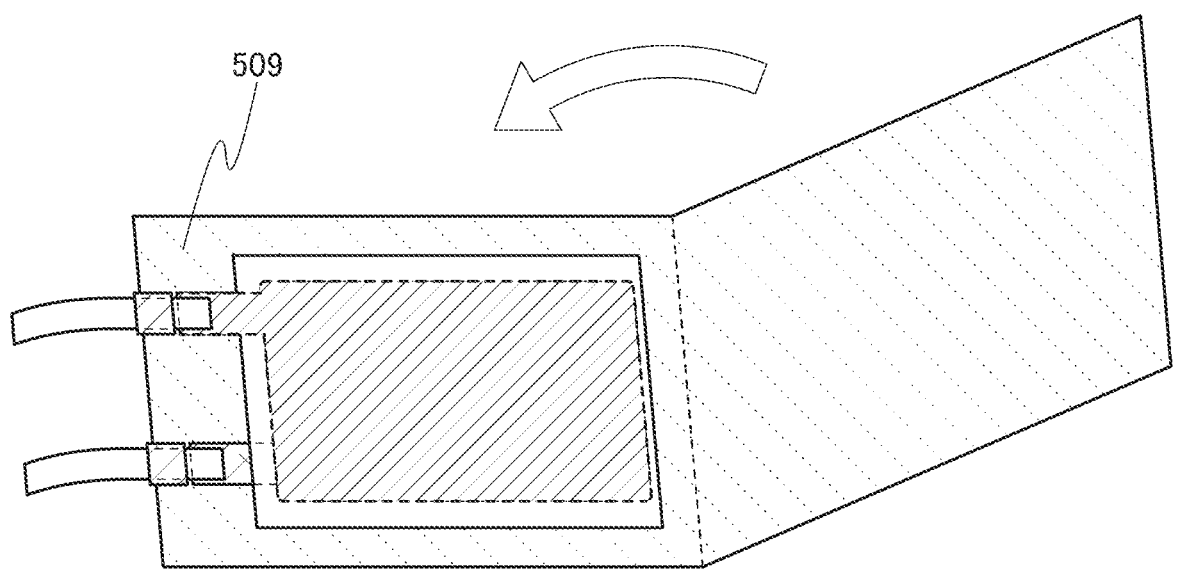

Subsequently, the exterior body 509 is folded along a dashed line as illustrated in FIG. 16(C). Then, the outer edge of the exterior body 509 is bonded. The bonding can be performed by thermocompression bonding, for example. At this time, a part (or one side) of the exterior body 509 is left unbonded (to provide an inlet) so that the electrolyte solution 508 can be introduced later.

Next, the electrolyte solution 508 is introduced into the exterior body 509 from the inlet of the exterior body 509. The electrolyte solution 508 is preferably introduced in a reduced pressure atmosphere or in an inert gas atmosphere. Lastly, the inlet is bonded. In the above manner, the laminated secondary battery 500 can be manufactured.

When the positive electrode active material particle 100 described in the above embodiments is used in the positive electrode 503, the secondary battery 500 with little deterioration and high safety can be obtained.

[Bendable Secondary Battery]

Next, an example of a bendable secondary battery is described with reference to FIG. 17 and FIG. 18.

FIG. 17(A) is a schematic top view of a bendable battery 250. FIG. 17(B1), FIG. 17(B2), and FIG. 17(C) are schematic cross-sectional views taken along cutting line C1-C2, cutting line C3-C4, and cutting line A1-A2, respectively, in FIG. 17(A). The battery 250 includes an exterior body 251, and a positive electrode 211a and a negative electrode 211b which are held in the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 18A:
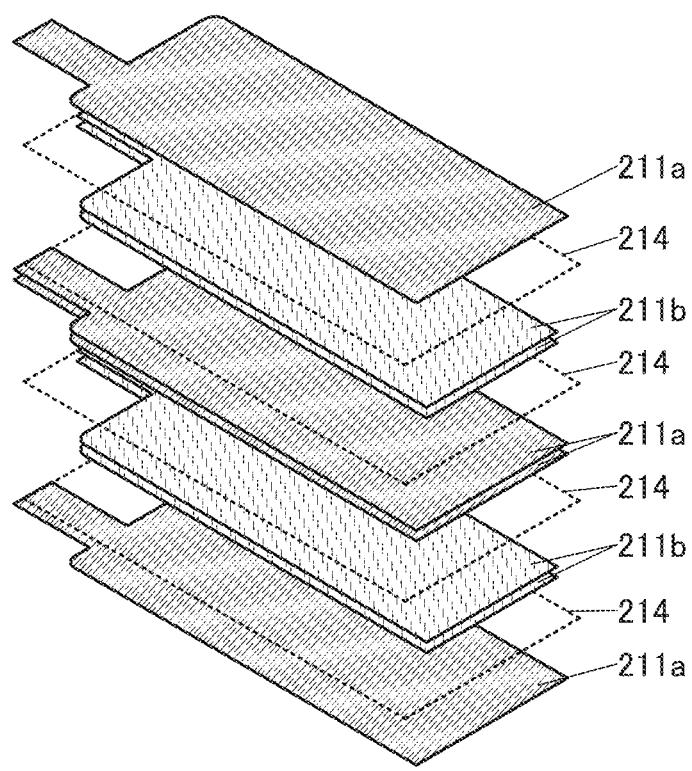
FIGS. 18A and 18B Diagrams illustrating a bendable secondary battery.
Figure 18B:
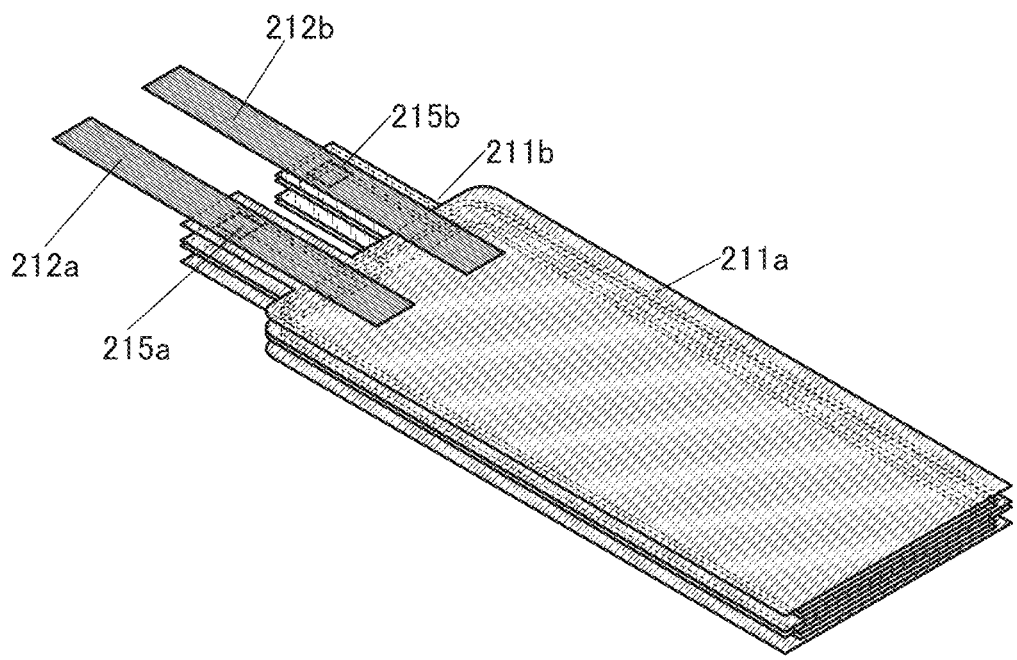

The positive electrode 211a and the negative electrode 211b included in the battery 250 are described with reference to FIG. 18. FIG. 18(A) is a perspective view illustrating the stacking order of the positive electrode 211a, the negative electrode 211b, and the separator 214. FIG. 18(B) is a perspective view illustrating the lead 212a and the lead 212b in addition to the positive electrode 211a and the negative electrode 211b.

As illustrated in FIG. 18(A), the battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material layer is not formed are in contact with each other.

Furthermore, the separator 214 is provided between the surface of the positive electrode 211a on which the positive electrode active material layer is formed and the surface of the negative electrode 211b on which the negative electrode active material layer is formed. In FIG. 18, the separator 214 is shown by a dotted line for easy viewing.

In addition, as illustrated in FIG. 18(B), the plurality of positive electrodes 211a are electrically connected to the lead 212a in a bonding portion 215a. The plurality of negative electrodes 211b are electrically connected to the lead 212b in a bonding portion 215b.

Next, the exterior body 251 is described with reference to FIG. 17(B1), FIG. 17(B2), FIG. 17(C), and FIG. 17(D).

The exterior body 251 has a film-like shape and is folded in half with the positive electrodes 211a and the negative electrodes 211b between facing portions of the exterior body 251. The exterior body 251 includes a folded portion 261, a pair of seal portions 262, and a seal portion 263. The pair of seal portions 262 is provided with the positive electrodes 211a and the negative electrodes 211b positioned therebetween and thus can also be referred to as side seals. The seal portion 263 has portions overlapping with the lead 212a and the lead 212b and can also be referred to as a top seal.

Part of the exterior body 251 that overlaps with the positive electrodes 211a and the negative electrodes 211b preferably has a wave shape in which crest lines 271 and trough lines 272 are alternately arranged. The seal portions 262 and the seal portion 263 of the exterior body 251 are preferably flat.

FIG. 17(B1) shows a cross section cut along the part overlapping with the crest line 271. FIG. 17(B2) shows a cross section cut along the part overlapping with the trough line 272. FIG. 17(B1) and FIG. 17(B2) correspond to cross sections of the battery 250, the positive electrodes 211a, and the negative electrodes 211b in the width direction.

Here, the distance between an end portion of the negative electrode 211b in the width direction, that is, the end portion of the negative electrode 211b, and the seal portion 262 is referred to as a distance La. When the battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard against each other, so that the exterior body 251 is damaged in some cases. In particular, when a metal film of the exterior body 251 is exposed, there is concern that the metal film is corroded by the electrolyte solution. Thus, the distance La is preferably set as long as possible. However, a too long distance La increases the volume of the battery 250.

The distance La between the negative electrode 211b and the seal portion 262 is preferably increased as the total thickness of the stacked positive electrodes 211a and negative electrodes 211b is increased.

More specifically, when the total thickness of the stacked positive electrodes 211a and negative electrodes 211b is referred to as a thickness t, the distance La is preferably 0.8 times or more and 3.0 times or less, further preferably 0.9 times or more and 2.5 times or less, and still further preferably 1.0 times or more and 2.0 times or less as large as the thickness t. When the distance La is in this range, a compact battery which is highly reliable for bending can be obtained.

Furthermore, when the distance between the pair of seal portions 262 is referred to as a distance Lb, it is preferable that the distance Lb be sufficiently longer than the width of the positive electrode 211a and the negative electrode 211b (here, a width Wb of the negative electrode 211b). In this case, even when the positive electrode 211a and the negative electrode 211b come into contact with the exterior body 251 by change in the shape of the battery 250 such as repeated bending, the position of part of the positive electrode 211a and the negative electrode 211b can be shifted in the width direction; thus, the positive and negative electrodes 211a and 211b and the exterior body 251 can be effectively prevented from being rubbed against each other.

For example, the difference between the distance Lb between the pair of seal portions 262 and the width Wb of the negative electrode 21b is preferably 1.6 times or more and 6.0 times or less, further preferably 1.8 times or more and 5.0 times or less, and still further preferably 2.0 times or more and 4.0 times or less as large as the total thickness t of the positive electrode 211a and the negative electrode 211b.

In other words, the distance Lb, the width Wb, and the thickness t preferably satisfy the relation of the following Formula 2.

[Formula 2]

$$\frac{Lb - Wb}{2t} \geq a \quad \text{(Formula 2)}$$

In the formula, a is 0.8 or more and 3.0 or less, preferably 0.9 or more and 2.5 or less, and further preferably 1.0 or more and 2.0 or less.

FIG. 17(C) illustrates a cross section including the lead 212a and corresponds to a cross section of the battery 250, the positive electrode 211a, and the negative electrode 211b in the length direction. As illustrated in FIG. 17(C), in the folded portion 261, a space 273 is preferably provided between end portions of the positive electrode 211a and the negative electrode 211b in the length direction and the exterior body 251.

FIG. 17(D) is a schematic cross-sectional view of the battery 250 that is bent. FIG. 17(D) corresponds to a cross section along cutting line B1-B2 in FIG. 17(A).

When the battery 250 is bent, a part of the exterior body 251 positioned on the outer side in bending is stretched and the other part positioned on the inner side changes in shape as it shrinks. More specifically, the part of the exterior body 251 positioned on the outer side changes in shape such that the wave amplitude becomes smaller and the length of the wave period becomes larger. In contrast, the part of the exterior body 251 positioned on the inner side changes in shape such that the wave amplitude becomes larger and the length of the wave period becomes smaller. When the exterior body 251 changes in shape in this manner, stress applied to the exterior body 251 due to bending is relieved, so that a material itself that forms the exterior body 251 does not need to expand and contract. As a result, the battery 250 can be bent with weak force without damage to the exterior body 251.

Furthermore, as illustrated in FIG. 17(D), when the battery 250 is bent, the positions of the positive electrode 211a and the negative electrode 211b are shifted relatively. At this time, ends of the stacked positive electrodes 211a and negative electrodes 211b on the seal portion 263 side are fixed by a fixing member 217; thus, the plurality of positive electrodes 211a and the plurality of negative electrodes 211b are more shifted at a position closer to the folded portion 261. Therefore, stress applied to the positive electrode 211a and the negative electrode 211b is relieved, and the positive electrode 211a and the negative electrode 211b themselves do not need to expand and contract. As a result, the battery 250 can be bent without damage to the positive electrode 211a and the negative electrode 211b.

Furthermore, the space 273 provided between the positive electrode 211a and the negative electrode 211b and the exterior body 251 enables the positive electrode 211a and the negative electrode 211b located on an inner side to be shifted relatively without being in contact with the exterior body 251 when the battery 250 is bent.

In the battery 250 illustrated in FIG. 17 and FIG. 18, the exterior body, the positive electrode 211a, and the negative electrode 211b are less likely to be damaged and the battery characteristics are less likely to deteriorate even when the battery 250 is repeatedly bent and unbent. When the positive electrode active material particle 100 described in the above embodiments is used for the positive electrode 211a included in the battery 250, a battery with little deterioration and high safety can be obtained.

Embodiment 4

In this embodiment, examples of electronic devices including the secondary battery of one embodiment of the present invention are described.

First, FIG. 19 shows examples of electronic devices including the bendable secondary battery described in Embodiment 3. Examples of an electronic device including a bendable secondary battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 19A:
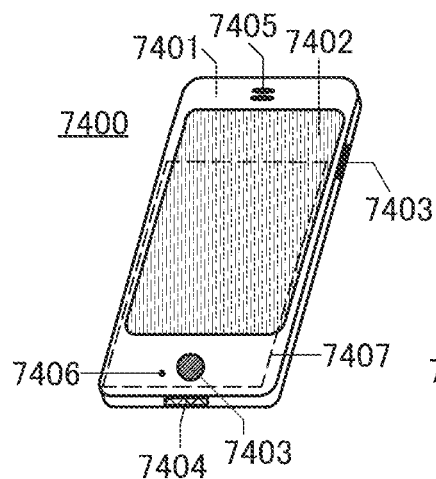
FIGS. 19A to 19G Diagrams illustrating examples of electronic devices.

FIG. 19(A) illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407.

Figure 19B:
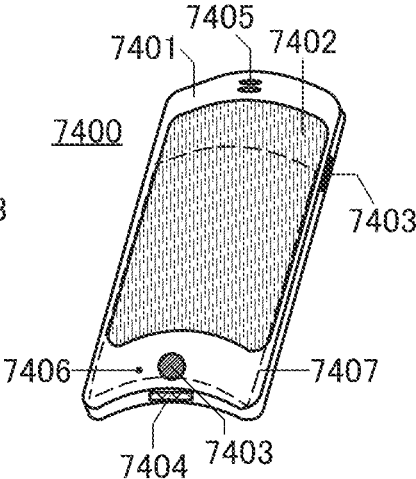
Figure 19C:
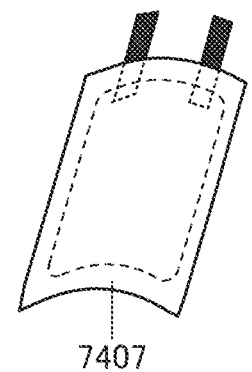

FIG. 19(B) illustrates the mobile phone 7400 that is bent. When the whole mobile phone 7400 is curved by external force, the secondary battery 7407 included in the mobile phone 7400 is also curved. FIG. 19(C) illustrates the curved secondary battery 7407. The secondary battery 7407 is a thin secondary battery. The secondary battery 7407 is curved and fixed. Note that the secondary battery 7407 includes a lead electrode electrically connected to a current collector.

Figure 19D:
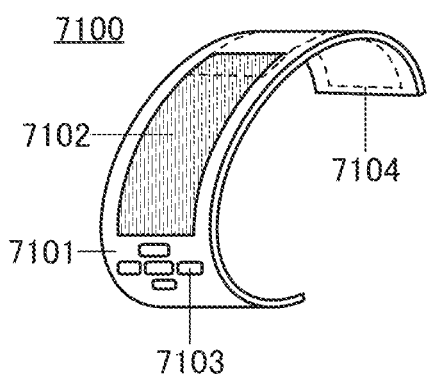
Figure 19E:
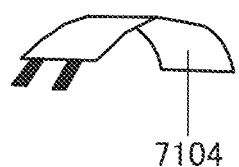

FIG. 19(D) illustrates an example of a bangle display device. A portable display device 7100 includes a housing 7101, a display portion 7102, an operation button 7103, and a secondary battery 7104. FIG. 19(E) illustrates the bent secondary battery 7104. When the curved secondary battery 7104 is on a user's arm, the housing changes its form and the curvature of a part or the whole of the secondary battery 7104 is changed. Note that the radius of curvature of a curve at a point refers to the radius of the circular arc that best approximates the curve at that point, and the reciprocal of the radius of curvature is referred to as a curvature. Specifically, part or the whole of the housing or the main surface of the secondary battery 7104 is changed in the range of radius of curvature from 40 mm to 150 mm. When the radius of curvature at the main surface of the secondary battery 7104 is greater than or equal to 40 mm and less than or equal to 150 mm, the reliability can be kept high.

Figure 19F:
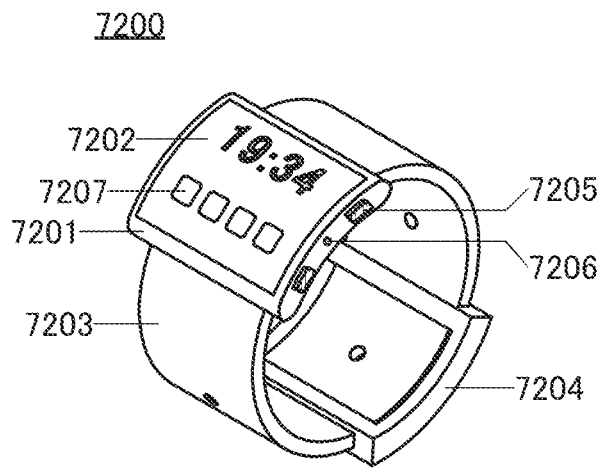

FIG. 19(F) illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. For example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 includes the secondary battery of one embodiment of the present invention. For example, the secondary battery 7104 illustrated in FIG. 19(E) can be provided in the housing 7201 while being curved, or can be provided in the band 7203 such that it can be curved.

The portable information terminal 7200 preferably includes a sensor. As the sensor, for example, a human body sensor such as a fingerprint sensor, a pulse sensor, or a temperature sensor, a touch sensor, a pressure sensitive sensor, an acceleration sensor, or the like is preferably mounted.

Figure 19G:
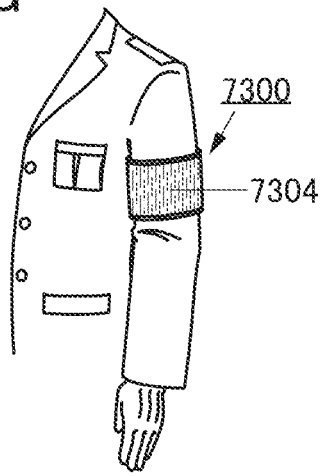

FIG. 19(G) illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

Figure 20A:
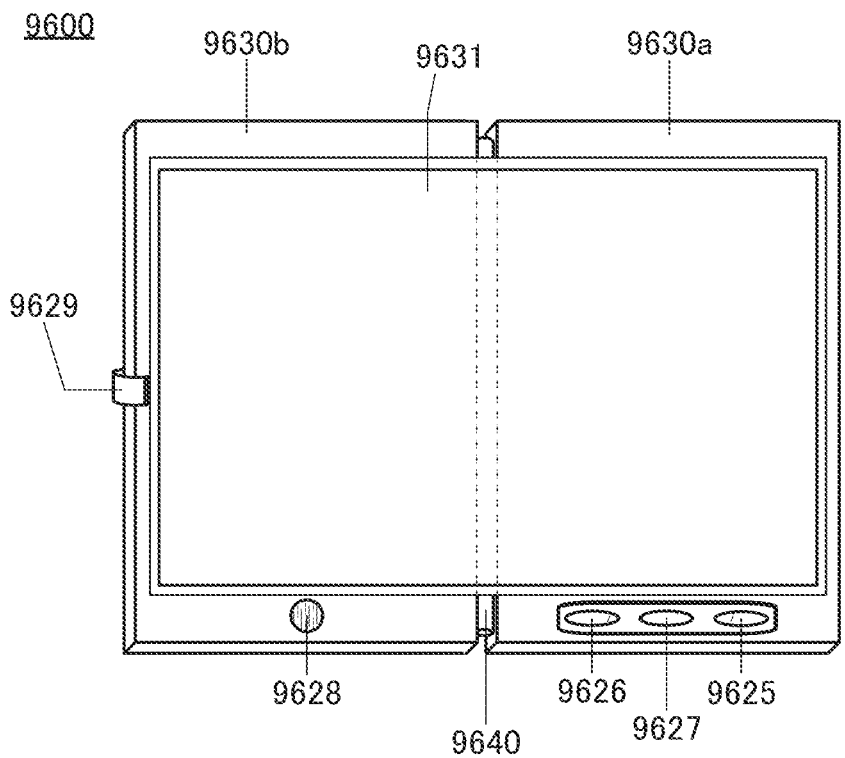
FIGS. 20A to 20C Diagrams illustrating an example of an electronic device.
Figure 20B:
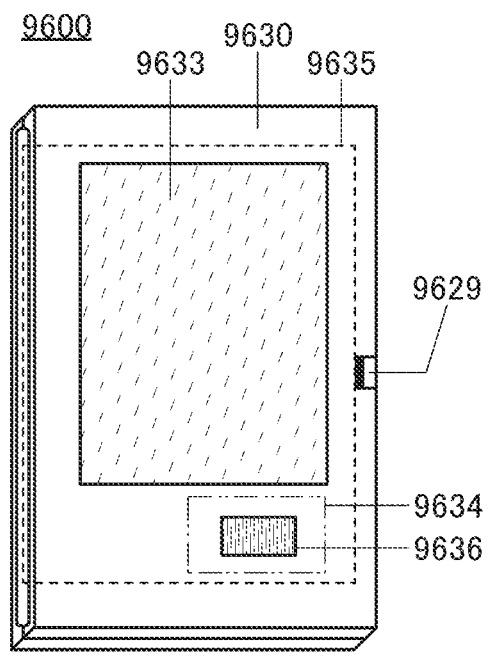

Next, FIG. 20(A) and FIG. 20(B) illustrate an example of a foldable tablet terminal. A tablet terminal 9600 illustrated in FIG. 20(A) and FIG. 20(B) includes a housing 9630*a*, a housing 9630*b*, a movable portion 9640 connecting the housing 9630*a* and the housing 9630*b*, a display portion 9631, a display mode changing switch 9626, a power switch 9627, a power saving mode changing switch 9625, a fastener 9629, and an operation switch 9628. A flexible panel is used for the display portion 9631, whereby a tablet terminal with a larger display portion can be provided. FIG. 20(A) illustrates the tablet terminal 9600 that is opened, and FIG. 20(B) illustrates the tablet terminal 9600 that is closed.

The tablet terminal 9600 includes a power storage unit 9635 inside the housing 9630*a* and the housing 9630*b*. The power storage unit 9635 is provided across the housing 9630*a* and the housing 9630*b*, passing through the movable portion 9640.

Part of the display portion 9631 can be a touch panel region and data can be input when a displayed operation key is touched. A switching button for showing/hiding a keyboard of the touch panel is touched with a finger, a stylus, or the like, so that keyboard buttons can be displayed on the display portion 9631.

The display mode switch 9626 can switch the display between a portrait mode and a landscape mode, and between monochrome display and color display, for example. The power saving mode changing switch 9625 can control display luminance in accordance with the amount of external light in use of the tablet terminal 9600, which is measured with an optical sensor incorporated in the tablet terminal 9600. Another detection device including a sensor for detecting inclination, such as a gyroscope sensor or an acceleration sensor, may be incorporated in the tablet terminal, in addition to the optical sensor.

The tablet terminal is closed in FIG. 20(B). The tablet terminal includes the housing 9630, a solar cell 9633, and a charge and discharge control circuit 9634 including a DC-DC converter 9636. The secondary battery of one embodiment of the present invention is used as the power storage unit 9635.

The tablet terminal 9600 can be folded such that the housing 9630*a* and the housing 9630*b* overlap with each other when not in use. Thus, the display portion 9631 can be protected, which increases the durability of the tablet terminal 9600. Since the power storage unit 9635 using the secondary battery of one embodiment of the present invention has high capacity and excellent cycle characteristics, the tablet terminal which can be used for a long time for a long period can be provided.

The tablet terminal illustrated in FIG. 20(A) and FIG. 20(B) can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 20C:
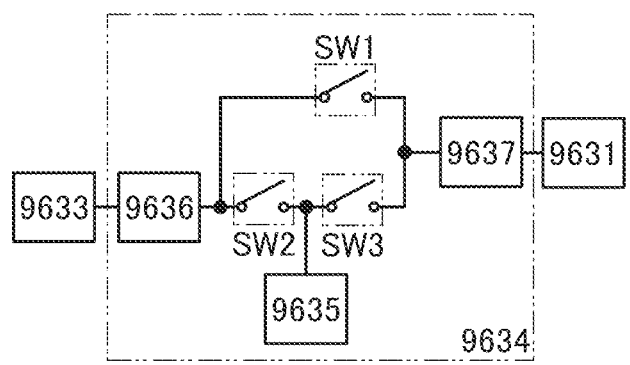

The structure and operation of the charge and discharge control circuit 9634 illustrated in FIG. 20(B) will be described with reference to a block diagram in FIG. 20(C). The solar cell 9633, the power storage unit 9635, the DC-DC converter 9636, a converter 9637, switches SW1 to SW3, and the display portion 9631 are illustrated in FIG. 20(C), and the power storage unit 9635, the DC-DC converter 9636, the converter 9637, and the switches SW1 to SW3 correspond to the charge and discharge control circuit 9634 in FIG. 20(B).

First, an example of the operation in the case where power is generated by the solar cell 9633 using external light is described. The voltage of electric power generated by the solar cell is raised or lowered by the DC-DC converter 9636 to a voltage for charging the power storage unit 9635. When the power from the solar cell 9633 is used for the operation of the display portion 9631, the switch SW1 is turned on and the voltage of the power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means: however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module that transmits and receives power wirelessly (without contact) to charge the battery or with a combination of other charging means.

Figure 21:
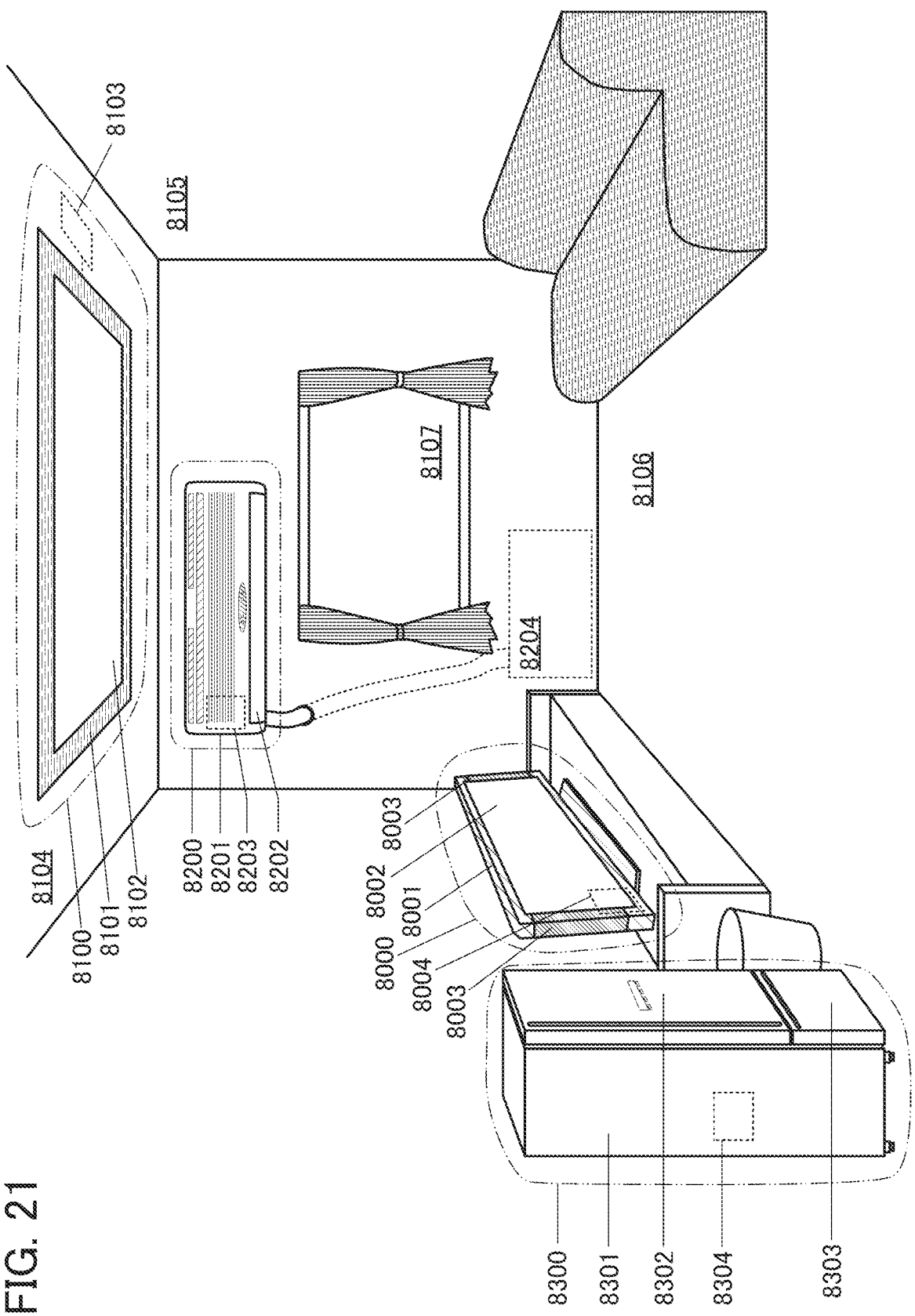
FIG. 21 Diagram illustrating examples of electronic devices.

FIG. 21 illustrates other examples of electronic devices. In FIG. 21, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply, or use electric power stored in the secondary battery 8004. Thus, the display device 8000 can operate with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like other than TV broadcast reception.

In FIG. 21, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 21 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply, or use electric power stored in the secondary battery 8103. Thus, the lighting device 8100 can operate with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 21 as an example, the secondary battery of one embodiment of the present invention can be used as an installation lighting device provided in, for example, a sidewall 8105, a floor 8106, a window 8107, or the like other than the ceiling 8104, or can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 21, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 21 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply, or use electric power stored in the secondary battery 8203. Particularly in the case where the secondary batteries 8203 are provided in both the indoor unit 8200 and the outdoor unit 8204, the air conditioner can operate with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 21 as an example, the secondary battery of one embodiment of the present invention can be used in an air conditioner in which the functions of an indoor unit and an outdoor unit are integrated in one housing.

In FIG. 21, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided in the housing 8301 in FIG. 21. The electric refrigerator-freezer 8300 can receive electric power from a commercial power supply, or use electric power stored in the secondary battery 8304. Thus, the electric refrigerator-freezer 8300 can operate with the use of the secondary battery 8304 of one embodiment of the present invention as an uninterruptible power supply even when electric power cannot be supplied from a commercial power supply due to power failure or the like.

In addition, power can be stored in the secondary battery in a time period when electronic devices are not used, particularly when the proportion of the amount of power which is actually used to the total amount of power which can be supplied from a commercial power source (such a proportion referred to as a usage rate of power) is low, whereby an increase in the usage rate of power can be reduced in a time period when the electronic devices are used. For example, in the case of the electric refrigerator-freezer 8300, power is stored in the secondary battery 8304 in night time when the temperature is low and the refrigerator door 8302 and the freezer door 8303 are not opened and closed. On the other hand, in daytime when the temperature is high and the refrigerator door 8302 and the freezer door 8303 are opened and closed, the secondary battery 8304 is used as an auxiliary power source; thus, the usage rate of power in daytime can be reduced.

The secondary battery of one embodiment of the present invention can be used in a variety of electronic devices as well as the above electronic devices. According to one embodiment of the present invention, the secondary battery can have little deterioration and high safety. Thus, when the secondary battery of one embodiment of the present invention is used in the electronic devices described in this embodiment, electronic devices with longer lifetime and higher safety can be obtained. This embodiment can be implemented in appropriate combination with the other embodiments.

Embodiment 5

In this embodiment, examples of vehicles including the secondary battery of one embodiment of the present invention will be described.

The use of secondary batteries in vehicles enables production of next-generation clean energy vehicles such as hybrid electric vehicles (HEVs), electric vehicles (EVs), and plug-in hybrid electric vehicles (PHEVs).

Figure 22A:
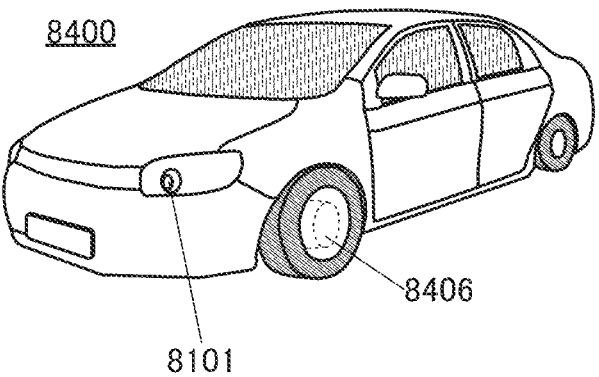
FIGS. 22A to 22C Diagrams illustrating examples of vehicles.

FIG. 22 illustrates examples of a vehicle using the secondary battery of one embodiment of the present invention. An automobile 8400 illustrated in FIG. 22(A) is an electric vehicle that runs on the power of an electric motor. Alternatively, the automobile 8400 is a hybrid electric vehicle capable of driving appropriately using either an electric motor or an engine. The use of a secondary battery of one embodiment of the present invention can provide a high-mileage vehicle. The automobile 8400 includes the secondary battery. The secondary battery is used not only for driving an electric motor 8406, but also for supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

Figure 22B:
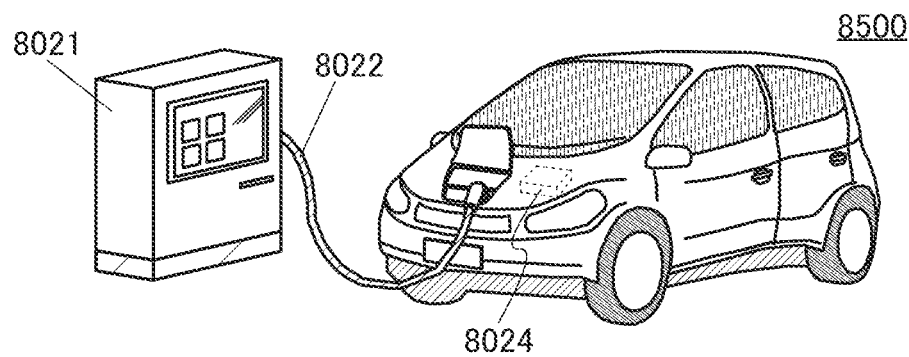

An automobile 8500 illustrated in FIG. 22(B) can be charged when a secondary battery 8024 included in the automobile 8500 is supplied with electric power through external charging equipment by a plug-in system, a contactless power feeding system or the like. In FIG. 22(B), the secondary battery 8024 mounted on the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the secondary battery 8024 mounted on the automobile 8500 can be charged by being supplied with electric power from the outside, for example. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the vehicle stops but also when moves. In addition, the contactless power feeding system may be utilized to perform transmission and reception of electric power between vehicles. A solar cell may be provided in the exterior of the vehicle to charge the secondary battery when the vehicle stops or moves. To supply electric power in such a contactless manner, an electromagnetic induction method or a magnetic resonance method can be used.

Figure 22C:
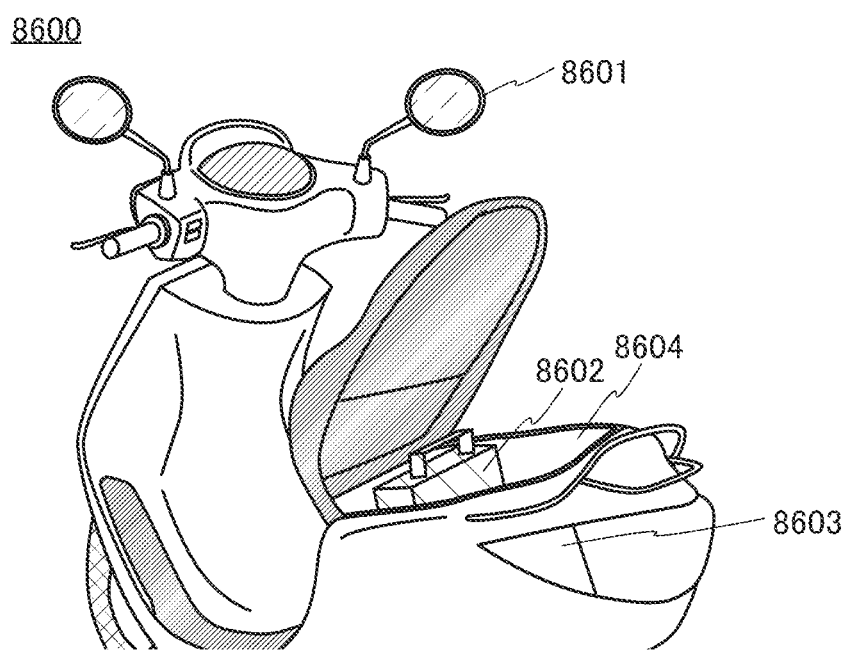

FIG. 22(C) shows an example of a motorcycle using the secondary battery of one embodiment of the present invention. A motor scooter 8600 illustrated in FIG. 22(C) includes a secondary battery 8602, side mirrors 8601, and indicators 8603. The secondary battery 8602 can supply electric power to the indicators 8603.

Furthermore, in the motor scooter 8600 illustrated in FIG. 22(C), the secondary battery 8602 can be held in a storage unit under seat 8604. The secondary battery 8602 can be held in the storage unit under seat 8604 even with a small size.

According to one embodiment of the present invention, the secondary battery can have little deterioration and high safety. Thus, when the secondary battery is mounted on a vehicle, a reduction in mileage, acceleration performance, or the like can be inhibited. In addition, a highly safe vehicle can be achieved. Furthermore, the secondary battery mounted on the vehicle can be used as a power source for supplying electric power to products other than the vehicle. In such a case, the use of a commercial power source can be avoided at peak time of electric power demand, for example. If the use of a commercial power source can be avoided at peak time of electric power demand, the avoidance can contribute to energy saving and a reduction in carbon dioxide emissions. Moreover, the secondary battery with little deterioration and high safety can be used for a long period; thus, the use amount of rare metals such as cobalt can be reduced.

This embodiment can be implemented in appropriate combination with the other embodiments.

Example 1

In this example, a positive electrode active material particle including magnesium, fluorine, and oxygen in a crystal grain boundary and the periphery thereof was fabricated and the concentration distribution in a crystal grain and a crystal grain boundary in the active material was found by TEM observation and STEM-EDX analysis. Sample A was prepared as a sample of one embodiment of the present invention. As Sample A, lithium nickel-manganese-cobalt oxide including magnesium, fluorine, and oxygen in a crystal grain boundary and the periphery thereof was fabricated. Lithium nickel-manganese-cobalt oxide was assumed to have a composition of $LiNi_{1/3}Mn_{1/3}Co_{1/3}O_2$. $LiNi_{1/3}Mn_{1/3}Co_{1/3}O_2$ has a layered rock-salt crystal structure.

<Fabrication of Sample A>

The fabrication of Sample A will be described.

Figure 3:
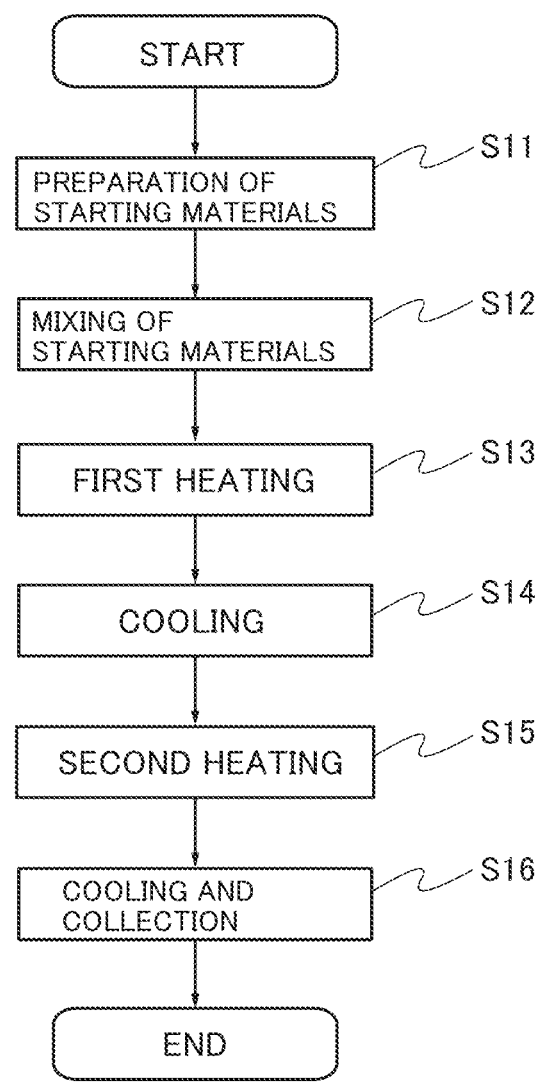
FIG. 3 A diagram showing an example of a manufacturing method of the positive electrode active material particle.

Starting materials were prepared as shown in Step S11 in the flowchart of FIG. 3. Lithium carbonate ($Li_2CO_3$) as a lithium source, nickel oxide (NiO) as a nickel source, manganese dioxide ($MnO_2$) as a manganese source, tricobalt tetroxide ($Co_3O_4$) as a cobalt source, magnesium oxide (MgO) as a magnesium source, and lithium fluoride (LiF) as a fluorine source were weighed. Specifically, 3.1398 g (42.49 mmol) of $Li_2CO_3$, 2.1159 g (28.33 mmol) of NiO, 2.4627 g (28.33 mmol) of $MnO_2$, 2.2033 g (9.15 mmol) of $Co_3O_4$, 0.0343 g (0.85 mmol) of MgO, and 0.0441 g (1.70 mmol) of LiF were weighed. According to this, the ratio m of the number of magnesium atoms to the total number of atoms of nickel, manganese, and cobalt is 0.010 (1.0%). In addition, the ratio n of the number of fluorine atoms to the number of magnesium atoms is 2.0. Note that $Li_2CO_3$ used is a product of Kojundo Chemical Laboratory Co., Ltd. (catalog No. LIH06XB). NiO used is a product of Kojundo Chemical Laboratory Co., Ltd. (catalog No. NIO04PB). $MnO_2$ used is a product of Kojundo Chemical Laboratory Co., Ltd. (catalog No. MNO03PB). $Co_3O_4$ used is a product of Kojundo Chemical Laboratory Co., Ltd. (catalog No. COO09PB). MgO used is a product of Kojundo Chemical Laboratory Co., Ltd. (catalog No. MGO12PB). LiF used is a product of Kojundo Chemical Laboratory Co., Ltd. (catalog No. LIH10XB).

Next, as shown in Step S12, the starting materials weighed in Step S11 were mixed. A wet ball mill was used for the mixing. Specifically, with use of a 3-mmφ-ball and acetone as a solvent, grinding and mixing were performed at a spinning rate of 300 rpm for 2 hours.

Next, as shown in Step S13, a first heating was performed on the materials mixed in Step S12. In the first heating, with use of a muffle furnace, the temperature was increased from room temperature to 1000° C. at a temperature rising rate of 200° C./h and heating at 1000° C. was continued for 10 hours. The heating was performed in a dry air atmosphere with a flow rate of 10 L/min.

Through the first heating in Step S13, lithium nickel-manganese-cobalt oxide can be synthesized. Note that part of the magnesium and fluorine at this stage probably forms a solid solution in the crystal grain boundary and the crystal grain.

Next, as shown in Step S14, the materials heated in Step S13 were cooled to room temperature to obtain a synthetic material 1. After the cooling, the synthetic material 1 was subjected to crushing treatment, whereby the particle size of the synthetic material 1 was reduced. A 53-μm mesh was used for the crushing treatment.

Next, as shown in Step S15, a second heating was performed on the synthetic material 1 obtained in Step S14. In the second heating, with use of a muffle furnace, the temperature was increased from room temperature to 800° C. at a temperature rising rate of 200° C./h and heating at 800° C. was continued for 2 hours. The heating was performed in a dry air atmosphere with a flow rate of 10 L/min.

The second heating in Step S15 promotes segregation of the magnesium and fluorine contained in the starting materials into the crystal grain boundary of lithium nickel-manganese-cobalt oxide.

Next, as shown in Step S16, the synthetic material 1 heated in Step S15 was cooled to room temperature and collected, so that Sample A was obtained.

<TEM Observation, STEM Observation, and EDX Measurement>

Then, Sample A was thinned by focused ion beam (FIB) and a cross section of Sample A was observed with TEM and STEM. Furthermore, the composition analysis of the cross section of Sample A was performed by EDX measurement. The TEM and STEM observation and the EDX measurement were performed with JEM-ARM200F manufactured by JEOL Ltd., at an acceleration voltage of 200 kV and a beam diameter of approximately 0.1 nmφ.

In the EDX measurement, an energy dispersive X-ray spectrometer JED-2300T manufactured by JEOL Ltd. was used as an elementary analysis apparatus, and a Si drift detector was used to detect an X-ray. The lower detection limit of the EDX plane analysis was approximately 1 atomic %. Note that the EDX measurement allows detection of elements from boron (B), atomic number 5, to uranium (U), atomic number 92.

Figure 23A:
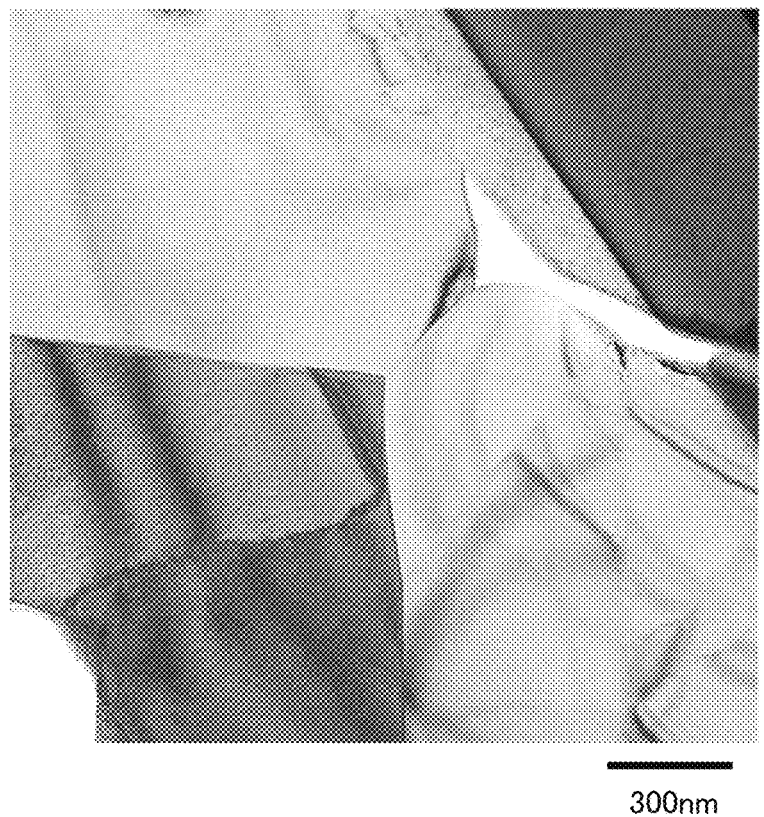
FIGS. 23A and 23B A cross-sectional TEM image and a schematic diagram of a positive electrode active material particle according to Example.
Figure 23B:
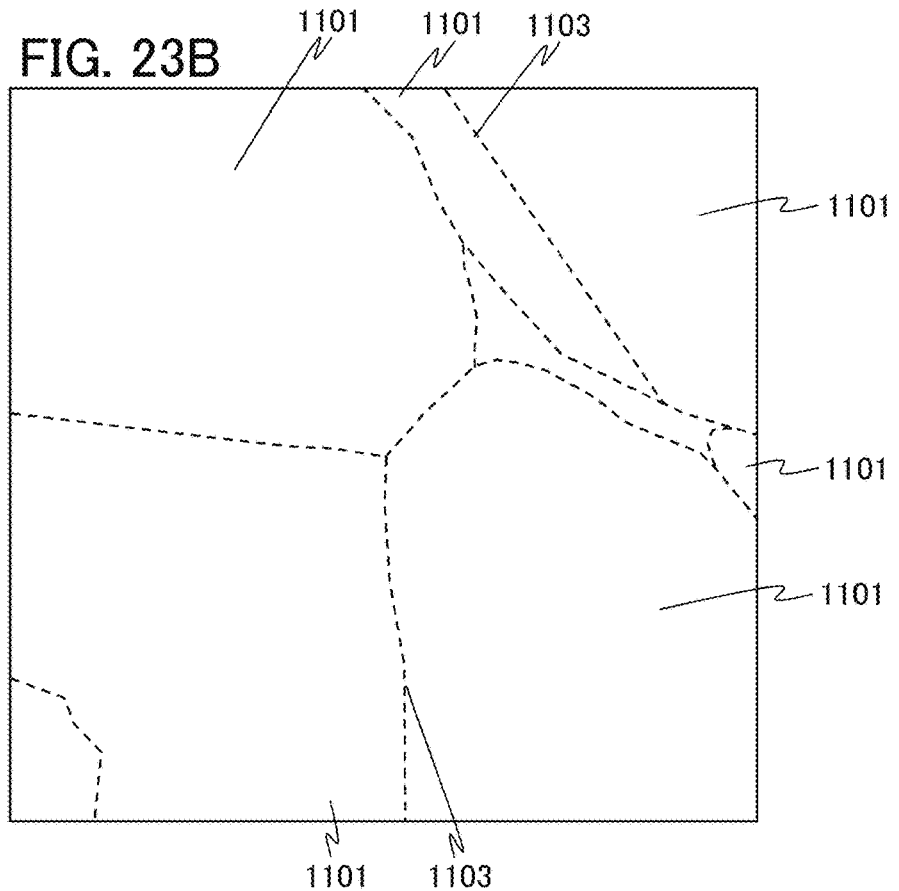

FIG. 23(A) shows a cross-sectional TEM image (a bright-field image) of Sample A. The magnification of FIG. 23(A) is 100,000 times. In FIG. 23(A), a region where the concentration (luminance) of the TEM image is substantially uniform probably has a substantially uniform crystal orientation, i.e., a single crystal. A region where the concentration (luminance) of the TEM image changes is probably a grain boundary. FIG. 23(B) shows a schematic diagram corresponding to FIG. 23(A). As shown in FIG. 23(A) and FIG. 23(B), the positive electrode active material particle was found to include a crystal grain boundary 1103 between a plurality of crystal grains 1101 and a crystal grain.

Figure 24A:
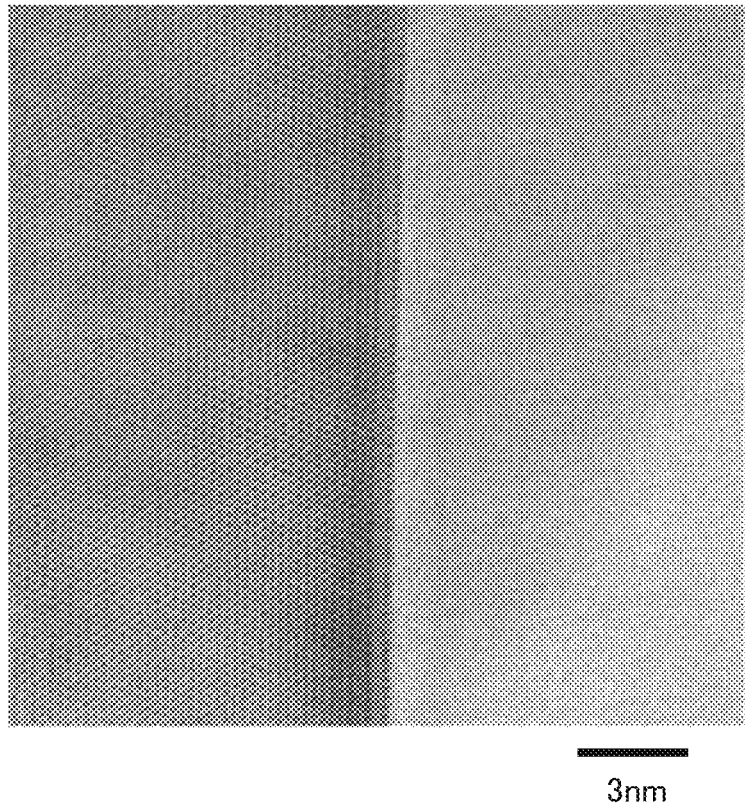
FIGS. 24A and 24B Cross-sectional STEM images of a positive electrode active material particle according to Example.
Figure 24B:
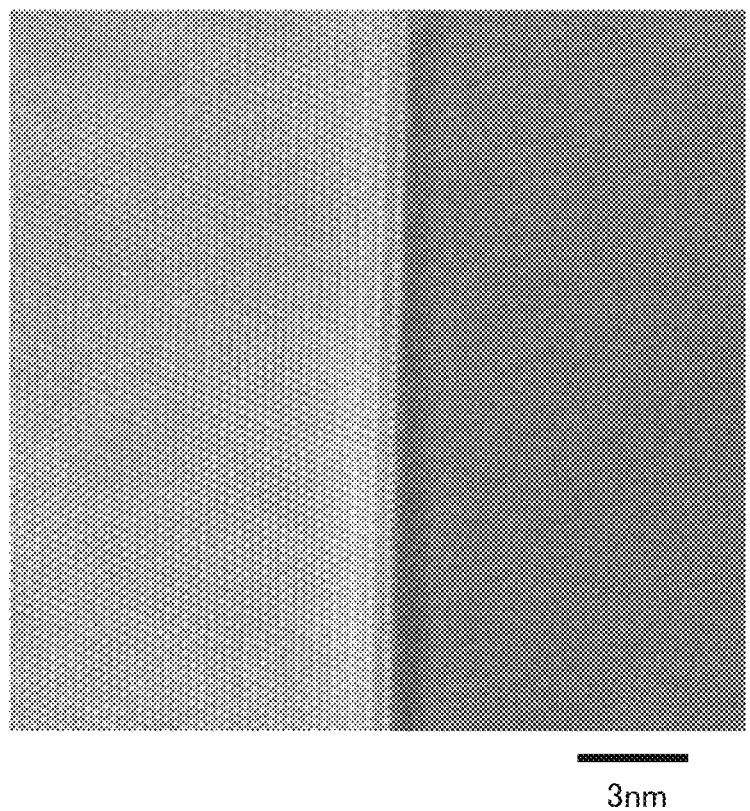

FIG. 24(A) shows a cross-sectional STEM image (a bright-field image) of Sample A, and FIG. 24(B) shows a HAADF-STEM image of the same point. The magnification of FIG. 24(A) and FIG. 24(B) is 8,000,000 times. A crystal lattice image was observed in a crystal grain region in FIG. 24(A) and FIG. 24(B).

Figure 25:
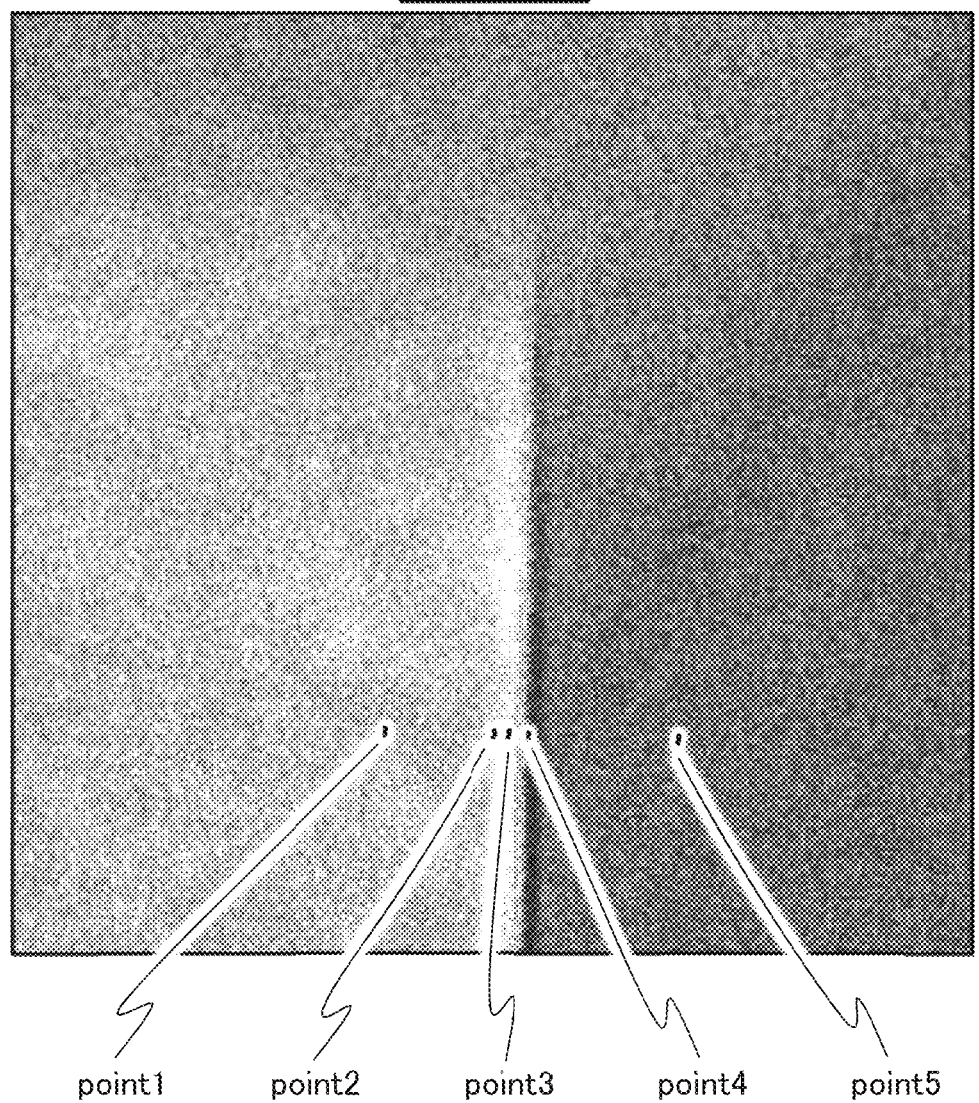
FIG. 25 A view showing a HAADF-STEM image and an EDX point analysis of a positive electrode active material particle according to Example.
Figure 26:
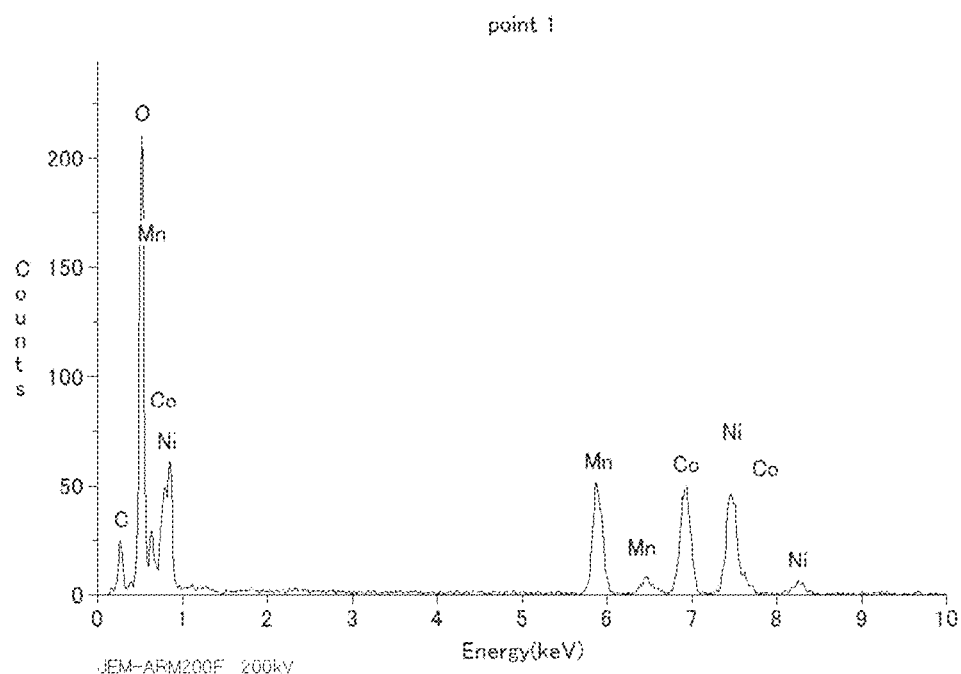
FIG. 26 A graph showing the EDX spectrum and the quantification results of a positive electrode active material particle according to Example.
Figure 27:
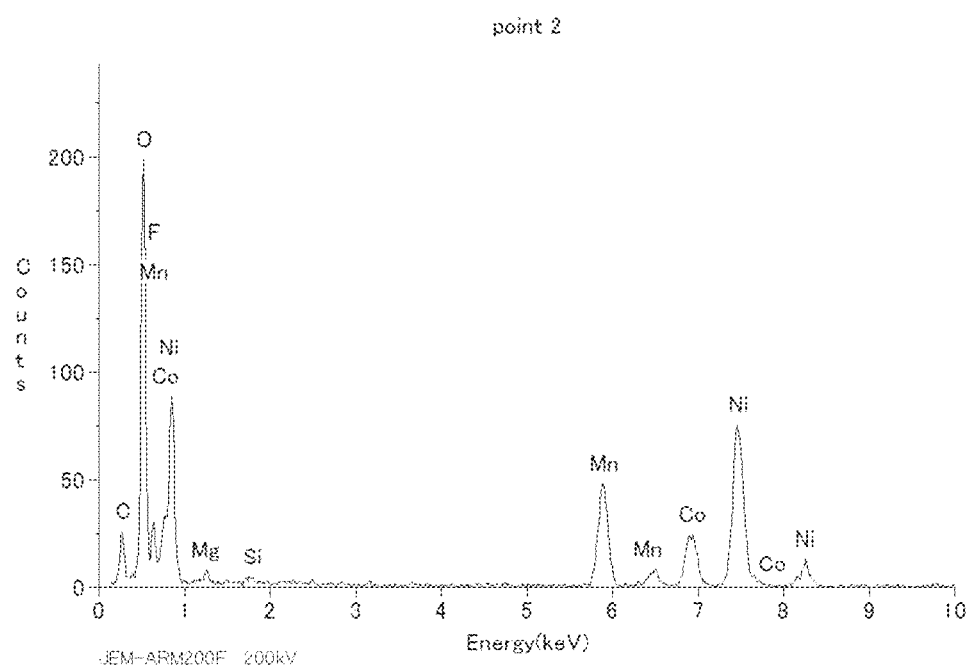
FIG. 27 A graph showing the EDX spectrum and the quantification results of a positive electrode active material particle according to Example.
Figure 28:
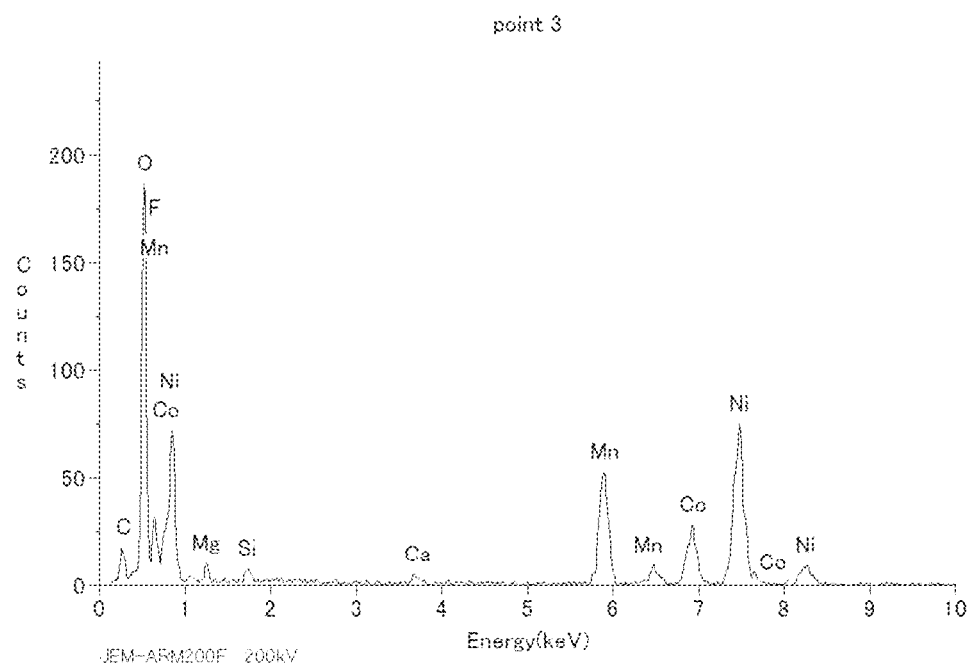
FIG. 28 A graph showing the EDX spectrum and the quantification results of a positive electrode active material particle according to Example.
Figure 29:
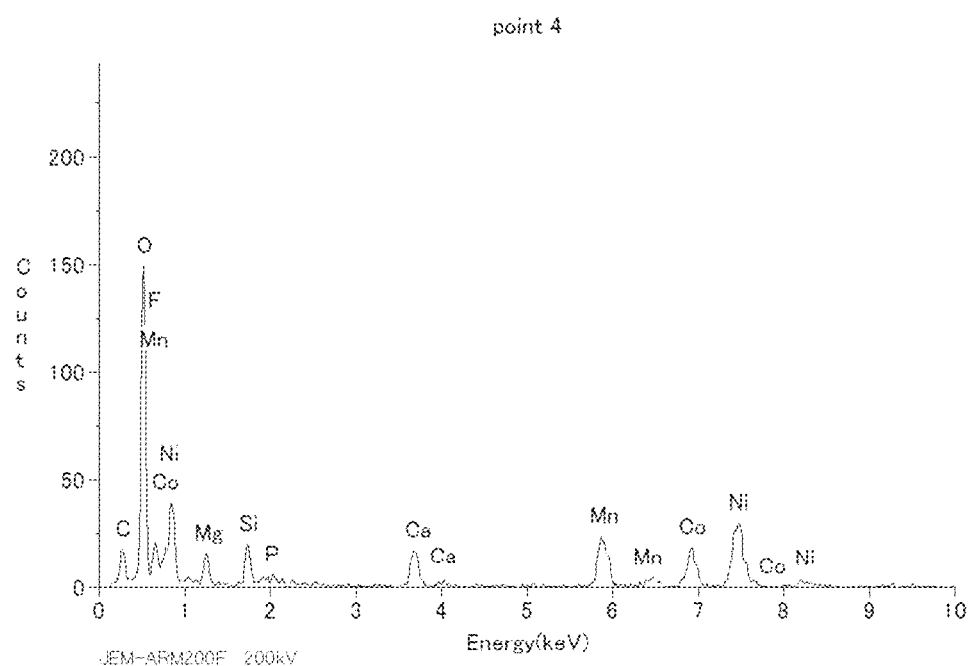
FIG. 29 A graph showing the EDX spectrum and the quantification results of a positive electrode active material particle according to Example.
Figure 30:
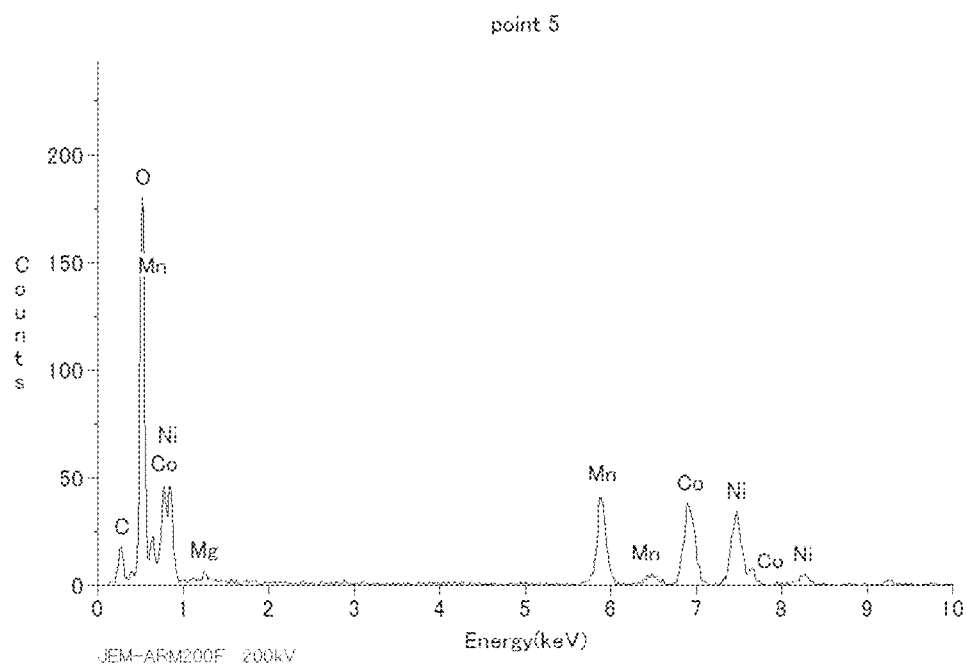
FIG. 30 A graph showing the EDX spectrum and the quantification results of a positive electrode active material particle according to Example.

Next, EDX spectra of a cross section of Sample A will be described. In the EDX measurement, measurement points were subjected to electron beam irradiation and the energy of characteristic X-ray generated by the irradiation and its frequency were measured, whereby the EDX spectra were obtained. FIG. 25 shows a cross-sectional HAADF-STEM image of Sample A and the EDX measurement points. The EDX measurement points consist of five points, point 1 to point 5. The point 2 to the point 4 are in the crystal grain boundary and the periphery thereof, and the point 1 and the point 5 are in a position apart from the crystal grain boundary, i.e., in a crystal grain. FIG. 26 shows the EDX spectra and the quantification results of the point 1; FIG. 27, the point 2; FIG. 28, the point 3; FIG. 29, the point 4; and FIG. 30, the point 5. In FIG. 26 to FIG. 30, the horizontal axis represents the energy of characteristic X-ray [keV] and the vertical axis represents the characteristic X-ray intensity [Counts].

The peaks observed at the point 1 to the point 5 are derived from electron transition to the K shell in carbon (C), oxygen (O), fluorine (F), magnesium (Mg), silicon (Si), phosphorus (P), sulfur (S), calcium (Ca), manganese (Mn), cobalt (Co), and nickel (Ni). The obtained spectra were separated into those of the respective elements, so that the atomic concentrations were obtained.

Next, the EDX plane analysis will be described. The measurement in which a region is measured while scanning and evaluated two-dimensionally is referred to as surface analysis in some cases. In this example, the EDX measurement was performed on 256×256 points in the region.

Figure 31A:
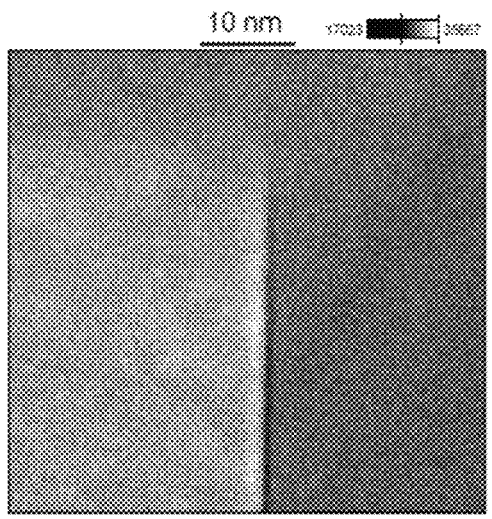
FIGS. 31A to 31F Mapping images in EDX plane analysis of a positive electrode active material particle according to Example.
Figure 31B:
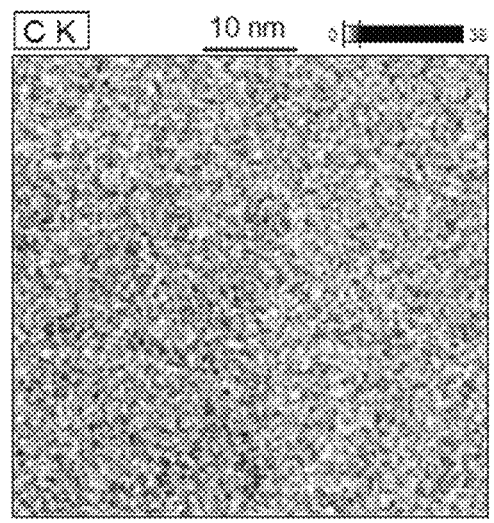
Figure 31C:
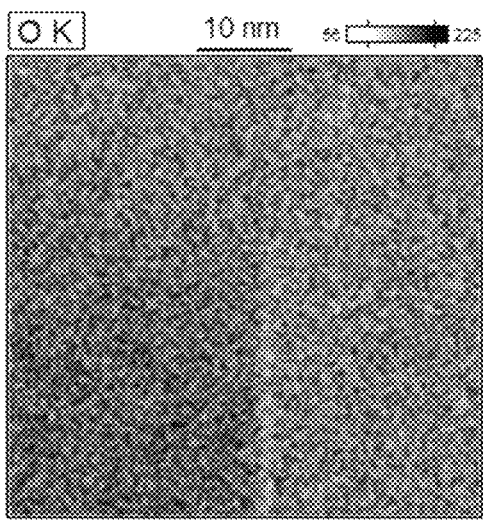
Figure 31D:
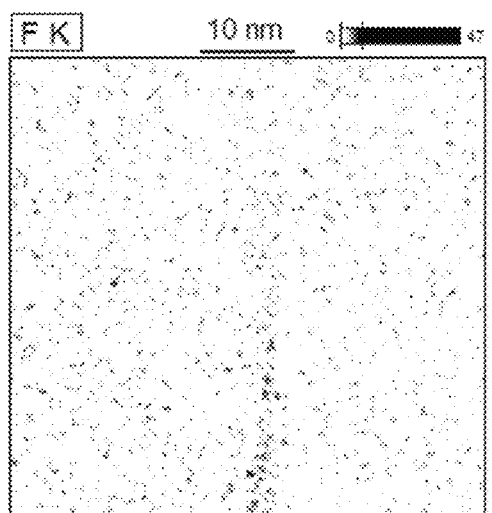
Figure 31E:
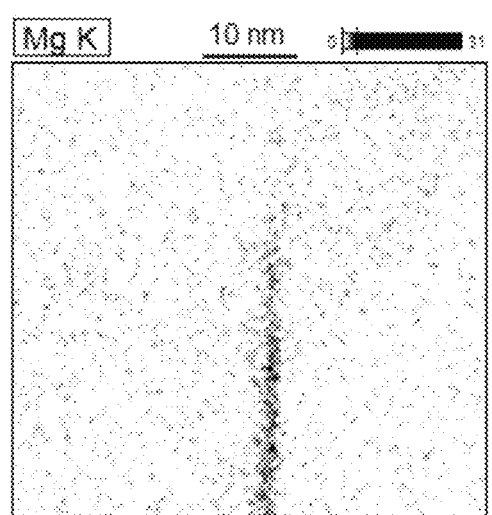
Figure 31F:
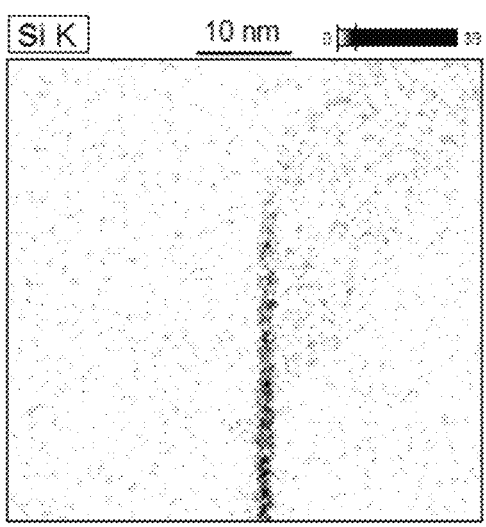
Figure 32A:
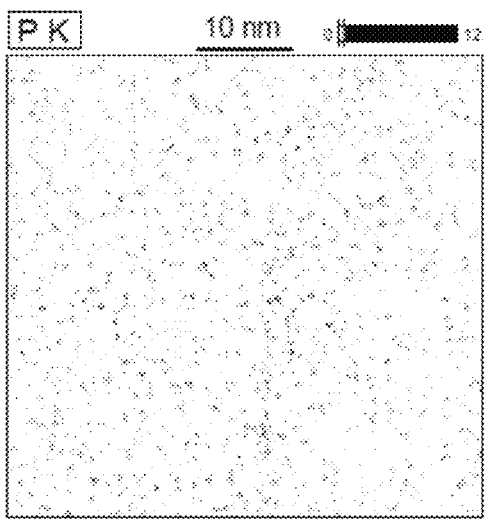
FIGS. 32A to 32F Mapping images in the EDX plane analysis of the positive electrode active material particle according to Example.
Figure 32B:
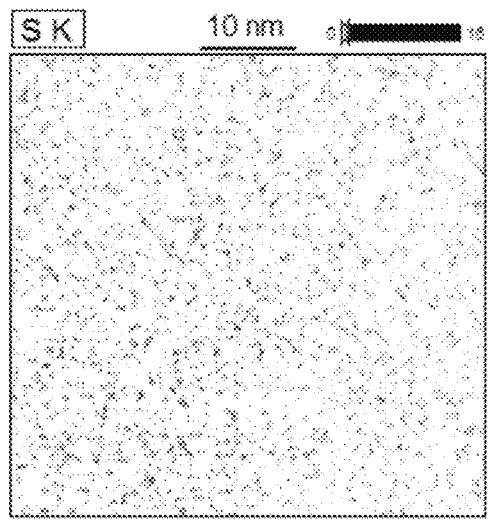
Figure 32C:
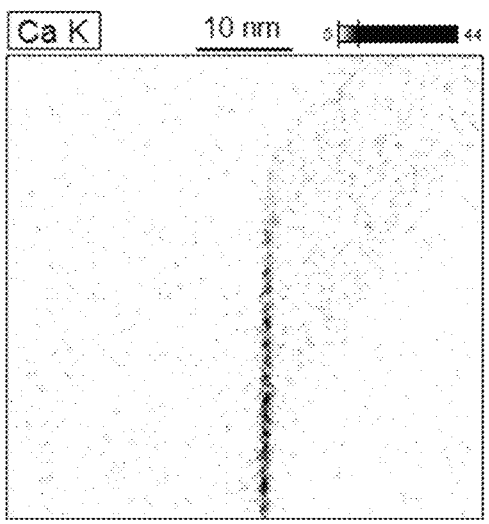
Figure 32D:
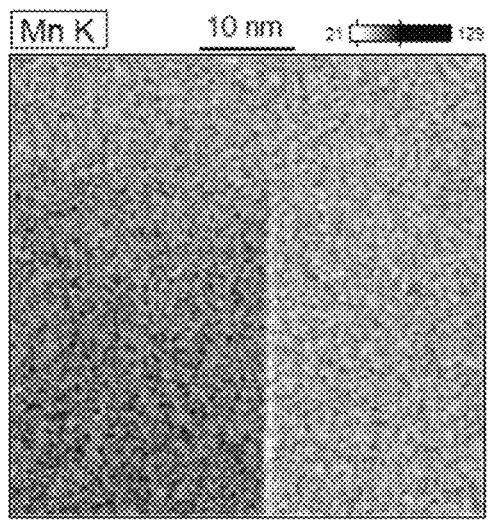
Figure 32E:
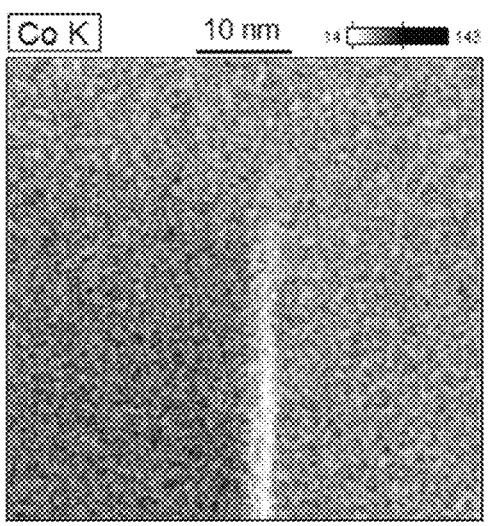

FIG. 31(A) shows a HAADF-STEM image of the region of Sample A that was subjected to the EDX plane analysis. The EDX plane analysis was performed in a region including a crystal grain and a crystal grain boundary. FIG. 31(B) shows a mapping image of carbon in the EDX plane analysis of the region illustrated in FIG. 31(A); FIG. 31(C), oxygen; FIG. 31(D), fluorine; FIG. 31(E), magnesium; FIG. 31(F), silicon; FIG. 32(A), phosphorus; FIG. 32(B), sulfur; FIG. 32(C), calcium; FIG. 32(D), manganese; FIG. 32(E), cobalt; and FIG. 32(F), nickel.

FIG. 31(B) to FIG. 31(F) and FIG. 32(A) to FIG. 32(F) each show the intensity mapping of characteristic X-ray obtained by the EDX measurement; a measurement point with a low characteristic X-ray intensity is denoted with a pale color (white), and a measurement point with a higher characteristic X-ray intensity is denoted with a darker color (black). In other words, the pale color (white) measurement point means a low atomic concentration whereas the dark color (black) measurement point means a high atomic concentration. Note that in FIG. 31(B) to FIG. 31(F) and FIG.

Figure 32F:
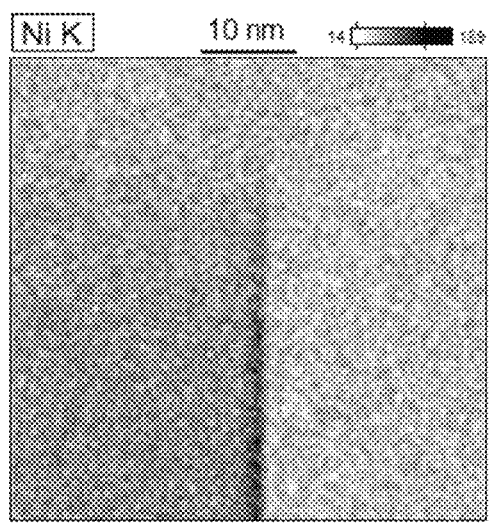

32(A) to FIG. 32(F), the scale of the characteristic X-ray intensity differs for each element so as to clearly show the distribution in the region.

As shown in FIG. 31(B) to FIG. 31(F) and FIG. 32(A) to FIG. 32(F), the concentrations of fluorine, magnesium, silicon, and calcium were found to be high in the crystal grain boundary and the periphery thereof. Note that silicon and calcium were probably contained in a reagent used as a raw material.

Data in linear regions was extracted from the EDX plane analysis shown in FIG. 31(B) to FIG. 31(F) and FIG. 32(A) to FIG. 32(F), and the distribution of the atomic concentrations in the positive electrode active material particle was evaluated. Such one-dimensional evaluation of the linear region is referred to as a linear analysis in some cases.

Figure 33A:
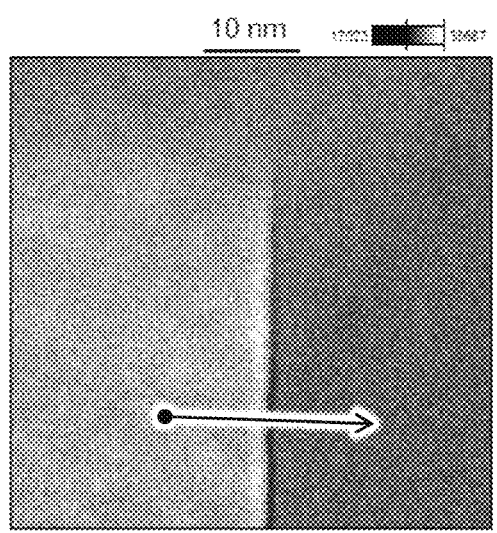
FIGS. 33A and 33B Views showing EDX linear analysis of a positive electrode active material particle according to Example.

FIG. 33(A) shows a HAADF-STEM image of the region of Sample A that was subjected to the EDX linear analysis. In FIG. 33(A), the region subjected to the EDX linear analysis is denoted by an arrow. The EDX linear analysis was performed on a crystal grain, a crystal grain boundary, and a region across the crystal grain.

Figure 34A:
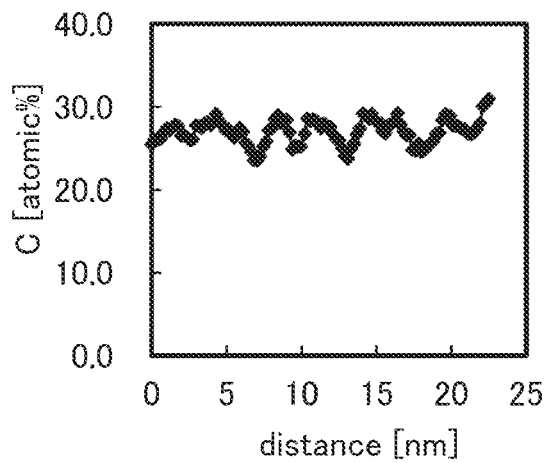
FIGS. 34A to 34F Graphs showing atomic concentrations in the EDX linear analysis of the positive electrode active material particle according to Example.
Figure 34B:
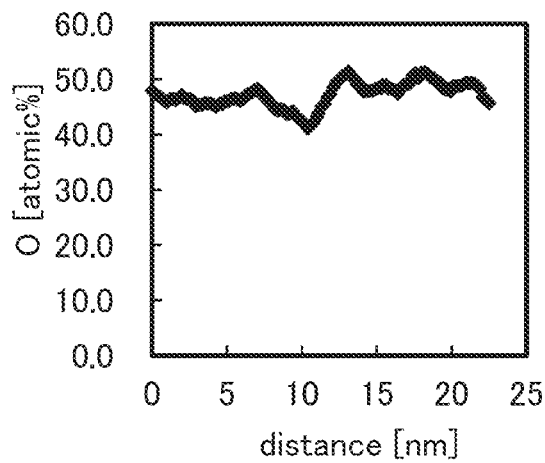
Figure 34C:
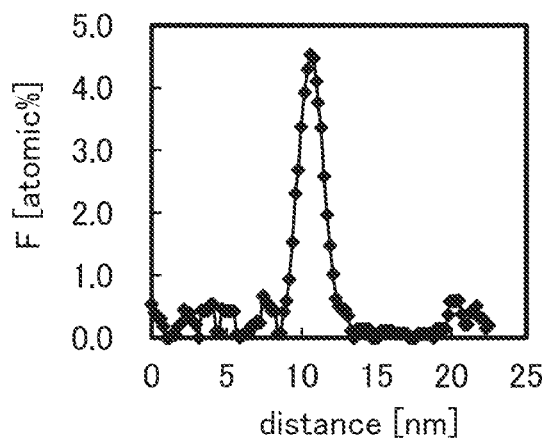
Figure 34D:
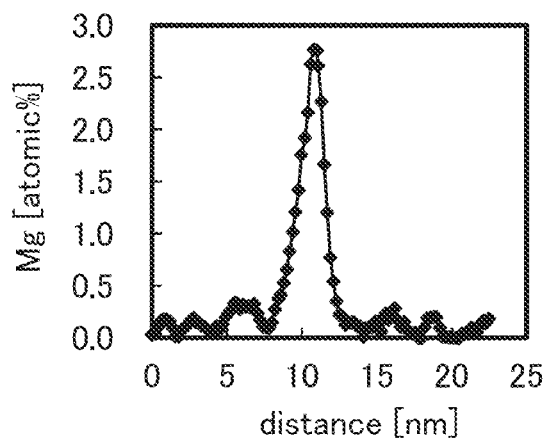
Figure 34E:
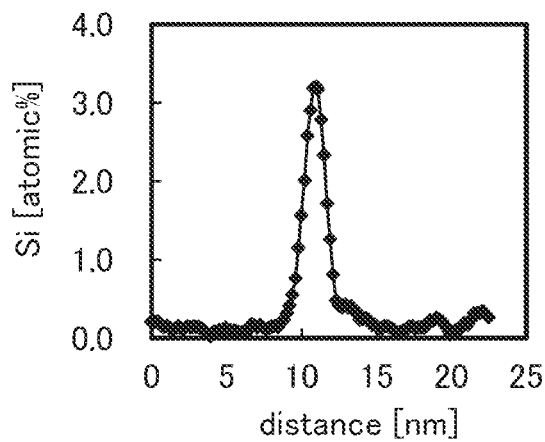
Figure 34F:
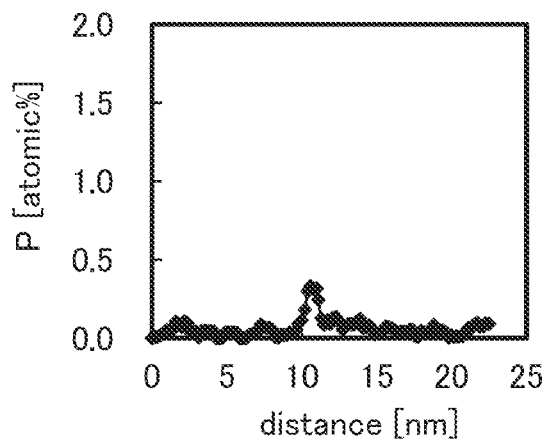
Figure 35A:
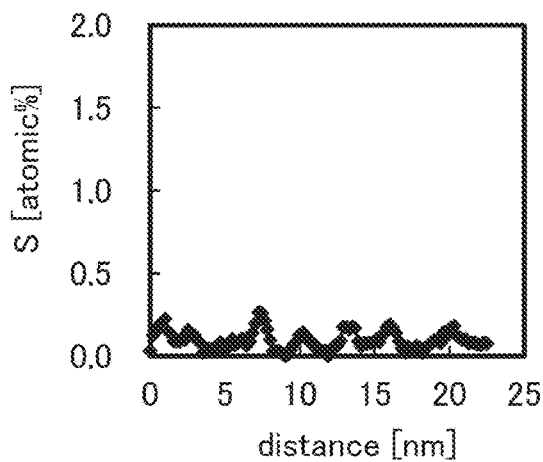
FIGS. 35A to 35F Graphs showing atomic concentrations in the EDX linear analysis of the positive electrode active material particle according to Example.
Figure 35B:
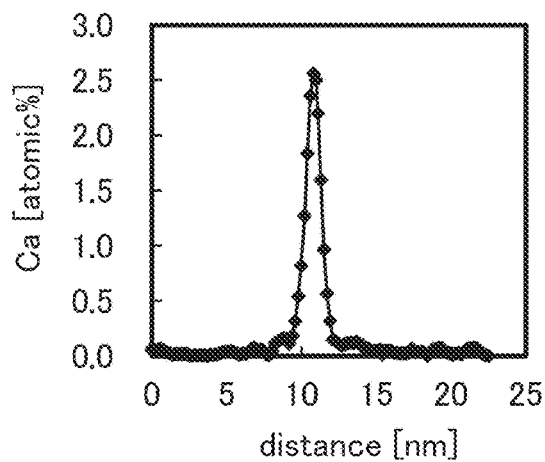
Figure 35C:
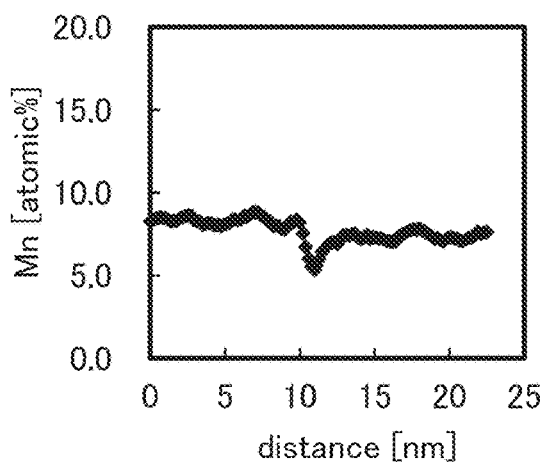
Figure 35D:
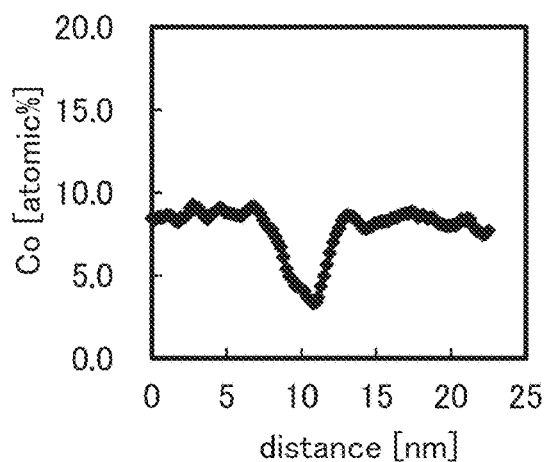
Figure 35E:
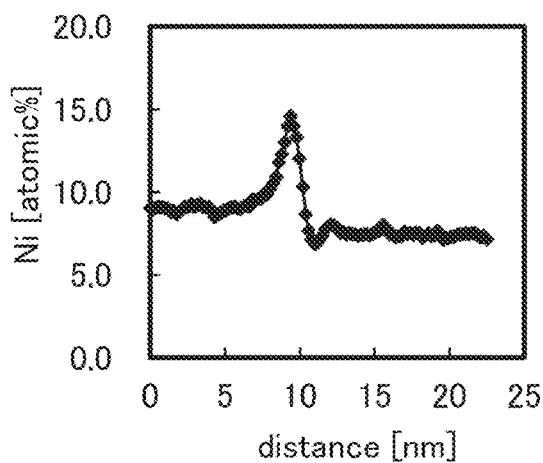

FIG. 34(A) shows the atomic concentration of carbon in the EDX linear analysis of the region illustrated in FIG. 33(A); FIG. 34(B), oxygen; FIG. 34(C), fluorine; FIG. 34(D), magnesium; FIG. 34(E), silicon; FIG. 34(F), phosphorus; FIG. 35(A), sulfur; FIG. 35(B), calcium; FIG. 35(C), manganese; FIG. 35(D), cobalt; and FIG. 35(E), nickel.

In FIG. 34(A) to FIG. 34(F) and FIG. 35(A) to FIG. 35(E), the horizontal axis represents the distance [nm] and the vertical axis represents the atomic concentration [atomic %]. The distance on the horizontal axis is shown so as to increase from the starting point (distance=0 nm), which is indicated as a black dot on one end of the arrow illustrated in FIG. 34(A), to the other end (ending portion). The atomic concentration on the vertical axis shows the percentage of the number of atoms for each element with respect to the total number of atoms of carbon, oxygen, fluorine, magnesium, silicon, phosphorus, sulfur, calcium, manganese, cobalt, and nickel as 100 atomic %.

As shown in FIG. 33(A), FIG. 34(A) to FIG. 34(F), and FIG. 35(A) to FIG. 35(E), the concentrations of fluorine, magnesium, silicon, and calcium were found to be higher in the crystal grain boundary and the periphery thereof than in the crystal grain region. It was also found that the crystal grain boundary and the periphery thereof had a region with a width greater than or equal to 1 nm and less than or equal to 10 nm.

The crystal grain boundary and the periphery thereof were found to include oxygen, magnesium, and fluorine. The crystal grain boundary and the periphery thereof were found to include magnesium oxide. Fluorine is probably substituted for part of oxygen included in magnesium oxide.

In contrast, fluorine, magnesium, silicon, and calcium were at the level of the lower detection limit in the crystal grain region.

Phosphorus and sulfur were at the level of the lower detection limit in the crystal grain and the crystal grain boundary.

The carbon concentration detected in the crystal grain and the crystal grain boundary probably includes carbon derived from a carbon coat film used as a protective film. It was thus not possible to determine the actual carbon concentration in the crystal grain and the crystal grain boundary.

The atomic concentrations of manganese, cobalt, and nickel, which are transition metals, were found to be lower in the crystal grain boundary and the periphery thereof than in the crystal grain.

Figure 35F:
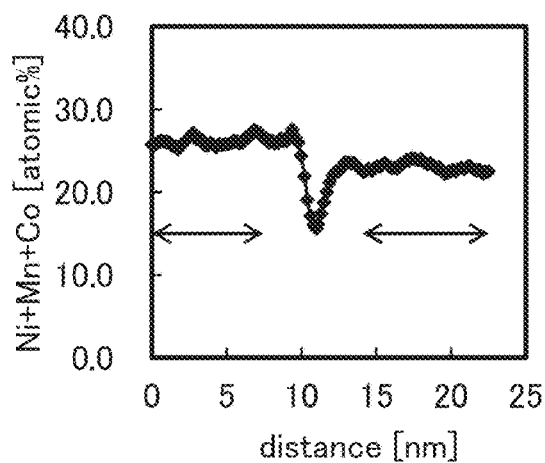

FIG. 35(F) shows the total atomic concentration of nickel, manganese, and cobalt, which are transition metals. In FIG. 35(F), the horizontal axis represents the distance [nm] and the vertical axis represents the total atomic concentration [atomic %] of nickel, manganese, and cobalt (Ni+Mn+Co). Specifically, the total atomic concentration of nickel, manganese, and cobalt (Ni+Mn+Co) is the sum of atomic concentrations of nickel, manganese, and cobalt in each measurement point of EDX. The total atomic concentration of nickel, manganese, and cobalt (Ni+Mn+Co) in Sample A can be regarded as the atomic concentration of the transition metal. As shown in FIG. 35(F), the atomic concentration of the transition metal was found to be prone to be lower in the crystal grain boundary and the periphery thereof than that in the crystal grain region. It was also found that the atomic concentration of the transition metal in the crystal grain region was substantially uniform without large variation.

Figure 36A:
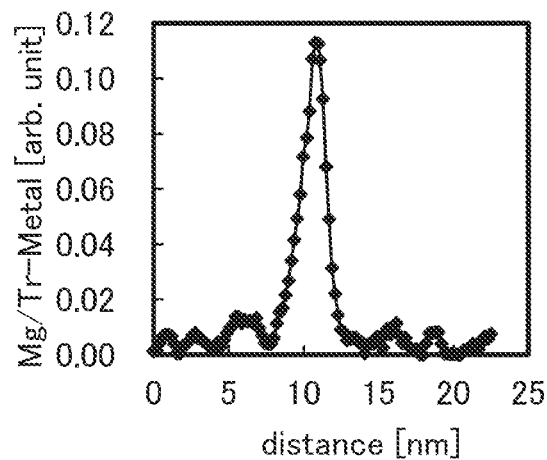
FIGS. 36A to 36D Graphs showing the ratio of atomic numbers in the EDX linear analysis of the positive electrode active material particle according to Example.

FIG. 36(A) shows the ratio of the atomic concentration of magnesium (Mg) to the atomic concentration of the transition metal in the crystal grain. In FIG. 36(A), the horizontal axis represents the distance [nm] and the vertical axis represents the ratio of the atomic concentration of magnesium to the atomic concentration of the transition metal in the crystal grain (Mg/Tr-Metal) (arb, unit).

The atomic concentration of the transition metal (Tr-Metal) in the crystal grain is described. The average atomic concentration of the transition metals in the crystal grain was used as the atomic concentration of the transition metal (Tr-Metal) in the crystal grain. Specifically, the crystal grain region was defined as a region having a magnesium (Mg) atomic concentration at a lower detection limit, and the average atomic concentration of the transition metals in that region was calculated. The crystal grain region used for the calculation of the average value is indicated by arrows in FIG. 35(F).

As shown in FIG. 36(A), the crystal grain boundary and the periphery thereof were found to include a region where the ratio of the magnesium atomic concentration to the atomic concentration of the transition metal (Mg/Tr-Metal) in the crystal grain is greater than or equal to 0.030. Magnesium was found to be segregated in the crystal grain boundary and the periphery thereof. The crystal grain boundary and the periphery thereof probably include magnesium oxide. Sample A of one embodiment of the present invention includes magnesium oxide in the crystal grain boundary and the periphery thereof, offering chemical and structural stability to the positive electrode active material particle, so that deterioration of the positive electrode active material, such as dissolution of the transition metal to an electrolyte solution, release of oxygen, and unstable crystal structure, can be inhibited. In addition, cracking of the positive electrode active material particle can be inhibited. Release of oxygen from the positive electrode active material particle can also be inhibited. The use of such a positive electrode active material particle can inhibit deterioration of a power storage device. In addition, a highly safe power storage device can be achieved. When the charge voltage is increased, the amount of lithium included in a positive electrode is reduced when charging, and the crystal structure of a positive electrode active material particle is prone to change; thus, Sample A is particularly preferable as the positive electrode active material particle.

Figure 36B:
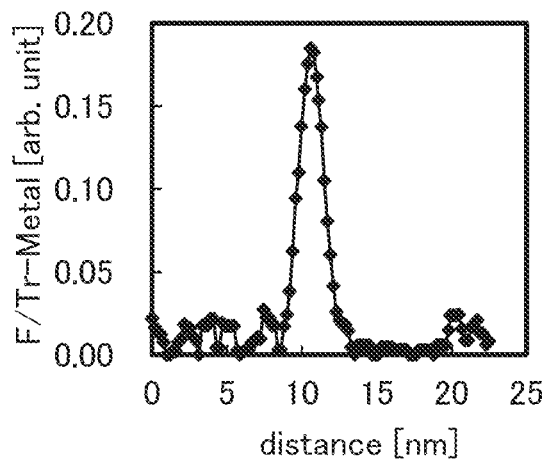

FIG. 36(B) shows the ratio of the fluorine atomic concentration to the atomic concentration of the transition metal (Tr-Metal) in the crystal grain. In FIG. 36(B), the horizontal axis represents the distance [nm] and the vertical axis represents the ratio of the fluorine atomic concentration to the atomic concentration of the transition metal in the crystal grain (F/Tr-Metal).

As shown in FIG. 36(B), the crystal grain boundary and the periphery thereof were found to include a region where the ratio of the fluorine atomic concentration to the atomic concentration of the transition metal (F/Tr-Metal) in the crystal grain is greater than or equal to 0.030. Fluorine in the crystal grain boundary and the periphery thereof was found to contribute to efficient segregation of magnesium in the crystal grain boundary and the periphery thereof.

Note that in this specification and the like, "the ratio of the atomic concentration" is synonymous with "the ratio of the number of atoms", and "the ratio of the atomic concentration" can be replaced with "the ratio of the number of atoms". That is, the value of Mg/Tr-metal can be regarded as the ratio of the magnesium atomic concentration to the atomic concentration of the transition metal in the crystal grain, and can also be regarded as the ratio of the number of magnesium atoms to the number of atoms of the transition metals in the crystal grain.

Figure 36C:
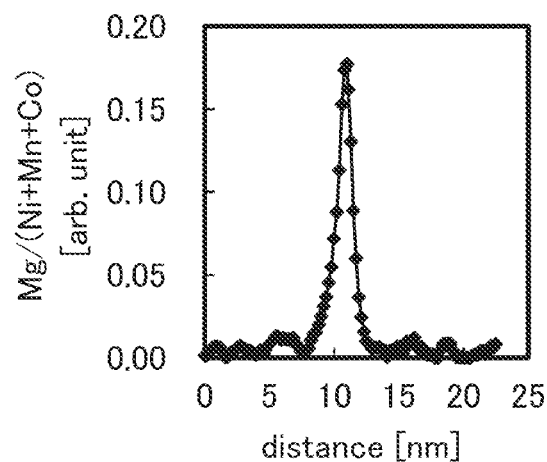

FIG. 36(C) shows the ratio of the magnesium (Mg) atomic concentration to the total atomic concentration of nickel, manganese, and cobalt (Ni+Mn+Co) at each measurement point of EDX. In FIG. 36(C), the horizontal axis represents the distance [nm] and the vertical axis represents the ratio of the magnesium atomic concentration to the total atomic concentration of nickel, manganese, and cobalt (Mg/(Ni+Mn+Co)) at each measurement point of EDX.

The total atomic concentration of nickel, manganese, and cobalt (Ni+Mn+Co) at each measurement point of EDX is the same as that in the data shown in FIG. 35(F).

As shown in FIG. 36(C), the crystal grain boundary and the periphery thereof were found to include a region where the ratio of the magnesium atomic concentration to the total atomic concentration of nickel, manganese, and cobalt (Mg/(Ni+Mn+Co)) in the crystal grain is greater than or equal to 0.030. Magnesium was found to be segregated in the crystal grain boundary and the periphery thereof.

Figure 36D:
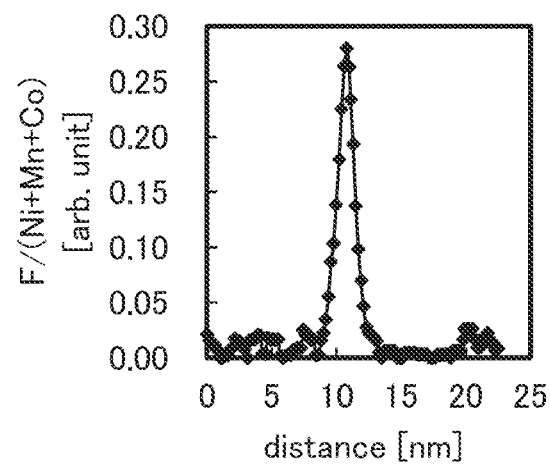

FIG. 36(D) shows the ratio of the fluorine atomic concentration to the total atomic concentration of nickel, manganese, and cobalt (Ni+Mn+Co) at each measurement point of EDX. In FIG. 36(D), the horizontal axis represents the distance [nm] and the vertical axis represents the ratio of the fluorine atomic concentration to the total atomic concentration of nickel, manganese, and cobalt (F/(Ni+Mn+Co)) at each measurement point of EDX.

As shown in FIG. 36(D), the crystal grain boundary and the periphery thereof were found to include a region where the ratio of the fluorine atomic concentration to the atomic concentration of the transition metal (F/(Ni+Mn+Co)) in the crystal grain is greater than or equal to 0.030. Fluorine in the crystal grain boundary and the periphery thereof was found to contribute to efficient segregation of magnesium in the crystal grain boundary and the periphery thereof.

Similar EDX measurement was performed on another portion of Sample A.

Figure 37A:
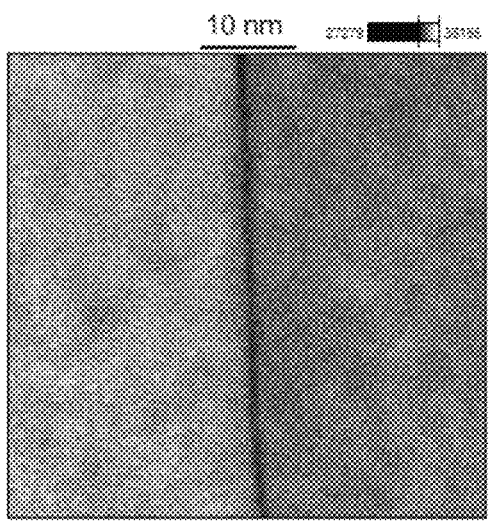
FIGS. 37A to 37F Mapping images in EDX plane analysis of a positive electrode active material particle according to Example.
Figure 37B:
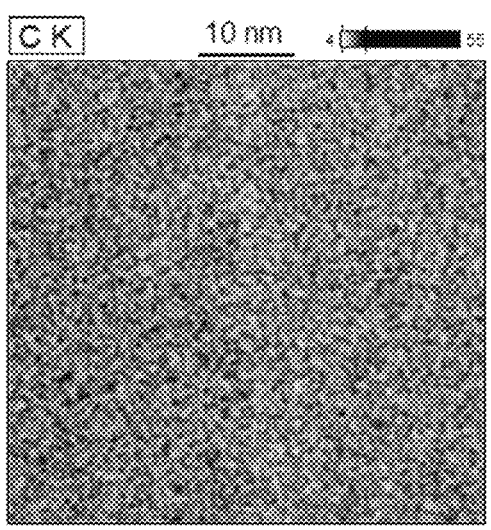
Figure 37C:
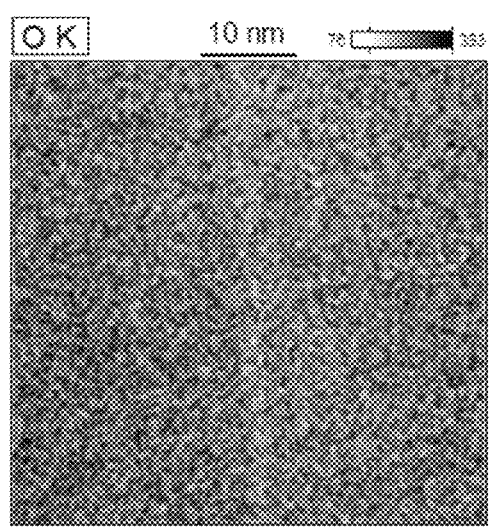
Figure 37D:
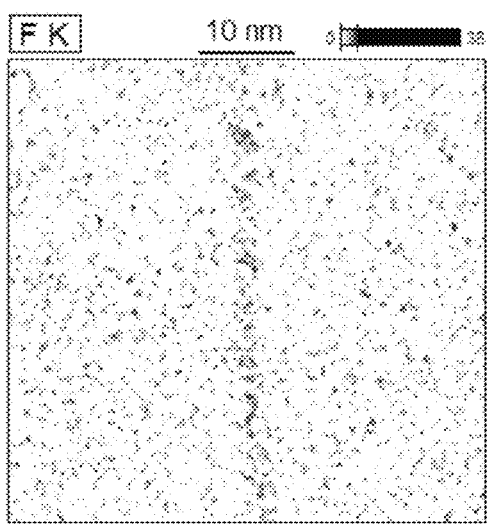
Figure 37E:
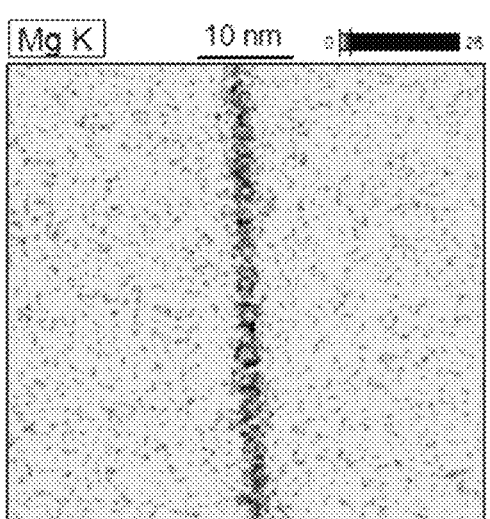
Figure 37F:
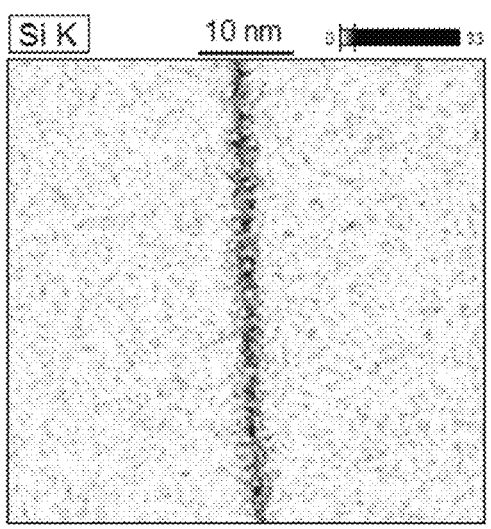
Figure 38A:
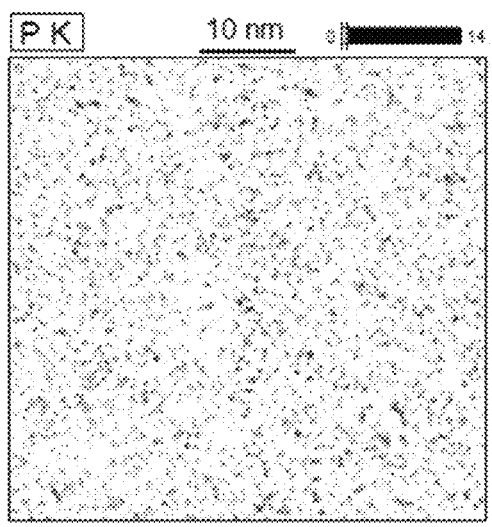
FIGS. 38A to 38F Mapping images in EDX plane analysis of a positive electrode active material particle according to Example.
Figure 38B:
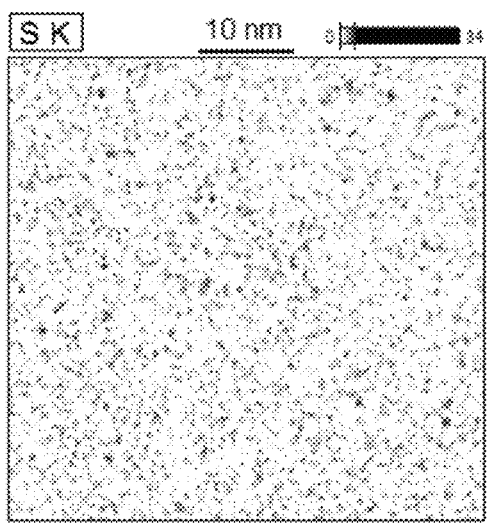
Figure 38C:
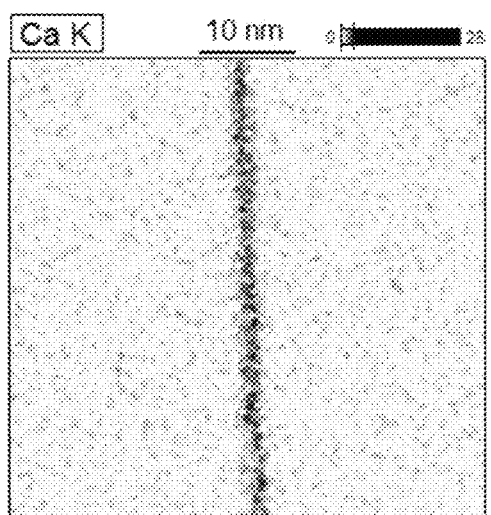
Figure 38D:
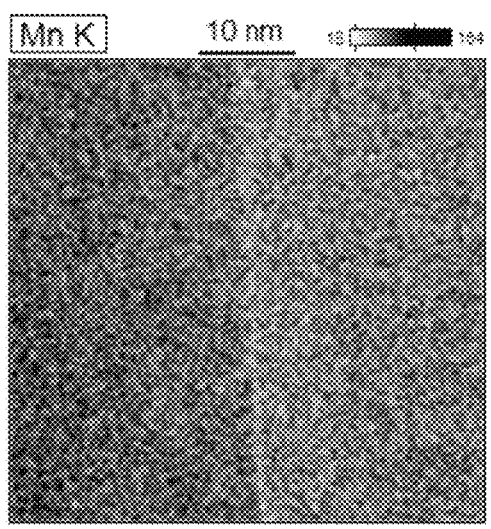
Figure 38E:
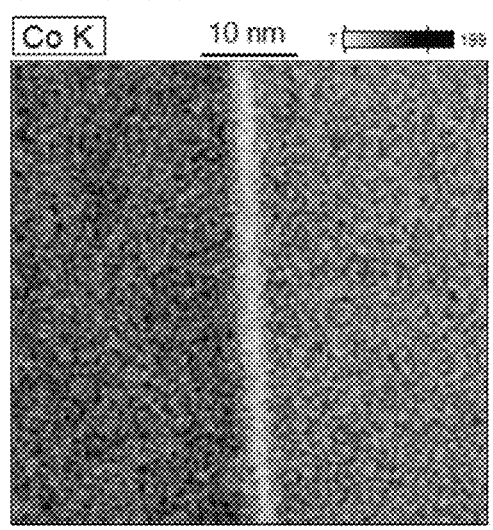
Figure 38F:
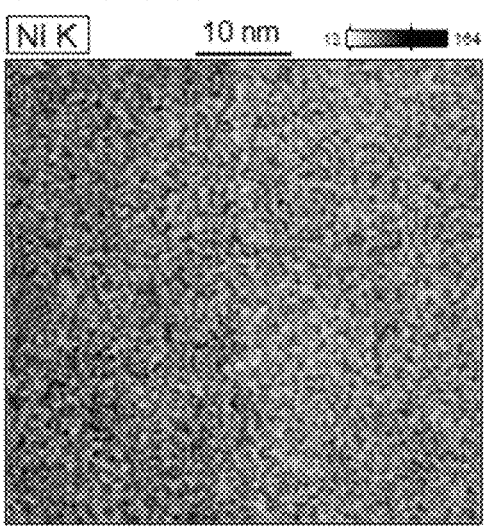

FIG. 37(A) shows a HAADF-STEM image of the region of Sample A that was subjected to the EDX plane analysis. The EDX plane analysis was performed in a region including a crystal grain and a crystal grain boundary. FIG. 37(B) shows a mapping image of carbon in the EDX plane analysis of the region illustrated in FIG. 37(A); FIG. 37(C), oxygen; FIG. 37(D), fluorine; FIG. 37(E), magnesium; FIG. 37(F), silicon; FIG. 38(A), phosphorus; FIG. 38(B), sulfur; FIG. 38(C), calcium; FIG. 38(D), manganese; FIG. 38(E), cobalt; and FIG. 38(F), nickel.

FIG. 37(B) to FIG. 37(F) and FIG. 38(A) to FIG. 38(F) each show the intensity mapping of characteristic X-ray obtained by the EDX measurement; a measurement point with a low characteristic X-ray intensity is denoted with a pale color (white), and a measurement point with a higher characteristic X-ray intensity is denoted with a darker color (black). In other words, the pale color (white) measurement point means a low atomic concentration whereas the dark color (black) measurement point means a high atomic concentration. Note that in FIG. 37(B) to FIG. 37(F) and FIG. 38(A) to FIG. 38(F), the scale of the characteristic X-ray intensity differs for each element so as to clearly show the distribution in the region.

As shown in FIG. 37(B) to FIG. 37(F) and FIG. 38(A) to FIG. 38(F), the concentrations of fluorine, magnesium, silicon, and calcium were found to be high in the crystal grain boundary and the periphery thereof. Note that silicon and calcium were probably contained in a reagent used as a raw material.

Data in linear regions was extracted from the EDX plane analysis shown in FIG. 37(B) to FIG. 37(F) and FIG. 38(A) to FIG. 38(F), and the distribution of the atomic concentrations in the positive electrode active material particle was evaluated.

Figure 33B:
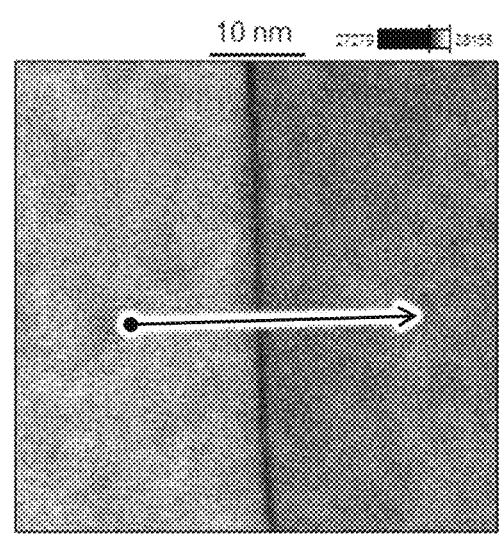

FIG. 33(B) shows a HAADF-STEM image of the region of Sample A that was subjected to the EDX linear analysis. In FIG. 33(B), the region subjected to the EDX linear analysis is denoted by an arrow. The EDX linear analysis was performed on a crystal grain, a crystal grain boundary, and a region across the crystal grain.

Figure 39A:
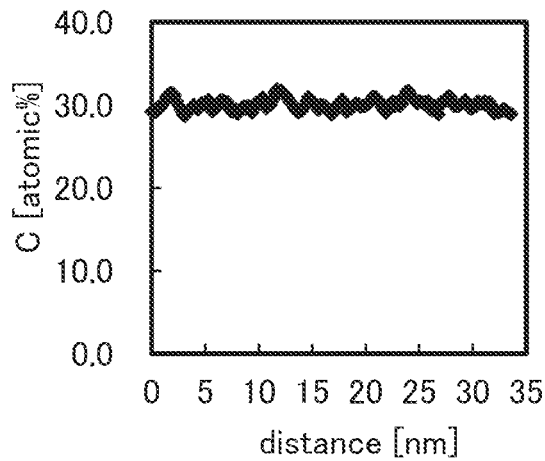
FIGS. 39A to 39F Graphs showing atomic concentrations in EDX linear analysis of a positive electrode active material particle according to Example.
Figure 39B:
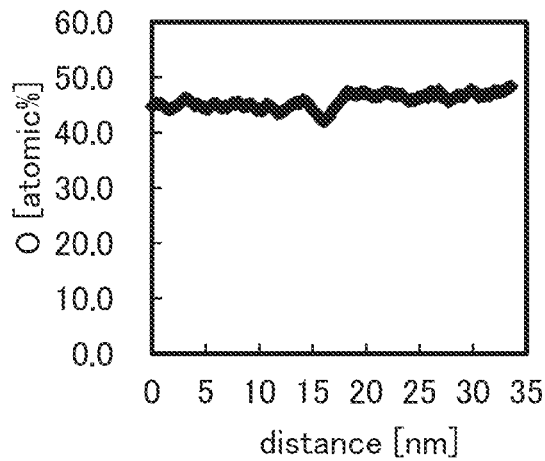
Figure 39C:
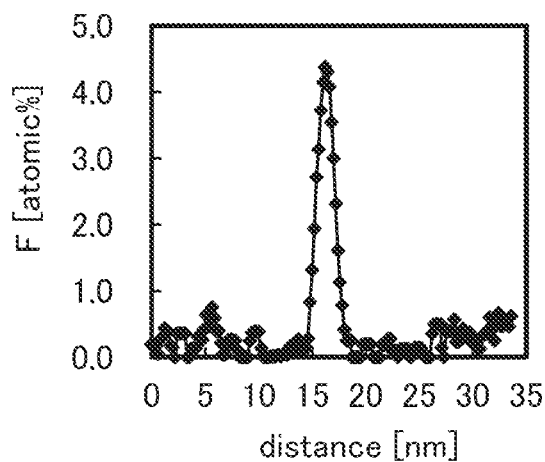
Figure 39D:
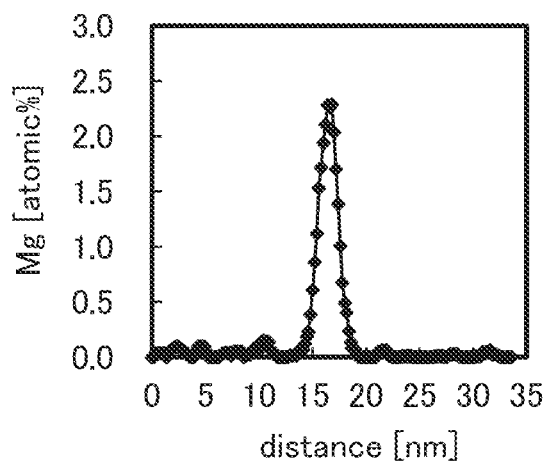
Figure 39E:
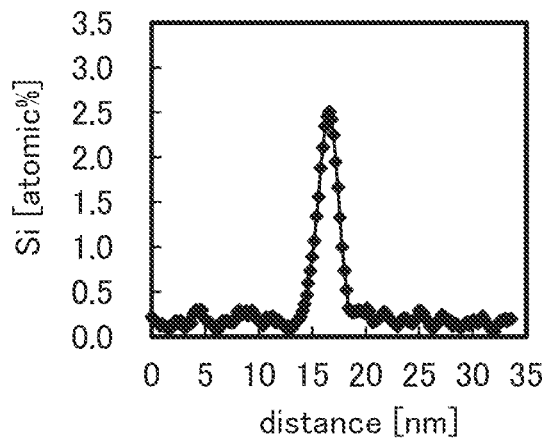
Figure 39F:
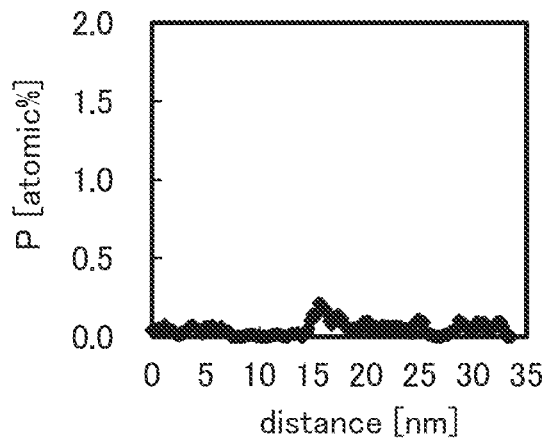
Figure 40A:
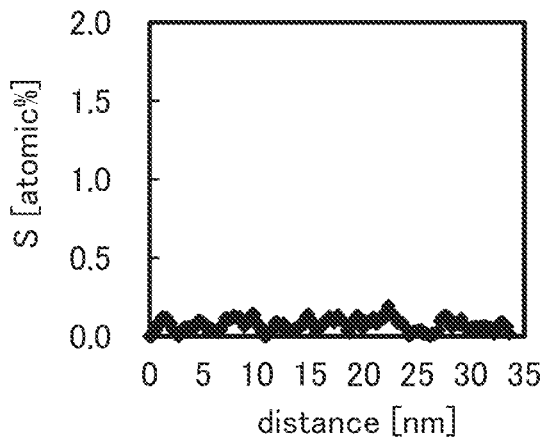
FIGS. 40A to 40F Graphs showing atomic concentrations in the EDX linear analysis of the positive electrode active material particle according to Example.
Figure 40B:
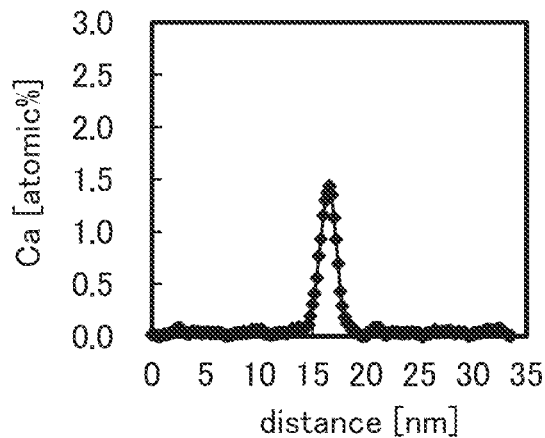
Figure 40C:
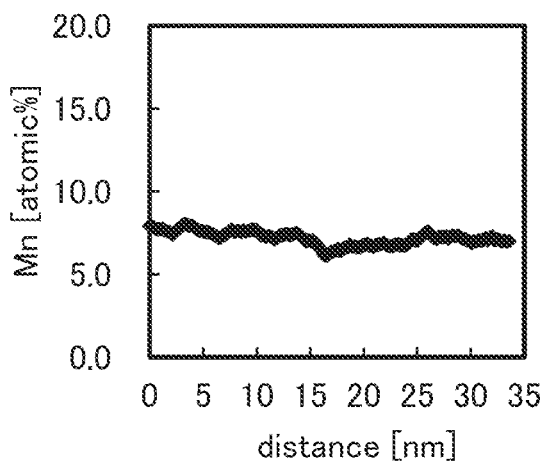
Figure 40D:
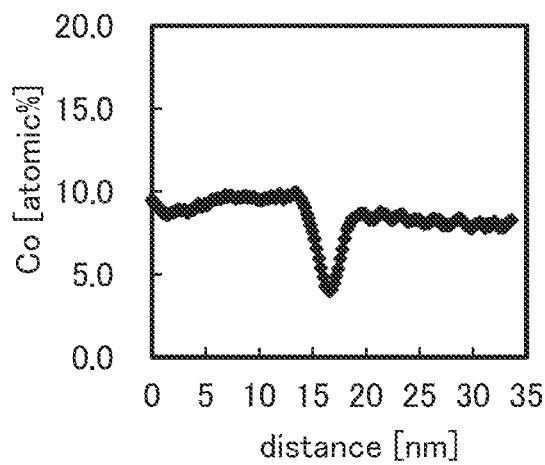
Figure 40E:
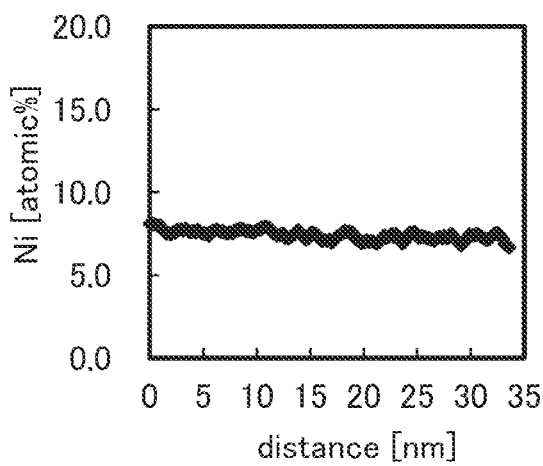

FIG. 39(A) shows the atomic concentration of carbon in the EDX linear analysis of the region illustrated in FIG. 33(B); FIG. 39(B), oxygen; FIG. 39(C), fluorine; FIG. 39(D), magnesium; FIG. 39(E), silicon; FIG. 39(F), phosphorus; FIG. 40(A), sulfur; FIG. 40(B), calcium; FIG. 40(C), manganese; FIG. 40(D), cobalt; and FIG. 40(E), nickel.

In FIG. 39(A) to FIG. 39(F) and FIG. 40(A) to FIG. 40(E), the horizontal axis represents the distance [nm] and the vertical axis represents the atomic concentration [atomic %]. The distance on the horizontal axis is shown so as to increase from the starting point (distance=0 nm), which is indicated as a black dot on one end of the arrow illustrated in FIG. 33(B), to the other end (ending portion). The atomic concentration on the vertical axis shows the percentage of the number of atoms for each element with respect to the total number of atoms of carbon, oxygen, fluorine, magnesium, silicon, phosphorus, sulfur, calcium, manganese, cobalt, and nickel as 100 atomic %.

As shown in FIG. 33(B), FIG. 39(A) to FIG. 39(F), and FIG. 40(A) to FIG. 40(E), the concentrations of fluorine, magnesium, silicon, and calcium were found to be higher in the crystal grain boundary and the periphery thereof than in the crystal grain region. It was also found that the crystal grain boundary and the periphery thereof had a region with a width greater than or equal to 1 nm and less than or equal to 10 nm.

The crystal grain boundary and the periphery thereof were found to include oxygen, magnesium, and fluorine. The crystal grain boundary and the periphery thereof were found to include magnesium oxide. Fluorine is probably substituted for part of oxygen included in magnesium oxide.

In contrast, fluorine, magnesium, silicon, and calcium were at the level of the lower detection limit in the crystal grain region.

Phosphorus and sulfur were at the level of the lower detection limit in the crystal grain and the crystal grain boundary.

The carbon concentration detected in the crystal grain and the crystal grain boundary probably includes carbon derived from a carbon coat film used as a protective film. It was thus not possible to determine the actual carbon concentration in the crystal grain and the crystal grain boundary.

The atomic concentrations of manganese, cobalt, and nickel, which are transition metals, were found to be lower in the crystal grain boundary and the periphery thereof than in the crystal grain.

Figure 40F:
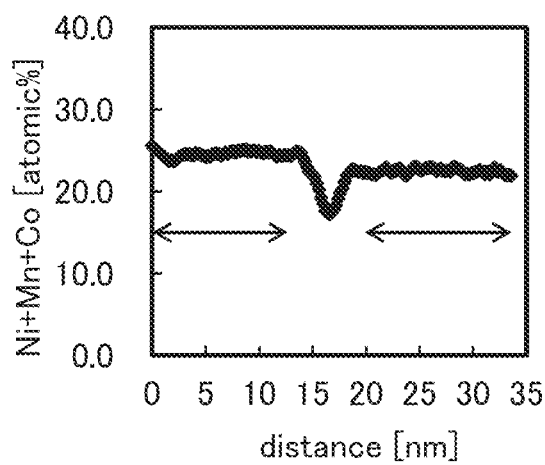

FIG. 40(F) shows the total atomic concentration of nickel, manganese, and cobalt, which are transition metals. In FIG. 40(F), the horizontal axis represents the distance [nm] and the vertical axis represents the total atomic concentration [atomic %] of nickel, manganese, and cobalt (Ni+Mn+Co). The total atomic concentration of nickel, manganese, and cobalt (Ni+Mn+Co) in Sample A can be regarded as the atomic concentration of the transition metal. As shown in FIG. 40(F), the atomic concentration of the transition metal was found to be prone to be lower in the crystal grain boundary and the periphery thereof than that in the crystal grain region. It was also found that the atomic concentration of the transition metal in the crystal grain region was substantially uniform without large variation.

Figure 41A:
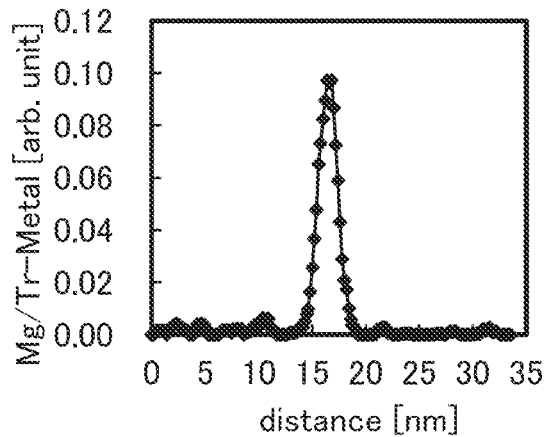
FIGS. 41A to 41D Graphs showing the ratio of atomic numbers in the EDX linear analysis of the positive electrode active material particle according to Example.

FIG. 41(A) shows the ratio of the atomic concentration of magnesium (Mg) to the atomic concentration of the transition metal in the crystal grain. In FIG. 41(A), the horizontal axis represents the distance [nm] and the vertical axis represents the ratio of the atomic concentration of magnesium to the atomic concentration of the transition metal in the crystal grain (Mg/Tr-Metal).

The average atomic concentration of the transition metals in the crystal grain was used as the atomic concentration of the transition metal (Tr-Metal) in the crystal grain. The crystal grain region used for the calculation of the average value is indicated by arrows in FIG. 40(F).

As shown in FIG. 41(A), the crystal grain boundary and the periphery thereof were found to include a region where the ratio of the magnesium atomic concentration to the atomic concentration of the transition metal (Mg-Tr-Metal) in the crystal grain is greater than or equal to 0.030. Magnesium was found to be segregated in the crystal grain boundary and the periphery thereof. The crystal grain boundary and the periphery thereof probably include magnesium oxide. Sample A of one embodiment of the present invention includes magnesium oxide in the crystal grain boundary and the periphery thereof, offering chemical and structural stability to the positive electrode active material particle, so that deterioration of the positive electrode active material, such as dissolution of the transition metal to an electrolyte solution, release of oxygen, and unstable crystal structure, can be inhibited. In addition, cracking of the positive electrode active material particle can be inhibited. Release of oxygen from the positive electrode active material particle can also be inhibited. The use of such a positive electrode active material particle can inhibit deterioration of a power storage device. In addition, a highly safe power storage device can be achieved. When the charge voltage is increased, the amount of lithium included in a positive electrode is reduced when charging, and the crystal structure of a positive electrode active material particle is prone to change; thus, Sample A is particularly preferable as the positive electrode active material particle.

Figure 41B:
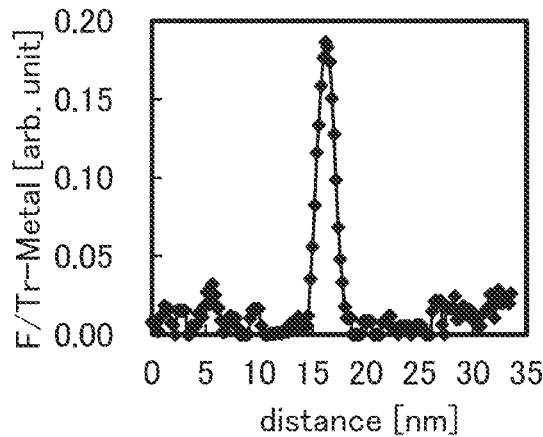

FIG. 41(B) shows the ratio of the fluorine atomic concentration to the atomic concentration of the transition metal (Tr-Metal) in the crystal grain. In FIG. 41(B), the horizontal axis represents the distance [nm] and the vertical axis represents the ratio of the fluorine atomic concentration to the atomic concentration of the transition metal in the crystal grain (F/Tr-Metal).

As shown in FIG. 41(B), the crystal grain boundary and the periphery thereof were found to include a region where the ratio of the fluorine atomic concentration to the atomic concentration of the transition metal (F/Tr-Metal) in the crystal grain is greater than or equal to 0.030. Fluorine in the crystal grain boundary and the periphery thereof was found to contribute to efficient segregation of magnesium in the crystal grain boundary and the periphery thereof.

Figure 41C:
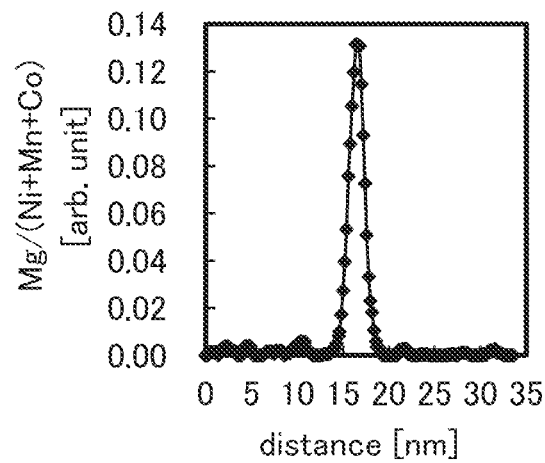

FIG. 41(C) shows the ratio of the magnesium (Mg) atomic concentration to the total atomic concentration of nickel, manganese, and cobalt (Ni+Mn+Co) at each measurement point of EDX. In FIG. 41(C), the horizontal axis represents the distance [nm] and the vertical axis represents the ratio of the magnesium atomic concentration to the total atomic concentration of nickel, manganese, and cobalt (Mg/(Ni+Mn+Co)) at each measurement point of EDX.

The total atomic concentration of nickel, manganese, and cobalt (Ni+Mn+Co) at each measurement point of EDX is the same as that in the data shown in FIG. 40(F).

As shown in FIG. 41(C), the crystal grain boundary and the periphery thereof were found to include a region where the ratio of the magnesium atomic concentration to the total atomic concentration of nickel, manganese, and cobalt (Mg (Ni+Mn+Co)) in the crystal grain is greater than or equal to 0.030. Magnesium was found to be segregated in the crystal grain boundary and the periphery thereof.

Figure 41D:
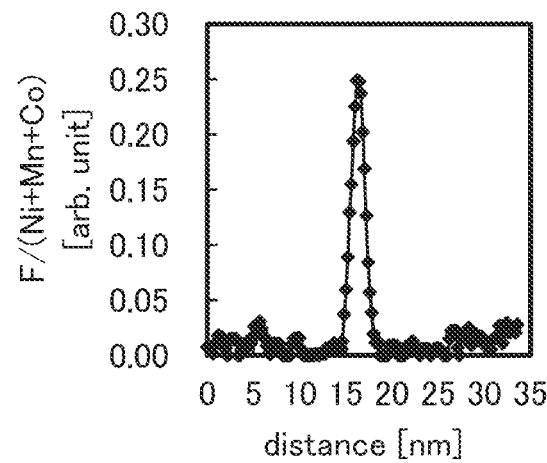

FIG. 41(D) shows the ratio of the fluorine atomic concentration to the total atomic concentration of nickel, manganese, and cobalt (Ni+Mn+Co) at each measurement point of EDX. In FIG. 41(D), the horizontal axis represents the distance [nm] and the vertical axis represents the ratio of the fluorine atomic concentration to the total atomic concentration of nickel, manganese, and cobalt (F/(Ni+Mn+Co)) at each measurement point of EDX.

As shown in FIG. 41(D), the crystal grain boundary and the periphery thereof were found to include a region where the ratio of the fluorine atomic concentration to the atomic concentration of the transition metal (F/(Ni+Mn+Co)) in the crystal grain is greater than or equal to 0.030. Fluorine in the crystal grain boundary and the periphery thereof was found to contribute to efficient segregation of magnesium in the crystal grain boundary and the periphery thereof.

This example revealed that by adding magnesium and fluorine as starting materials of a positive electrode active material particle, magnesium is segregated in a crystal grain boundary and the periphery thereof in the positive electrode active material particle. The positive electrode active material particle of one embodiment of the present invention, which includes magnesium oxide in the crystal grain boundary, is chemically and structurally stable and hardly undergoes a change in structure, a change in volume, and strain due to charge and discharge. In other words, the crystal structure of the positive electrode active material particle is more stable and hardly changes even after repetition of charge and discharge. In addition, cracking of the positive electrode active material particle can be inhibited. That is, deterioration such as a reduction in capacity can be reduced.

A power storage device including such a positive electrode active material particle is unlikely to deteriorate and thus is suitable for a portable electronic device. Furthermore, when used to cars and other vehicles, it is also possible to avoid using commercial power at the peak of electric power demand, which can contribute to energy saving and reduction of carbon dioxide emissions. In addition, a highly safe power storage device is achieved.

Example 2

In this example, a positive electrode active material particle including magnesium, fluorine, and oxygen in a crystal grain boundary and the periphery thereof was fabricated and the concentration distribution in a crystal grain and a crystal grain boundary in the active material was found by TEM observation and STEM-EDX analysis. Sample B was prepared as a sample of one embodiment of the present invention. As Sample B, lithium cobalt oxide including magnesium, fluorine, and oxygen in a crystal grain boundary and the periphery thereof was fabricated. Lithium cobalt oxide was assumed to have a composition of $LiCoO_2$. $LiCoO_2$ has a layered rock-salt crystal structure.

<Fabrication of Sample B>

The fabrication of Sample B will be described.

Starting materials were prepared as shown in Step S11 in the flowchart of FIG. 3. Lithium carbonate ($Li_2CO_3$) as a lithium source, tricobalt tetroxide ($Co_3O_4$) as a cobalt source, magnesium oxide (MgO) as a magnesium source, and lithium fluoride (LiF) as a fluorine source were weighed. Specifically, 3.1489 g (42.62 mmol) of $Li_2CO_3$, 6.7726 g (28.13 mmol) of $Co_3O_4$, 0.0344 g (0.85 mmol) of MgO, and 0.0442 g (1.70 mmol) of LiF were weighed. According to this, the ratio m of the number of magnesium atoms to the number of cobalt atoms is 0.010 (1.0%). In addition, the ratio n of the number of fluorine atoms to the number of magnesium atoms is 2.0. Note that $Li_2CO_3$ used is a product of Kojundo Chemical Laboratory Co., Ltd. (catalog No. LIH06XB). MgO used is a product of Kojundo Chemical Laboratory Co., Ltd. (catalog No. MGO12PB). LiF used is a product of Kojundo Chemical Laboratory Co., Ltd. (catalog No. LIH10XB).

Next, as shown in Step S12, the starting materials weighed in Step S11 were mixed. For the details of the mixing, the description on Sample A can be referred to, and thus the description is omitted here.

Next, as shown in Step S13, a first heating was performed on the materials mixed in Step S12. For the details of the first heating, the description on Sample A can be referred to, and thus the description is omitted here.

Next, as shown in Step S14, the materials heated in Step S13 were cooled to room temperature to obtain a synthetic material 2. After the cooling, the synthetic material 2 was subjected to crushing treatment, whereby the particle size of the synthetic material 2 was reduced. A 53-μm mesh was used for the crushing treatment.

Next, as shown in Step S15, a second heating was performed on the synthetic material 2 obtained in Step S14. For the details of the second heating, the description on Sample A can be referred to, and thus the description is omitted here.

The second heating in Step S15 promotes segregation of the magnesium and fluorine contained in the starting materials into the crystal grain boundary of lithium cobalt oxide.

Next, as shown in Step S16, the synthetic material 2 heated in Step S15 was cooled to room temperature and collected, so that Sample B was obtained.

<TEM Observation. STEM Observation, and EDX Measurement>

Then, Sample B was thinned by focused ion beam (FIB) and a cross section of Sample B was observed with TEM and STEM. Furthermore, the composition analysis of the cross section of Sample B was performed by EDX measurement. For the details of the TEM and STEM observation and the EDX measurement, the description on Sample A can be referred to, and thus the description is omitted here.

Figure 42A:
FIGS. 42A and 42B A cross-sectional TEM image and a schematic diagram of a positive electrode active material particle according to Example.
Figure 42B:
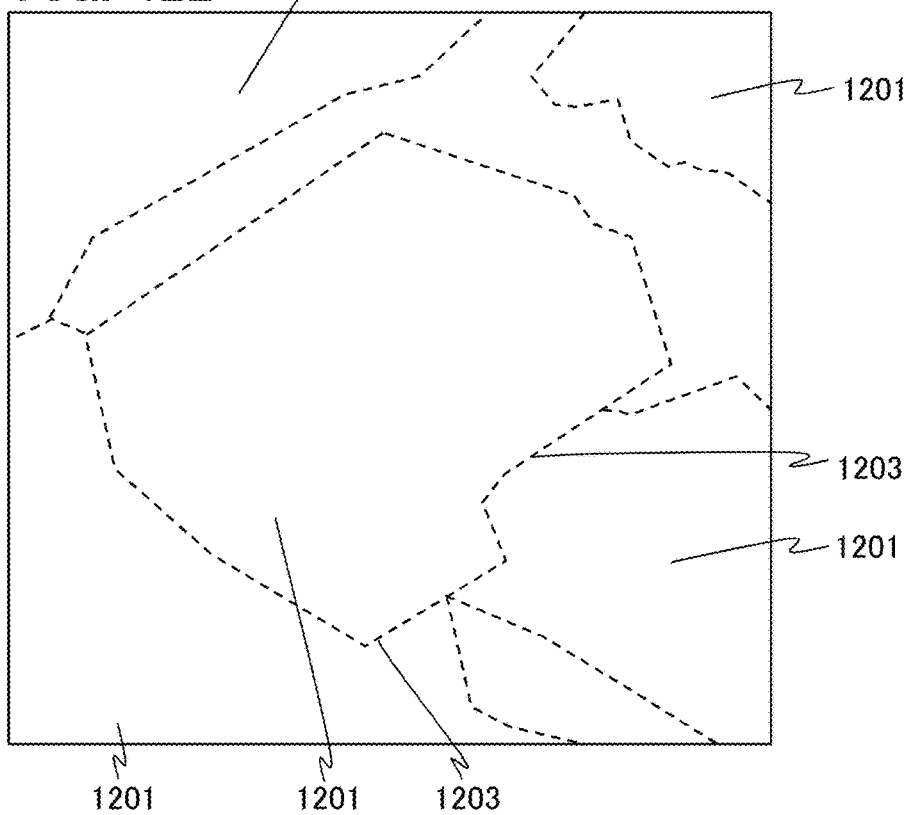

FIG. 42(A) shows a cross-sectional TEM image (a bright-field image) of Sample B. The magnification of FIG. 42(A) is 100,000 times. In FIG. 42(A), a region where the concentration (luminance) of the TEM image is substantially uniform probably has a substantially uniform crystal orientation, i.e., a single crystal. A region where the concentration (luminance) of the TEM image changes is probably a grain boundary. FIG. 42(B) shows a schematic diagram corresponding to FIG. 42(A). As shown in FIG. 42(A) and FIG. 42(B), the positive electrode active material particle was found to include a crystal grain boundary 1203 between a plurality of crystal grains 1201 and a crystal grain.

Figure 43A:
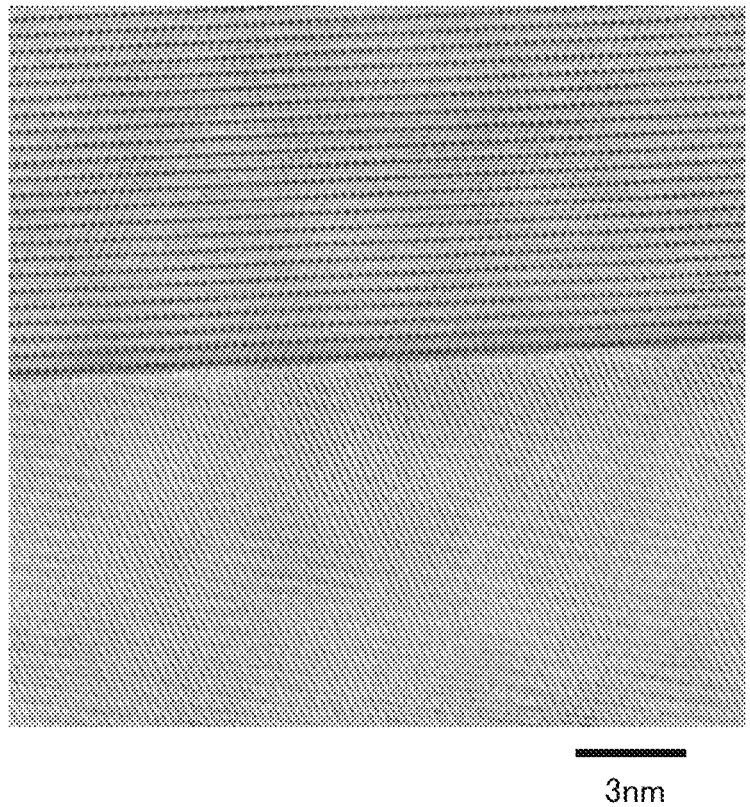
FIGS. 43A and 43B Cross-sectional STEM images of a positive electrode active material particle according to Example.
Figure 43B:
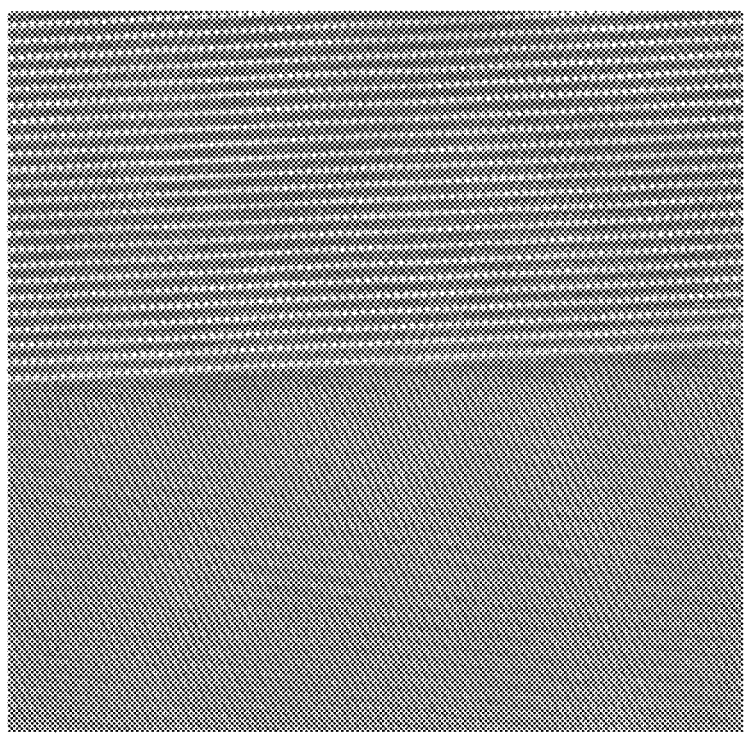

FIG. 43(A) shows a cross-sectional STEM image (a bright-field image) of Sample B, and FIG. 43(B) shows a HAADF-STEM image of the same point. The magnification of FIG. 43(A) and FIG. 43(B) is 8,000.000 times. A crystal lattice image was observed in a crystal grain region in FIG. 43(A) and FIG. 43(B).

Figure 44A:
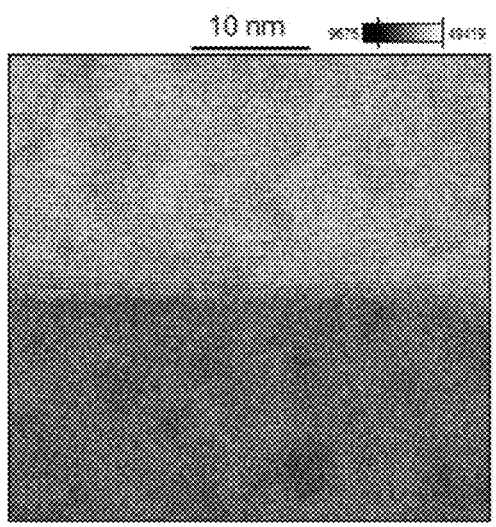
FIGS. 44A to 44F Mapping images in EDX plane analysis of a positive electrode active material particle according to Example.

FIG. 44(A) shows a HAADF-STEM image of the region of Sample B that was subjected to the EDX plane analysis. The EDX plane analysis was performed in a region including a crystal grain and a crystal grain boundary. In this example, the EDX measurement was performed on 256×256 points in the region.

The peaks derived from electron transition to the K shell in carbon, oxygen, fluorine, magnesium, silicon, phosphorus, sulfur, calcium, manganese, cobalt, and nickel were observed. The obtained spectra were separated into those of the respective elements, so that the atomic concentrations were obtained.

Figure 44B:
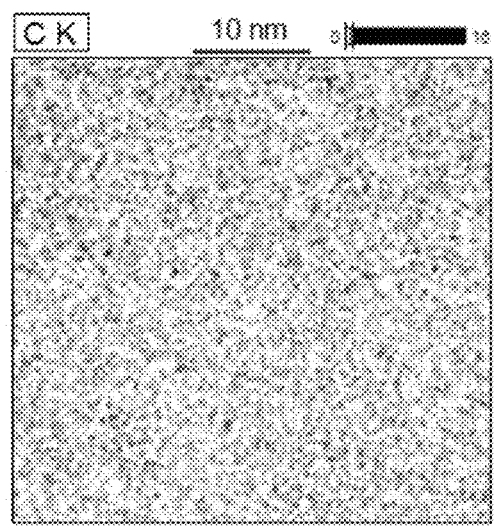
Figure 44C:
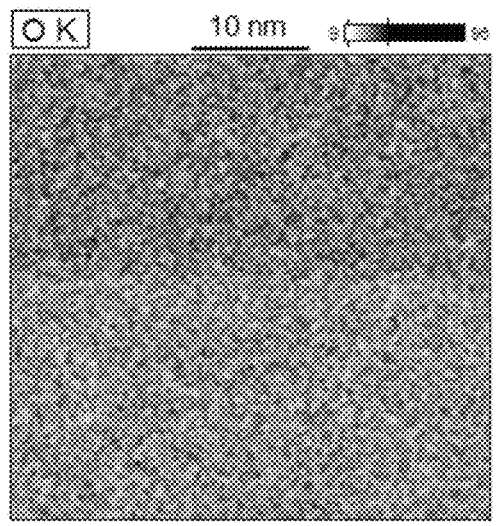
Figure 44D:
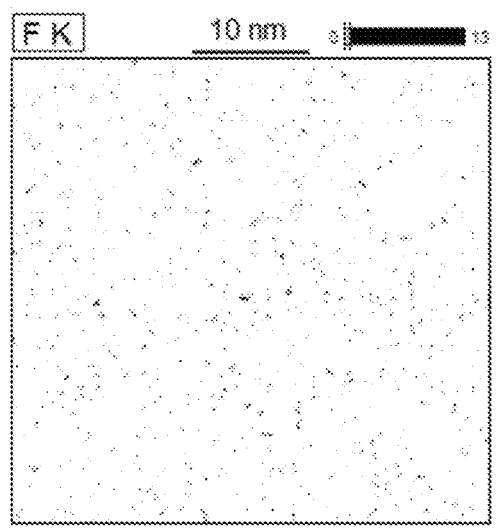
Figure 44E:
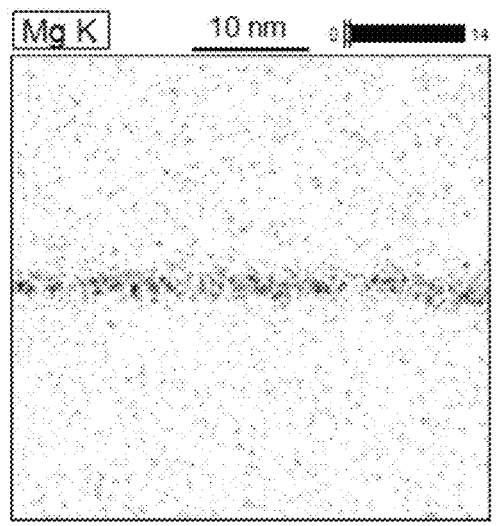
Figure 44F:
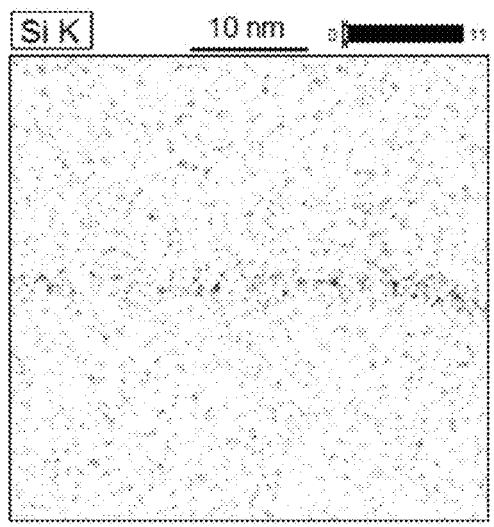
Figure 45A:
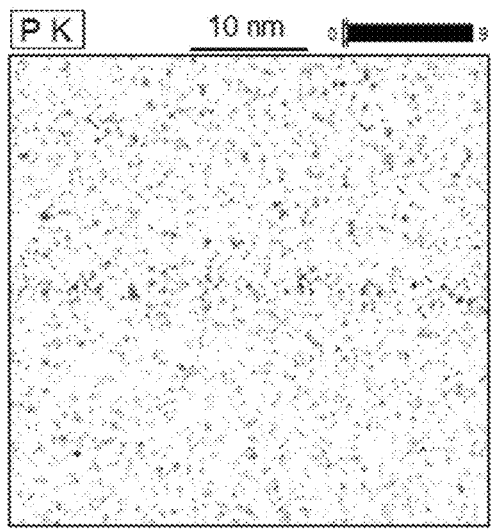
FIGS. 45A to 45D Mapping images in the EDX plane analysis of the positive electrode active material particle according to Example.
Figure 45B:
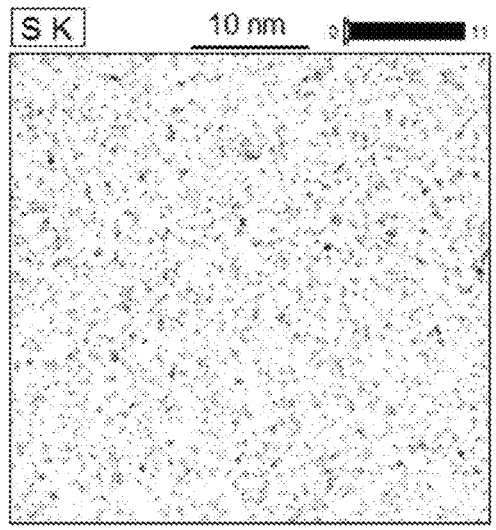
Figure 45C:
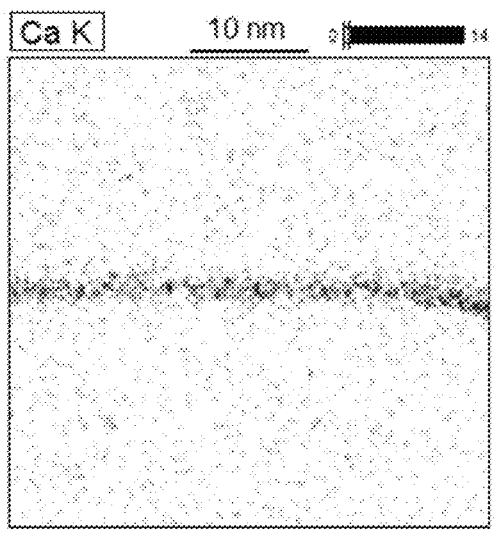

FIG. 44(B) shows a mapping image of carbon in the EDX plane analysis of the region illustrated in FIG. 44(A); FIG. 44(C), oxygen; FIG. 44(D), fluorine; FIG. 44(E), magnesium; FIG. 44(F), silicon; FIG. 45(A), phosphorus; FIG. 45(B), sulfur; FIG. 45(C), calcium; and FIG. 45(D), cobalt.

FIG. 44(B) to FIG. 44(F) and FIG. 45(A) to FIG. 45(D) each show the intensity mapping of characteristic X-ray obtained by the EDX measurement; a measurement point with a low characteristic X-ray intensity is denoted with a pale color (white), and a measurement point with a higher characteristic X-ray intensity is denoted with a darker color (black). In other words, the pale color (white) measurement point means a low atomic concentration whereas the dark color (black) measurement point means a high atomic concentration. Note that in FIG. 44(B) to FIG. 44(F) and FIG. 45(A) to FIG. 45(D), the scale of the characteristic X-ray intensity differs for each element so as to clearly show the distribution in the region.

As shown in FIG. 44(B) to FIG. 44(F) and FIG. 45(A) to FIG. 45(D), the concentrations of magnesium and calcium were found to be high in the crystal grain boundary and the periphery thereof. Almost no fluorine was observed in the region subjected to the EDX plane analysis. This is probably because EDX is hard to detect fluorine which is a lightweight element. Note that calcium was probably contained in a reagent used as a raw material.

Figure 45D:
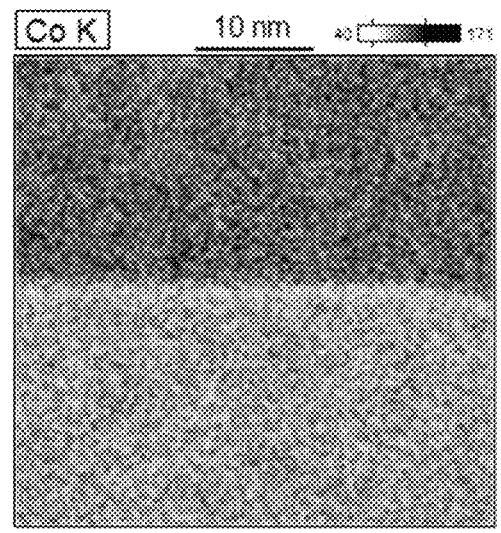

Data in linear regions was extracted from the EDX plane analysis shown in FIG. 44(B) to FIG. 44(F) and FIG. 45(A)

to FIG. 45(D), and the distribution of the atomic concentrations in the positive electrode active material particle was evaluated.

Figure 46A:
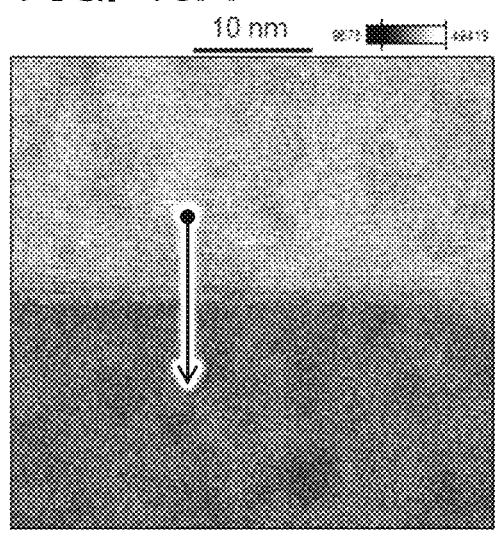
FIGS. 46A and 46B Views showing EDX linear analysis of a positive electrode active material particle according to Example.

FIG. 46(A) shows a HAADF-STEM image of the region of Sample B that was subjected to the EDX linear analysis. In FIG. 46(A), the region subjected to the EDX linear analysis is denoted by an arrow. The EDX linear analysis was performed on a crystal grain, a crystal grain boundary, and a region across the crystal grain.

Figure 47A:
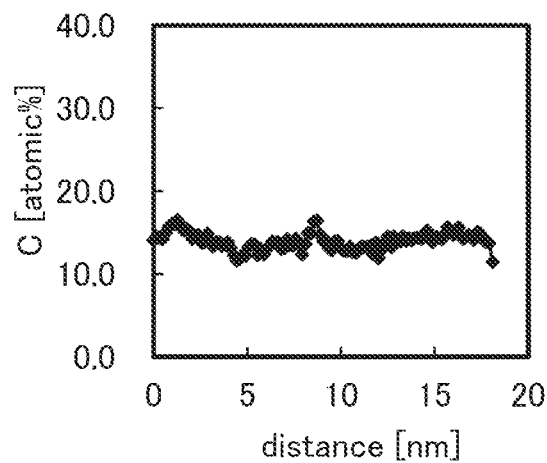
FIGS. 47A to 47F Graphs showing atomic concentrations in the EDX linear analysis of the positive electrode active material particle according to Example.
Figure 47B:
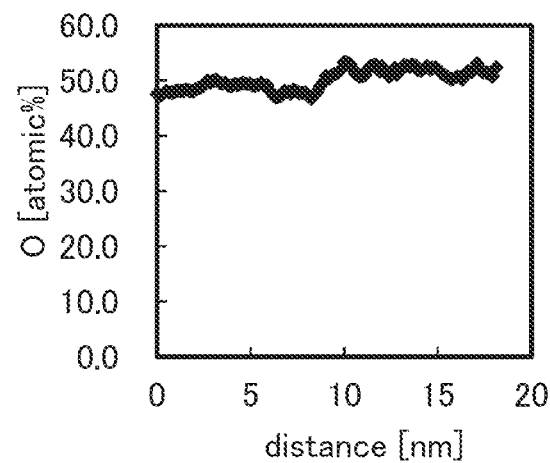
Figure 47C:
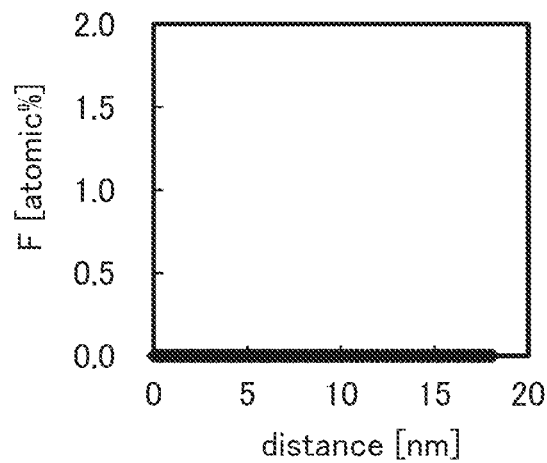
Figure 47D:
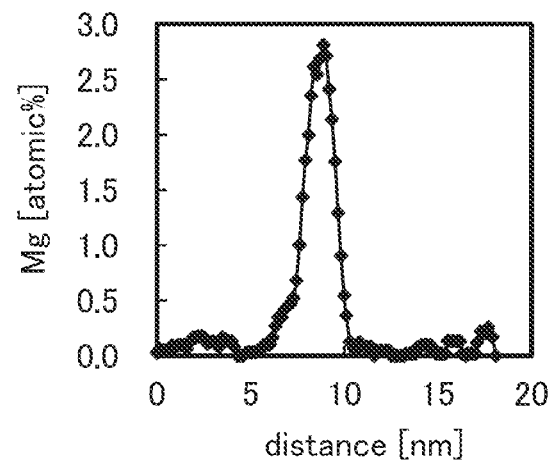
Figure 47E:
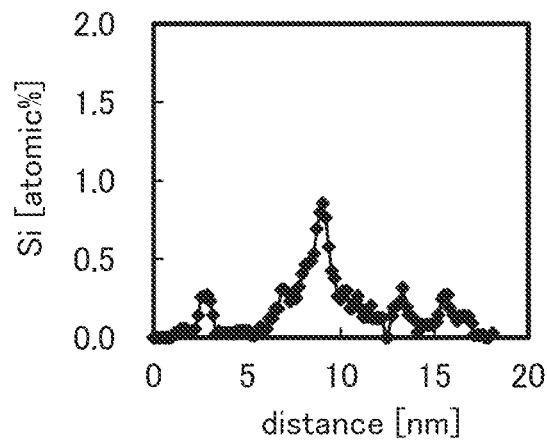
Figure 47F:
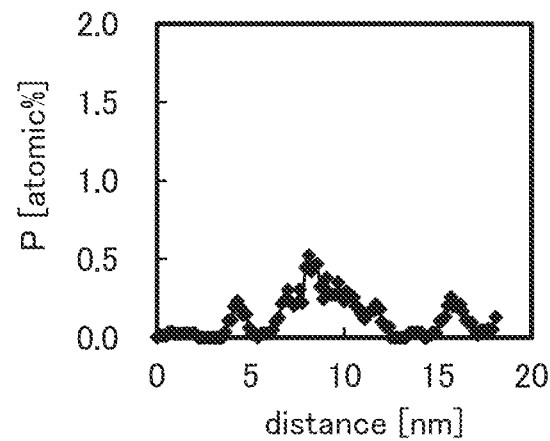
Figure 48A:
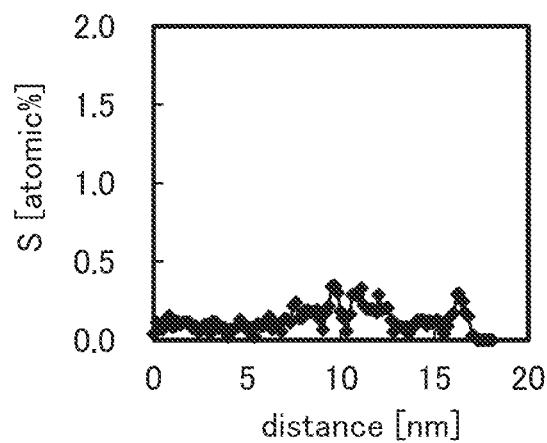
FIGS. 48A to 48D Graphs showing atomic concentrations in the EDX linear analysis of the positive electrode active material particle according to Example.
Figure 48B:
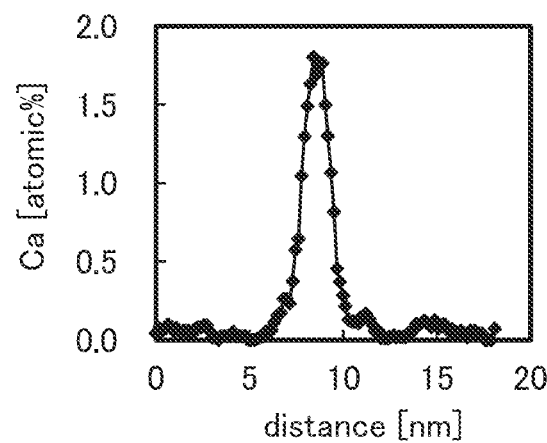

FIG. 47(A) shows the atomic concentration of carbon in the EDX linear analysis of the region illustrated in FIG. 46(A); FIG. 47(B), oxygen; FIG. 47(C), fluorine; FIG. 47(D), magnesium; FIG. 47(E), silicon; FIG. 47(F), phosphorus; FIG. 48(A), sulfur; FIG. 48(B), calcium; and FIG. 48(C), cobalt.

In FIG. 47(A) to FIG. 47(F) and FIG. 48(A) to FIG. 48(C), the horizontal axis represents the distance [nm] and the vertical axis represents the atomic concentration [atomic %]. The distance on the horizontal axis is shown so as to increase from the starting point (distance=0 nm), which is indicated as a black dot on one end of the arrow illustrated in FIG. 46(A), to the other end (ending portion). The atomic concentration on the vertical axis shows the percentage of the number of atoms for each element with respect to the total number of atoms of carbon, oxygen, fluorine, magnesium, silicon, phosphorus, sulfur, calcium, and cobalt as 100 atomic %.

As shown in FIG. 46(A), FIG. 47(A) to FIG. 47(F), and FIG. 48(A) to FIG. 48(C), the concentrations of magnesium and calcium were found to be higher in the crystal grain boundary and the periphery thereof than in the crystal grain region. It was also found that the crystal grain boundary and the periphery thereof had a region with a width greater than or equal to 1 nm and less than or equal to 10 nm.

The crystal grain boundary and the periphery thereof were found to include oxygen and magnesium. The crystal grain boundary and the periphery thereof were found to include magnesium oxide.

In contrast, fluorine, magnesium, silicon, and calcium were at the level of the lower detection limit in the crystal grain region.

Phosphorus and sulfur were at the level of the lower detection limit in the crystal grain and the crystal grain boundary.

The carbon concentration detected in the crystal grain and the crystal grain boundary probably includes carbon derived from a carbon coat film used as a protective film. It was thus not possible to determine the actual carbon concentration in the crystal grain and the crystal grain boundary.

The atomic concentration of cobalt, which is a transition metal, was found to be lower in the crystal grain boundary and the periphery thereof than in the crystal grain.

Figure 48C:
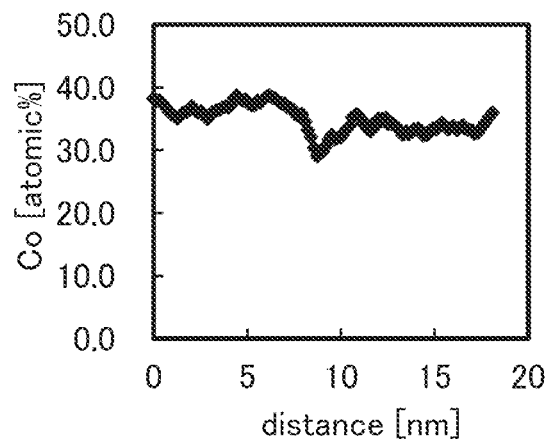

The atomic concentration of cobalt in Sample B can be regarded as the atomic concentration of the transition metal. As shown in FIG. 48(C), the atomic concentration of the transition metal was found to be prone to be lower in the crystal grain boundary and the periphery thereof than that in the crystal grain region. It was also found that the atomic concentration of the transition metal in the crystal grain region was substantially uniform without large variation.

Figure 49A:
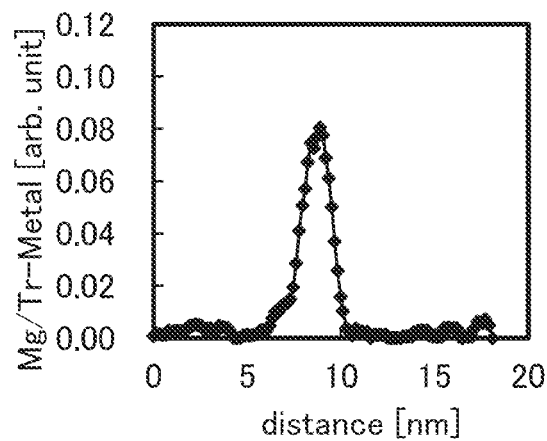
FIGS. 49A to 49D Graphs showing the ratio of atomic numbers in the EDX linear analysis of the positive electrode active material particle according to Example.

FIG. 49(A) shows the ratio of the atomic concentration of magnesium (Mg) to the atomic concentration of the transition metal in the crystal grain. In FIG. 49(A), the horizontal axis represents the distance [nm] and the vertical axis represents the ratio of the atomic concentration of magnesium to the atomic concentration of the transition metal in the crystal grain (Mg/Tr-Metal).

Figure 48D:
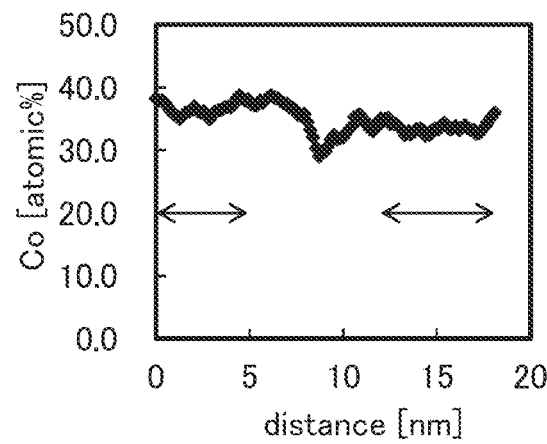

The average atomic concentration of the transition metals in the crystal grain was used as the atomic concentration of the transition metal (Tr-Metal) in the crystal grain. The crystal grain region used for the calculation of the average value is indicated by arrows in FIG. 48(D).

As shown in FIG. 49(A), the crystal grain boundary and the periphery thereof were found to include a region where the ratio of the magnesium atomic concentration to the atomic concentration of the transition metal (Mg/Tr-Metal) in the crystal grain is greater than or equal to 0.030. Magnesium was found to be segregated in the crystal grain boundary and the periphery thereof. The crystal grain boundary and the periphery thereof probably include magnesium oxide. Sample B of one embodiment of the present invention includes magnesium oxide in the crystal grain boundary and the periphery thereof, offering chemical and structural stability to the positive electrode active material particle, so that deterioration of the positive electrode active material, such as dissolution of the transition metal to an electrolyte solution, release of oxygen, and unstable crystal structure, can be inhibited. In addition, cracking of the positive electrode active material particle can be inhibited. Release of oxygen from the positive electrode active material particle can also be inhibited. The use of such a positive electrode active material particle can inhibit deterioration of a power storage device. In addition, a highly safe power storage device can be achieved. When the charge voltage is increased, the amount of lithium included in a positive electrode is reduced when charging, and the crystal structure of a positive electrode active material particle is prone to change; thus, Sample B is particularly preferable as the positive electrode active material particle.

Figure 49B:
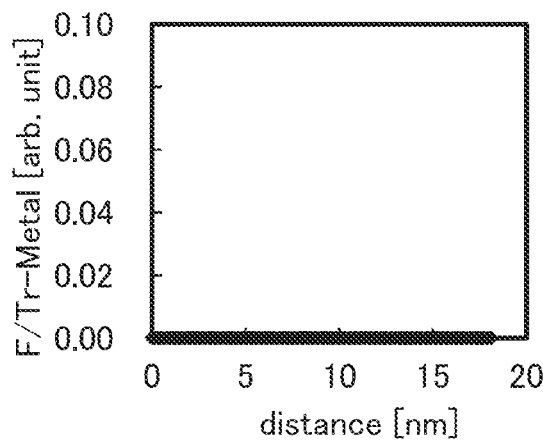

FIG. 49(B) shows the ratio of the fluorine atomic concentration to the atomic concentration of the transition metal (Tr-Metal) in the crystal grain. In FIG. 49(B), the horizontal axis represents the distance [nm] and the vertical axis represents the ratio of the fluorine atomic concentration to the atomic concentration of the transition metal in the crystal grain (F/Tr-Metal).

As shown in FIG. 47(C) and FIG. 49(B), the fluorine concentration in Sample B was at the level of the lower detection limit in the crystal grain and the crystal grain boundary. This is probably because EDX is hard to detect fluorine which is a lightweight element.

Figure 49C:
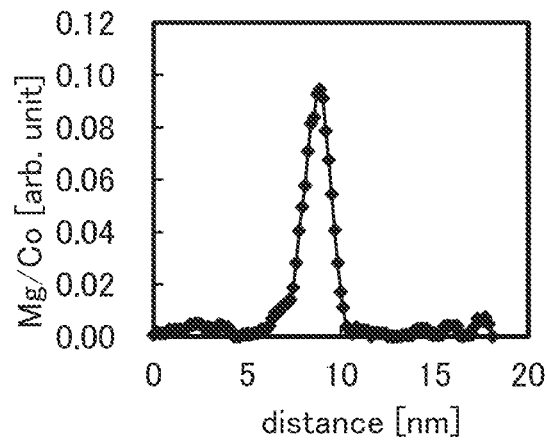

FIG. 49(C) shows the ratio of the magnesium (Mg) atomic concentration to the cobalt (Co) atomic concentration at each measurement point of EDX. In FIG. 49(C), the horizontal axis represents the distance [nm] and the vertical axis represents the ratio of the magnesium atomic concentration to the cobalt atomic concentration (Mg/Co) at each measurement point of EDX.

As shown in FIG. 49(C), the crystal grain boundary and the periphery thereof were found to include a region where the ratio of the magnesium atomic concentration to the cobalt atomic concentration (Mg/Co) in the crystal grain is greater than or equal to 0.030. Magnesium was found to be segregated in the crystal grain boundary and the periphery thereof.

Figure 49D:
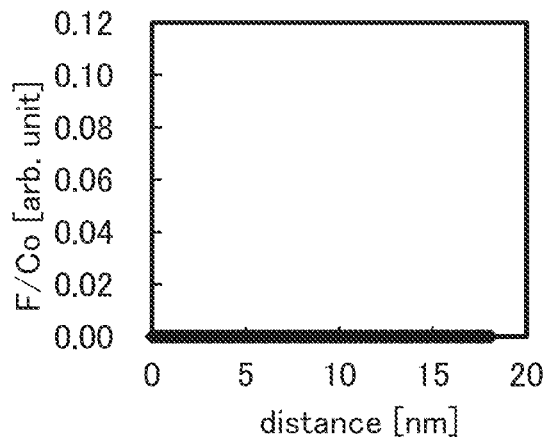

FIG. 49(D) shows the ratio of the fluorine atomic concentration to the cobalt (Co) atomic concentration at each measurement point of EDX. In FIG. 49(D), the horizontal axis represents the distance [nm] and the vertical axis represents the ratio of the fluorine atomic concentration to the cobalt atomic concentration (F/Co) at each measurement point of EDX. The fluorine concentration in Sample B was at the level of the lower detection limit in the crystal grain and the crystal grain boundary.

Similar EDX measurement was performed on another portion of Sample B.

Figure 50A:
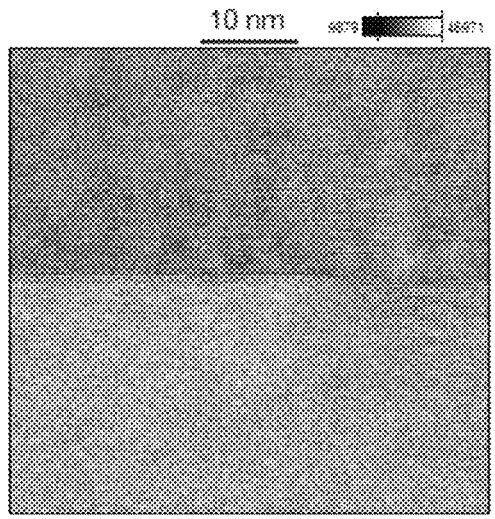
FIGS. 50A to 50F Mapping images in EDX plane analysis of a positive electrode active material particle according to Example.
Figure 50B:
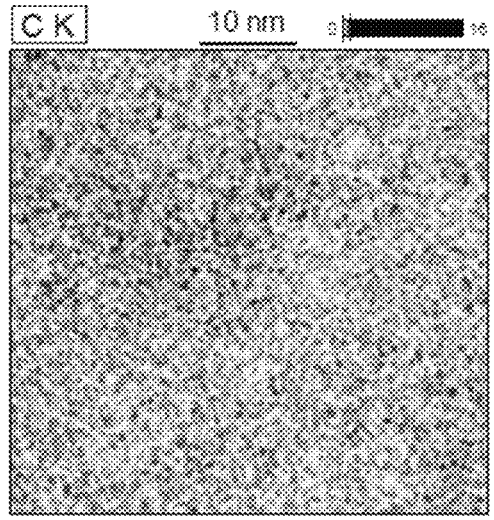
Figure 50C:
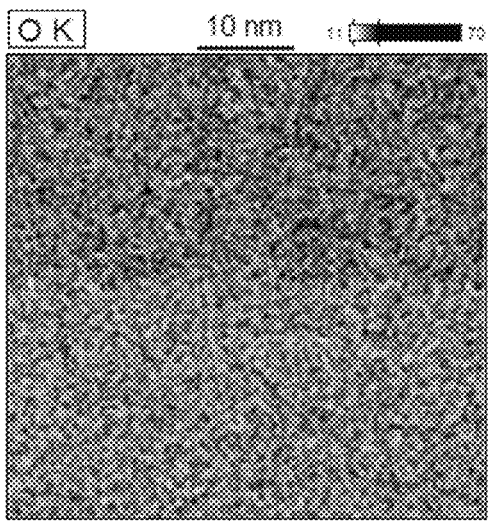
Figure 50D:
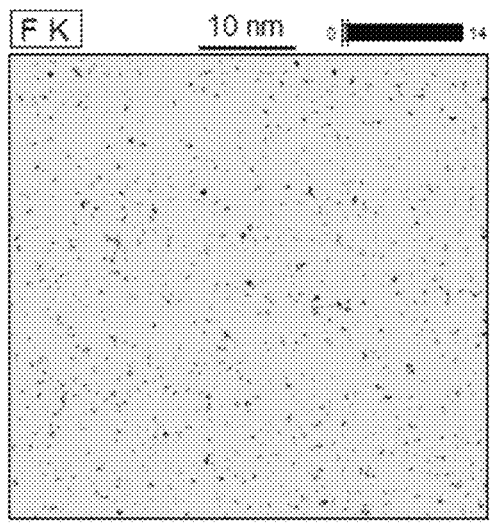
Figure 50E:
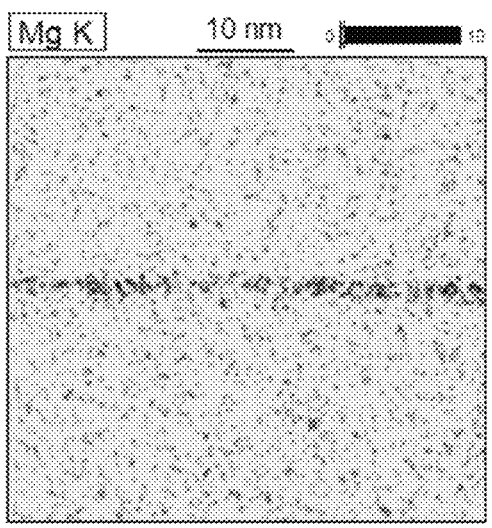
Figure 50F:
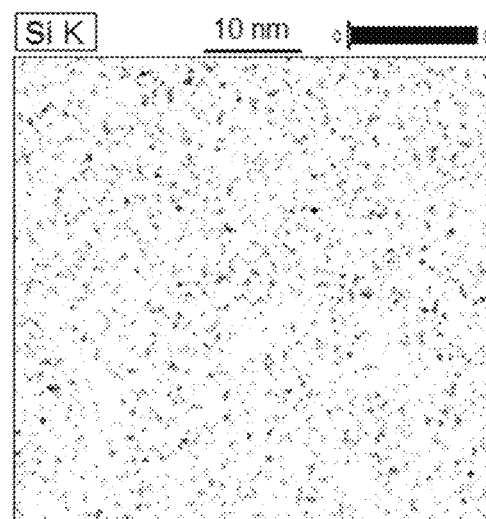
Figure 51A:
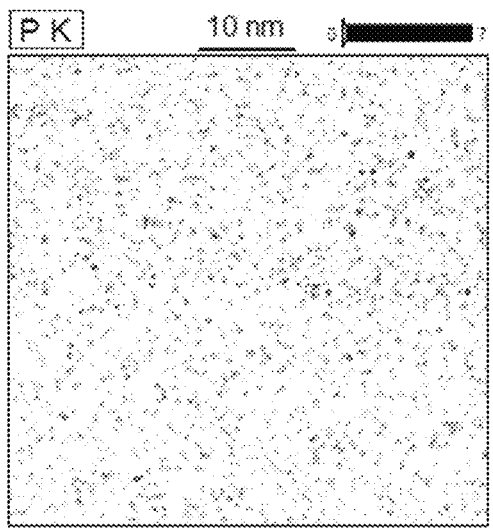
FIGS. 51A to 51D Mapping images in the EDX plane analysis of the positive electrode active material particle according to Example.
Figure 51B:
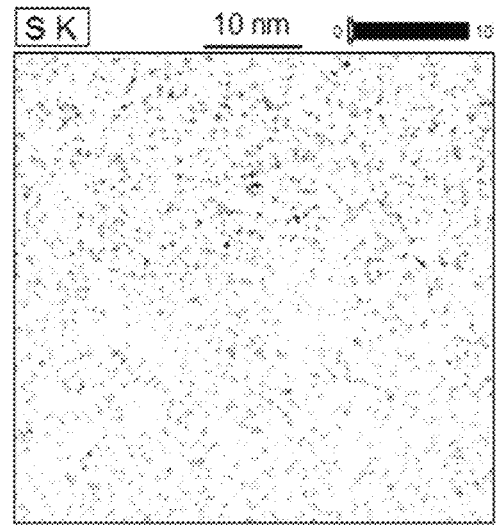
Figure 51C:
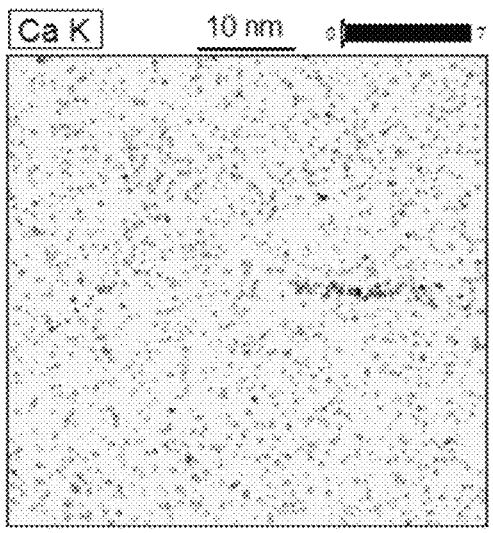
Figure 51D:
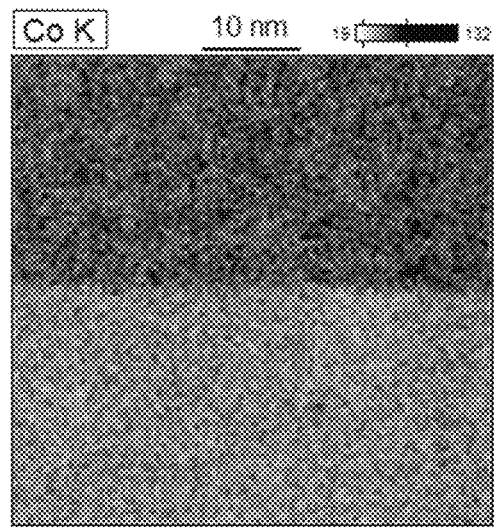

FIG. 50(A) shows a HAADF-STEM image of the region of Sample B that was subjected to the EDX plane analysis. The EDX plane analysis was performed in a region including a crystal grain and a crystal grain boundary. FIG. 50(B) shows a mapping image of carbon in the EDX plane analysis of the region illustrated in FIG. 50(A); FIG. 50(C), oxygen FIG. 50(D), fluorine; FIG. 50(E), magnesium; FIG. 50(F), silicon; FIG. 51(A), phosphorus; FIG. 51(B), sulfur; FIG. 51(C), calcium; and FIG. 51(D), cobalt.

FIG. 50(B) to FIG. 50(F) and FIG. 51(A) to FIG. 51(D) each show the intensity mapping of characteristic X-ray obtained by the EDX measurement; a measurement point with a low characteristic X-ray intensity is denoted with a pale color (white), and a measurement point with a higher characteristic X-ray intensity is denoted with a darker color (black). In other words, the pale color (white) measurement point means a low atomic concentration whereas the dark color (black) measurement point means a high atomic concentration. Note that in FIG. 50(B) to FIG. 50(F) and FIG. 51(A) to FIG. 51(D), the scale of the characteristic X-ray intensity differs for each element so as to clearly show the distribution in the region.

As shown in FIG. 50(B) to FIG. 50(F) and FIG. 51(A) to FIG. 51(D), the concentrations of magnesium and calcium were found to be high in the crystal grain boundary and the periphery thereof. Almost no fluorine was observed in the region subjected to the EDX plane analysis. This is probably because EDX is hard to detect fluorine which is a lightweight element. Note that calcium was probably contained in a reagent used as a raw material.

Data in linear regions was extracted from the EDX plane analysis shown in FIG. 50(B) to FIG. 50(F) and FIG. 51(A) to FIG. 51(D), and the distribution of the atomic concentrations in the positive electrode active material particle was evaluated.

Figure 46B:
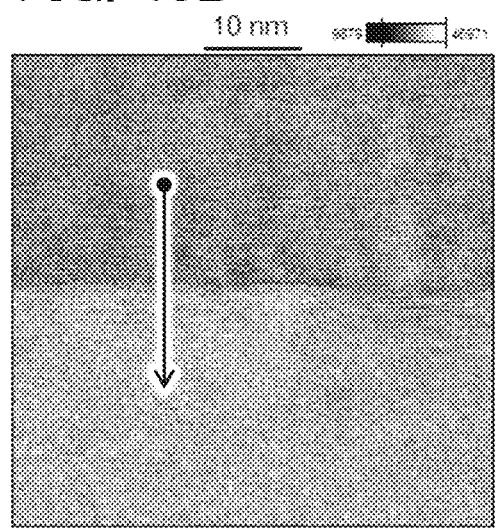

FIG. 46(B) shows a HAADF-STEM image of the region of Sample B that was subjected to the EDX linear analysis. In FIG. 46(B), the region subjected to the EDX linear analysis is denoted by an arrow. The EDX linear analysis was performed on a crystal grain, a crystal grain boundary, and a region across the crystal grain.

Figure 52A:
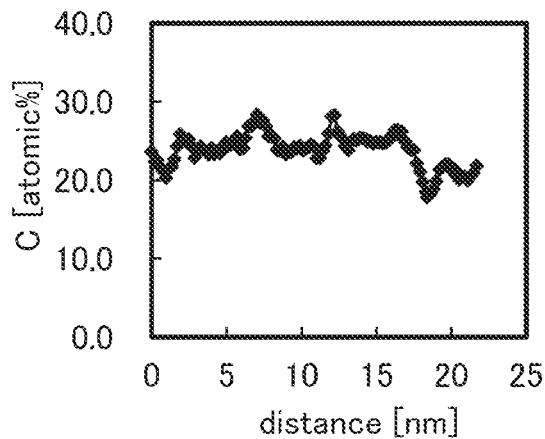
FIGS. 52A to 52F Graphs showing atomic concentrations in EDX linear analysis of a positive electrode active material particle according to Example.
Figure 52B:
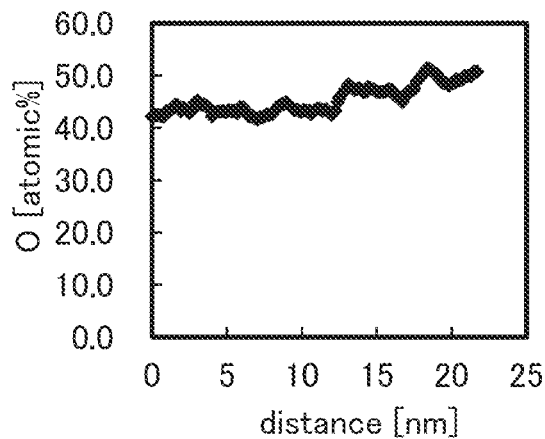
Figure 52C:
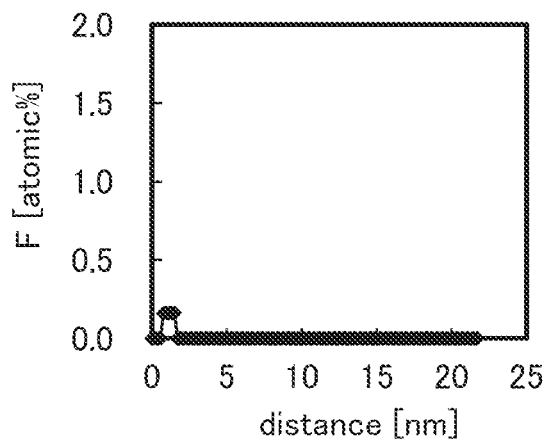
Figure 52D:
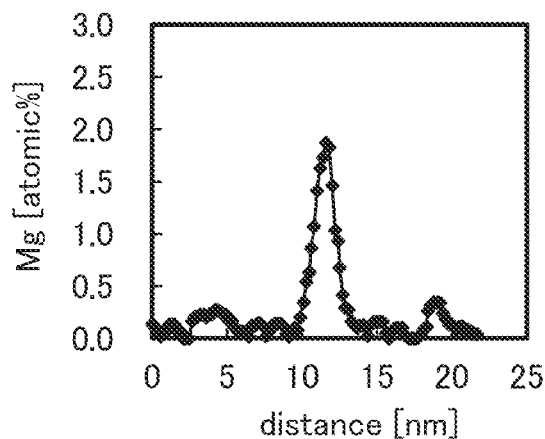
Figure 52E:
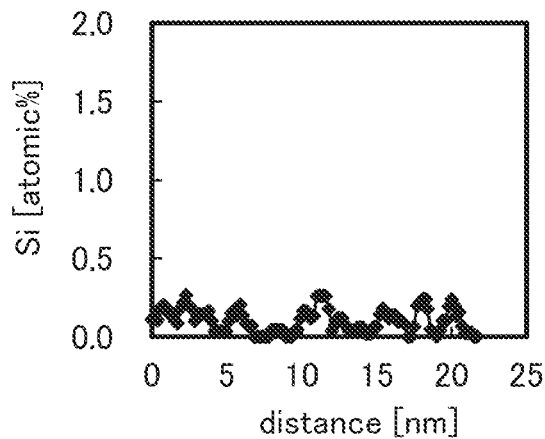
Figure 52F:
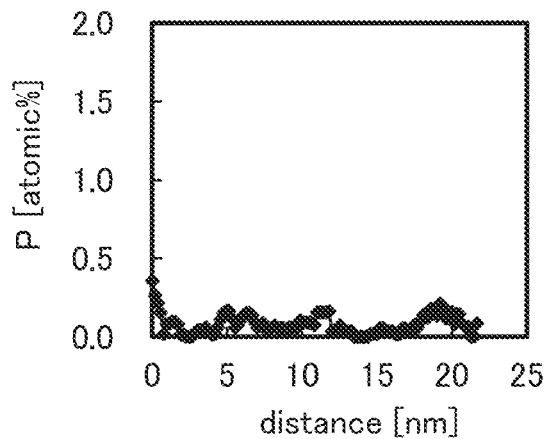
Figure 53A:
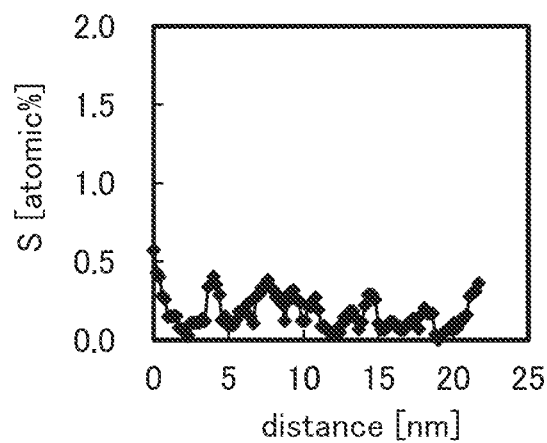
FIGS. 53A to 53D Graphs showing atomic concentrations in the EDX linear analysis of the positive electrode active material particle according to Example.
Figure 53B:
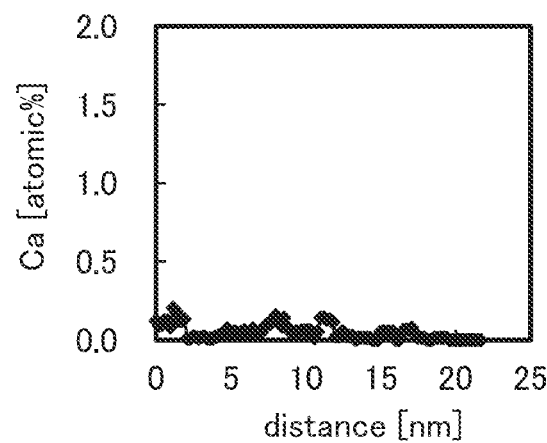

FIG. 52(A) shows the atomic concentration of carbon in the EDX linear analysis of the region illustrated in FIG. 46(B); FIG. 52(B), oxygen; FIG. 52(C), fluorine; FIG. 52(D), magnesium; FIG. 52(E), silicon; FIG. 52(F), phosphorus; FIG. 53(A), sulfur; FIG. 53(B), calcium; and FIG. 53(C), cobalt.

In FIG. 52(A) to FIG. 52(F) and FIG. 53(A) to FIG. 53(C), the horizontal axis represents the distance [nm] and the vertical axis represents the atomic concentration [atomic %]. The distance on the horizontal axis is shown so as to increase from the starting point (distance=0 nm), which is indicated as a black dot on one end of the arrow illustrated in FIG. 46(B), to the other end (ending portion). The atomic concentration on the vertical axis shows the percentage of the number of atoms for each element with respect to the total number of atoms of carbon, oxygen, fluorine, magnesium, silicon, phosphorus, sulfur, calcium, and cobalt as 100 atomic/o.

As shown in FIG. 46(B), FIG. 52(A) to FIG. 52(F), and FIG. 53(A) to FIG. 53(C), the concentration of magnesium was found to be higher in the crystal grain boundary and the periphery thereof than in the crystal grain region. It was also found that the crystal grain boundary and the periphery thereof had a region with a width greater than or equal to 1 nm and less than or equal to 10 nm.

The crystal grain boundary and the periphery thereof were found to include oxygen and magnesium. The crystal grain boundary and the periphery thereof were found to include magnesium oxide.

In contrast, fluorine, magnesium, silicon, and calcium were at the level of the lower detection limit in the crystal grain region.

Phosphorus and sulfur were at the level of the lower detection limit in the crystal grain and the crystal grain boundary.

The carbon concentration detected in the crystal grain and the crystal grain boundary probably includes carbon derived from a carbon coat film used as a protective film. It was thus not possible to determine the actual carbon concentration in the crystal grain and the crystal grain boundary.

The atomic concentration of cobalt, which is a transition metal, was found to be lower in the crystal grain boundary and the periphery thereof than in the crystal grain.

Figure 53C:
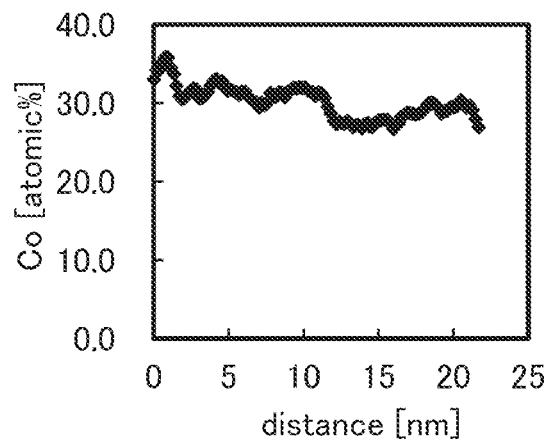

The atomic concentration of cobalt in Sample B can be regarded as the atomic concentration of the transition metal. As shown in FIG. 53(C), the atomic concentration of the transition metal was found to be prone to be lower in the crystal grain boundary and the periphery thereof than that in the crystal grain region. It was also found that the atomic concentration of the transition metal in the crystal grain region was substantially uniform without large variation.

Figure 54A:
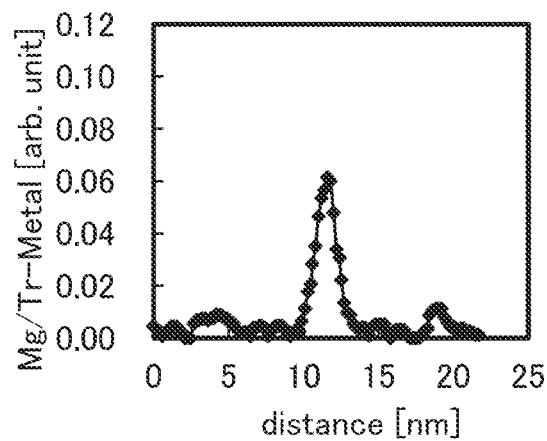
FIGs. 54A to 54D Graphs showing the ratio of atomic numbers in the EDX linear analysis of the positive electrode active material particle according to Example.

FIG. 54(A) shows the ratio of the atomic concentration of magnesium (Mg) to the atomic concentration of the transition metal in the crystal grain. In FIG. 54(A), the horizontal axis represents the distance [nm] and the vertical axis represents the ratio of the atomic concentration of magnesium to the atomic concentration of the transition metal in the crystal grain (Mg/Tr-Metal).

Figure 53D:
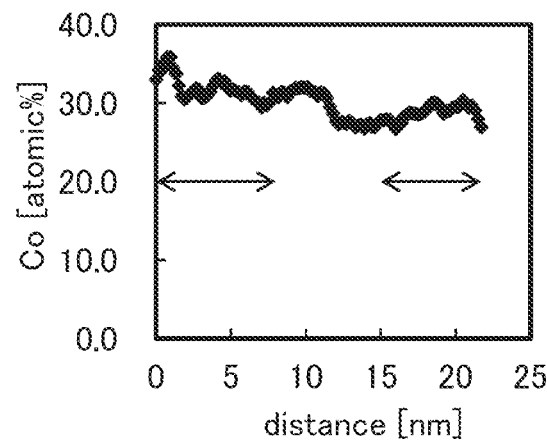

The average atomic concentration of the transition metals in the crystal grain was used as the atomic concentration of the transition metal (Tr-Metal) in the crystal grain. The crystal grain region used for the calculation of the average value is indicated by arrows in FIG. 53(D).

As shown in FIG. 54(A), the crystal grain boundary and the periphery thereof were found to include a region there the ratio of the magnesium atomic concentration to the atomic concentration of the transition metal (Mg/Tr-Metal) in the crystal grain is greater than or equal to 0.030. Magnesium was found to be segregated in the crystal grain boundary and the periphery thereof. The crystal grain boundary and the periphery thereof probably include magnesium oxide. Sample B of one embodiment of the present invention includes magnesium oxide in the crystal grain boundary and the periphery thereof, offering chemical and structural stability to the positive electrode active material particle, so that deterioration of the positive electrode active material, such as dissolution of the transition metal to an electrolyte solution, release of oxygen, and unstable crystal structure, can be inhibited. In addition, cracking of the positive electrode active material particle can be inhibited. Release of oxygen from the positive electrode active material particle can also be inhibited. The use of such a positive electrode active material particle can inhibit deterioration of a power storage device. In addition, a highly safe power storage device can be achieved. When the charge voltage is increased, the crystal structure of a positive electrode active material particle is prone to change; thus, Sample B is particularly preferable as the positive electrode active material particle.

Figure 54B:
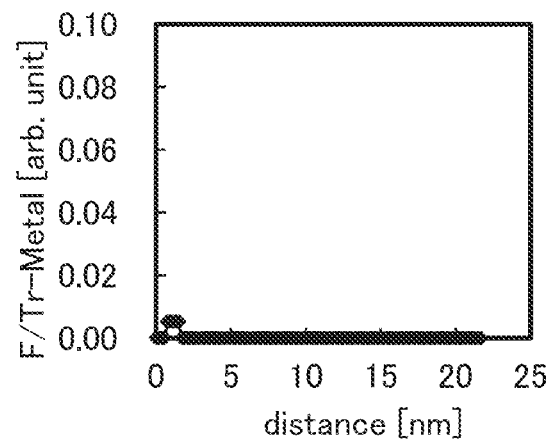

FIG. 54(B) shows the ratio of the fluorine atomic concentration to the atomic concentration of the transition metal (Tr-Metal) in the crystal grain. In FIG. 54(B), the horizontal axis represents the distance [nm] and the vertical axis represents the ratio of the fluorine atomic concentration to the atomic concentration of the transition metal in the crystal grain (F/Tr-Metal).

As shown in FIG. 52(C) and FIG. 54(B), the fluorine concentration in Sample B was at the level of the lower detection limit in the crystal grain and the crystal grain boundary. This is probably because EDX is hard to detect fluorine which is a lightweight element.

Figure 54C:
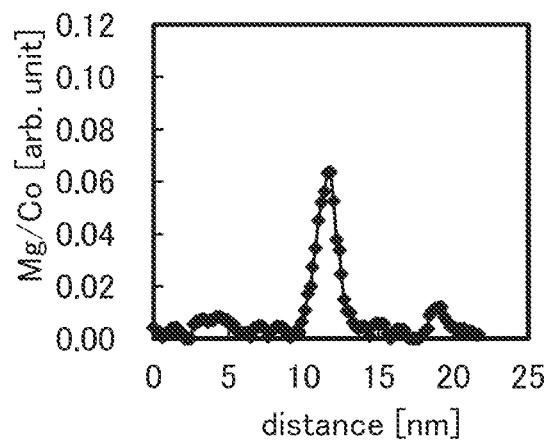

FIG. 54(C) shows the ratio of the magnesium (Mg) atomic concentration to the cobalt (Co) atomic concentration at each measurement point of EDX. In FIG. 54(C), the horizontal axis represents the distance [nm] and the vertical axis represents the ratio of the magnesium atomic concentration to the cobalt atomic concentration (Mg/Co) at each measurement point of EDX.

As shown in FIG. 54(C), the crystal grain boundary and the periphery thereof were found to include a region where the ratio of the magnesium atomic concentration to the cobalt atomic concentration (Mg/Co) in the crystal grain is greater than or equal to 0.030. Magnesium was found to be segregated in the crystal grain boundary and the periphery thereof.

Figure 54D:
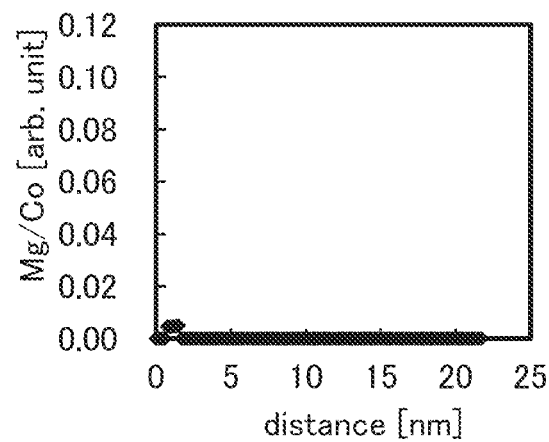

FIG. 54(D) shows the ratio of the fluorine atomic concentration to the cobalt (Co) atomic concentration at each measurement point of EDX. In FIG. 54(D), the horizontal axis represents the distance [nm] and the vertical axis represents the ratio of the fluorine atomic concentration to the cobalt atomic concentration (F/Co) at each measurement point of EDX. The fluorine concentration in Sample B was at the level of the lower detection limit in the crystal grain and the crystal grain boundary.

REFERENCE NUMERALS

100: positive electrode active material particle, 101: crystal grain, 103: crystal grain boundary, 105: crystal defect, 107: region, 200: active material layer, 201: graphene compound, 211a: positive electrode, 211b: negative electrode, 212a: lead, 212b: lead, 214: separator, 215a: bonding portion, 215b: bonding portion, 217: fixing member, 250: battery. 251: exterior body, 261: folded portion, 262: seal portion 263: seal portion, 271: crest line, 272: trough line, 273: space, 300: secondary battery, 301: positive electrode can, 302: negative electrode can, 303: gasket, 304: positive electrode, 305: positive electrode current collector. 306: positive electrode active material layer, 307: negative electrode, 308: negative electrode current collector, 309: negative electrode active material layer, 310: separator, 500: secondary battery, 501: positive electrode current collector, 502: positive electrode active material layer. 503: positive electrode, 504: negative electrode current collector, 505: negative electrode active material layer, 506: negative electrode, 507: separator, 508: electrolyte solution, 509: exterior body, 510: positive electrode lead electrode, 511: negative electrode lead electrode, 600: secondary battery, 601: positive electrode cap, 602: battery can, 603: positive electrode terminal, 604: positive electrode, 605: separator, 606: negative electrode, 607: negative electrode terminal, 608: insulating plate, 609: insulating plate, 611: PTC element, 612: safety valve mechanism. 900: circuit board, 910: label, 911: terminal, 912: circuit. 913: secondary battery. 914: antenna, 915: antenna, 916: layer, 917: layer, 918: antenna, 919: terminal, 920: display device, 921: sensor, 922: terminal, 930: housing, 930a: housing, 930b: housing, 931: negative electrode. 932: positive electrode, 933: separator, 950: wound body, 951: terminal, 952: terminal, 980: secondary battery. 993: wound body, 994: negative electrode, 995: positive electrode, 996: separator, 997: lead electrode. 998: lead electrode, 1101: crystal grain, 1103: crystal grain boundary, 1201: crystal grain, 1203: crystal grain boundary, 7100: portable display device, 7101: housing, 7102: display portion, 7103: operation button, 7104: secondary battery, 7200: portable information terminal, 7201: housing, 7202: display portion, 7203: band. 7204: buckle, 7205: operation button, 7206: input output terminal, 7207: icon, 7300: display device. 7304: display portion, 7400: mobile phone, 7401: housing, 7402: display portion, 7403: operation button, 7404: external connection port, 7405: speaker, 7406: microphone, 7407: secondary battery. 8000: display device, 8001: housing. 8002: display portion, 8003: speaker portion, 8004: secondary battery, 8021: charging apparatus, 8022: cable, 8024: secondary battery, 8100: lighting device, 8101: housing, 8102: light source, 8103: secondary battery, 8104: ceiling. 8105: sidewall, 8106: floor, 8107: window, 8200: indoor unit, 8201: housing. 8202: air outlet, 8203: secondary battery, 8204: outdoor unit, 8300: electric refrigerator-freezer, 8301: housing. 8302: refrigerator door, 8303: freezer door, 8304: secondary battery, 8400: automobile, 8401: headlight, 8406: electric motor, 8500: automobile, 8600: motor scooter, 8601: side mirror, 8602: secondary battery, 8603: indicator, 8604: storage unit under seat, 9600: tablet terminal, 9625: switch, 9626: switch, 9627: power switch, 9628: operation switch, 9629: fastener, 9630: housing, 9630a: housing, 9630b: housing, 9631: display portion. 9633: solar cell, 9634: charge and discharge control circuit, 9635: power storage unit. 9636: DC-DC converter, 9637: converter, 9640: movable portion.

The invention claimed is:

1. A lithium-ion secondary battery comprising:
a positive electrode active material particle including a crystal grain boundary and a plurality of crystal grains,
wherein the positive electrode active material particle comprises a region in which a ratio of a number of magnesium atoms in the crystal grain boundary or a periphery of the crystal grain boundary to a number of cobalt atoms in one of the plurality of the crystal grains is greater than or equal to 0.010 and less than or equal to 0.5.

2. The lithium-ion battery according to claim 1, wherein the positive electrode active material particle comprises a region in which a ratio of a number of magnesium atoms in the crystal grain boundary or the periphery of the crystal grain boundary to a number of cobalt atoms in the one of the plurality of the crystal grains is greater than or equal to 0.03.

3. The lithium-ion secondary battery according to claim 1, wherein, in EDX linear analysis for the one of the plurality of the crystal grains, magnesium is detected at a level of the lower detection limit, and
wherein, in EDX linear analysis for the crystal grain boundary or the periphery of the crystal grain boundary, magnesium is detected beyond the level of the lower detection limit.

4. The lithium-ion secondary battery according to claim 1, wherein, in EDX linear analysis for the one of the plurality of the crystal grains, magnesium is detected at lower than 1 atomic %, and
wherein, in EDX linear analysis for the crystal grain boundary or the periphery of the crystal grain boundary, magnesium is detected beyond 1 atomic %.

5. The lithium-ion secondary battery according to claim 1, wherein the number of magnesium atoms and the number of cobalt atoms is obtained with EDX linear analysis.

6. The lithium-ion battery according to claim 1, further comprising a conductive additive,
wherein the conductive additive includes carbon fiber.

7. The lithium-ion battery according to claim 6, wherein the carbon fiber includes carbon nanofiber or carbon nanotube.

8. The lithium-ion battery according to claim 6, wherein the conductive additive further includes any one of carbon black, graphite particle, graphene, and fullerene.

9. The lithium-ion battery according to claim 1, wherein the positive electrode active material particle comprises a region in which a ratio of a number of fluorine atoms in the crystal grain boundary or a periphery of the crystal grain boundary to a number of cobalt atoms in one of the plurality of the crystal grains is greater than or equal to 0.020 and less than or equal to 1.00.

10. A lithium-ion secondary battery comprising:
a positive electrode active material particle including a crystal grain boundary and a plurality of crystal grains,
wherein the positive electrode active material particle comprises a region in which a ratio of a number of magnesium atoms in the crystal grain boundary or a periphery of the crystal grain boundary to a number of transition metal atoms in one of the plurality of the crystal grains is greater than or equal to 0.010 and less than or equal to 0.5,
wherein the transition metal comprises cobalt, nickel and manganese, and
wherein the number of the transition metal atoms refers to the total number of atoms of each of cobalt, nickel, and manganese included in the one of the plurality of the crystal grains.

11. The lithium-ion battery according to claim 10, wherein the positive electrode active material particle comprises a region in which a ratio of a number of magnesium atoms in the crystal grain boundary or the periphery of the crystal grain boundary to a number of transition metal atoms in the one of the plurality of the crystal grains is greater than or equal 0.03.

12. The lithium-ion secondary battery according to claim 10,
wherein, in EDX linear analysis for the one of the plurality of the crystal grains, magnesium is detected at a level of the lower detection limit, and
wherein, in EDX linear analysis for the crystal grain boundary or the periphery of the crystal grain boundary, magnesium is detected beyond the level of the lower detection limit.

13. The lithium-ion secondary battery according to claim 10,
wherein, in EDX linear analysis for the one of the plurality of the crystal grains, magnesium is detected at lower than 1 atomic %, and
wherein, in EDX linear analysis for the crystal grain boundary or the periphery of the crystal grain boundary, magnesium is detected beyond 1 atomic %.

14. The lithium-ion secondary battery according to claim 10,
wherein the number of magnesium atoms and the number of transition metal atoms is obtained with EDX linear analysis.

15. The lithium-ion battery according to claim 10, further comprising a conductive additive,
wherein the conductive additive includes carbon fiber.

16. The lithium-ion battery according to claim 15, wherein the carbon fiber includes carbon nanofiber or carbon nanotube.

17. The lithium-ion battery according to claim 15, wherein the conductive additive further includes any one of carbon black, graphite particle, graphene, and fullerene.

* * * * *